US011218197B2

United States Patent
Rollins et al.

(10) Patent No.: US 11,218,197 B2
(45) Date of Patent: Jan. 4, 2022

(54) CONVEX REDUCTION OF AMPLITUDES FOR OFDM MIMO WITH MULTIPLE CARRIERS

(71) Applicant: Telefonaktiebolaget LM Ericsson (publ), Stockholm (SE)

(72) Inventors: Mark Edward Rollins, Stittsville (CA); Bilel Fehri, Montreal (CA); Pierre-Andre Laporte, Gatineau (CA); Mark Wyville, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/644,917

(22) PCT Filed: Oct. 5, 2017

(86) PCT No.: PCT/IB2017/056155
§ 371 (c)(1),
(2) Date: Mar. 5, 2020

(87) PCT Pub. No.: WO2019/069117
PCT Pub. Date: Apr. 11, 2019

(65) Prior Publication Data
US 2020/0266859 A1 Aug. 20, 2020

(51) Int. Cl.
*H04B 7/0452* (2017.01)
*H04B 1/04* (2006.01)
(Continued)

(52) U.S. Cl.
CPC ............ *H04B 7/0452* (2013.01); *H04B 1/04* (2013.01); *H04L 5/001* (2013.01); *H04L 27/2615* (2013.01)

(58) Field of Classification Search
CPC .......... H04B 1/04; H04B 7/04; H04B 7/0452; H04L 5/001; H04L 27/2615
See application file for complete search history.

(56) References Cited

U.S. PATENT DOCUMENTS

| 2008/0108310 | A1* | 5/2008 | Tong ................... H04B 7/0673 455/69 |
| 2018/0213510 | A1* | 7/2018 | Akkarakaran ...... H04L 27/2636 |
| 2020/0059770 | A1 | 2/2020 | Smith et al. |

FOREIGN PATENT DOCUMENTS

WO 2020084336 A1 4/2020

OTHER PUBLICATIONS

Aggarwal et al., "Minimizing the Peak-to-Average Power Ratio of OFDM Signals Via Convex Optimization," Aug. 2006, IEEE Transactions on Signal Processing, vol. 54, Issue No. 8, pp. 3099-3110. (Year: 2006).*

(Continued)

*Primary Examiner* — David B Lugo
(74) *Attorney, Agent, or Firm* — Withrow & Terranova, PLLC

(57) ABSTRACT

Systems and methods are disclosed herein that related to Peak-to-Average Power Ratio (PAPR) reduction in a (e.g., massive) Multiple-Input Multiple-Output (MIMO) Orthogonal Division Multiplexing (OFDM) transmitter system. In some embodiments, a method of operation of a MIMO OFDM transmitter system comprises, for each carrier of two or more carriers, performing precoding of a plurality of frequency-domain input signals for the carrier to provide a plurality of frequency-domain precoded signals for the carrier, the plurality of frequency-domain input signals for the carrier being for a plurality of transmit layers for the carrier, respectively. The method further comprises processing the frequency-domain precoded signals for the two or more carriers in accordance with a multi-carrier Convex Reduction of Amplitudes (CRAM) processing scheme to provide a plurality of multi-carrier time-domain transmit signals for a plurality of antenna branches, respectively, of the MIMO OFDM transmitter system.

27 Claims, 32 Drawing Sheets

(51) Int. Cl.
 H04L 5/00 (2006.01)
 H04L 27/26 (2006.01)

(56) References Cited

OTHER PUBLICATIONS

Manasseh et al., "Efficient PAPR Reduction Techniques for MIMO-OFDM Based Cognitive Radio Networks," Nov. 2013, IEEE International Symposium on Intelligent Signal Processing and Communication Systems, pp. 357-362. (Year: 2013).*

Bao, Hengyao, et al., "An Efficient Bayesian PAPR Reduction Method for OFDM-Based Massive MIMO Systems," Cornell University Library, URL: "https://arxiv.org/abs/1511.09013," Nov. 29, 2015, 13 pages.

Bao, Hengyao, et al., "An Efficient Bayesian PAPR Reduction Method for OFDM-Based Massive MIMO Systems," IEEE Transactions on Wireless Communications, vol. 15, No. 6, Jun. 2016, pp. 4183-4195.

Bao, Hengyao, et al., "Perturbation-Assisted PAPR Reduction for Large-Scale MIMO-OFDM Systems via ADMM," Cornell University Library, URL: "https://arxiv.org/abs/1607.02681," Jul. 10, 2016, 9 pages.

Parikh, N., et al., "Proximal Algorithms," Foundations and Trends in Optimization, Now: The Essences of Knowledge, vol. 1, No. 3, 2013, 113 pages.

Studer, Christoph, et al., "Democratic Representations," Version 1, URL: https://arxiv.org/abs/1401.3420v1, Cornell University Library, Jan. 15, 2014, 35 pages.

Studer, Christoph, et al., "Democratic Representations," Version 2, URL: https://arxiv.org/abs/1401.3420v2, Cornell University Library, Apr. 21, 2015, 43 pages.

Studer, Christoph, et al., "PAR-Aware Large-Scale Multi-User MIMO-OFDM Downlink," IEEE Journal on Selected Areas in Communications, Cornell University Library, URL: "https://arxiv.org/pdf/1202.4034.pdf," Sep. 4, 2012, 11 pages.

International Search Report and Written Opinion for International Patent Application No. PCT/IB2017/056155, dated Jun. 1, 2018, 14 pages.

Invitation to Pay Additional Fees and Partial Search for International Patent Application No. PCT/IB2018/058413, dated Jul. 1, 2019, 13 pages.

International Search Report and Written Opinion for International Patent Application No. PCT/IB2018/058413, dated Aug. 22, 2019, 18 pages.

* cited by examiner

Reciprocity-based zero-forcing transmitter block diagram

Reciprocity-based ZF transmitter using CRAM for PAPR reduction

*Antenna branch variation in RMS power level due to ZF precoding*

Composite envelope PDF for global (left) vs. per-antenna (right) clipping with 5 iterations

*Spatial transformation based on a 2D-DFT*

*Derivation of CRAM X update for port reduction*

CCDF performance of CRAM/RZF with/without RAIT

EVM performance of ZF/CRAM with and without RAIT for perfect vs. estimated covariance matrix Multi-carrier simulation results for CRAM extensions provided by the present disclosure Multi-carrier simulation results for CRAM extensions provided by the present disclosure

MULTI-BAND CRAM

CRAM dual-band Y-update

Multi-band simulation results for CRAM extensions provided by the present disclosure Multi-band simulation results for CRAM extensions provided by the present disclosure

*Channel estimate and pseudo-inverse interpolation schemes*

*EVA channel and its interpolated approximation (left) and replicated approximation (right) for a 12-tone granularity*

CONVEX REDUCTION OF AMPLITUDES FOR OFDM MIMO WITH MULTIPLE CARRIERS

This application is a 35 U.S.C. § 371 national phase filing of International Application No. PCT/IB2017/056155, filed Oct. 5, 2017, the disclosure of which is incorporated herein by reference in its entirety.

TECHNICAL FIELD

The present disclosure relates to Peak-to-Average Power Ratio (PAPR) in a Multiple Input Multiple Output (MIMO) system.

BACKGROUND

Future large scale Multiple Input Multiple Output (MIMO) Orthogonal Frequency Division Multiplexing (OFDM) systems promise significant capacity gains by using large adaptive antenna arrays with hundreds of elements. Reciprocity-based transmission provides the mechanism to achieve interference-free transmission between multiple users with these arrays using a Zero-Forcing (ZF) transmit precoding based on known Channel State Information (CSI). However, OFDM signaling exhibits a large Peak-to-Average Power Ratio (PAPR) requiring expensive linear Radio Frequency (RF) components and costly digital predistortion to manage and mitigate out-of-band radiation and non-linear signal distortions. Consequently, there is considerable interest in adopting low-PAPR signaling schemes for these systems.

ZF Solution for Reciprocity-Based Systems

FIG. 1 is a block diagram for the transmitter of a reciprocity-based system based on ZF precoding. The ZF precoding system has the following attributes. A linear precoder $P_n^{ZF}$ performs digital beamforming individually on each tone, producing a vector $x_n \varepsilon \mathbb{C}^{M \times 1}$ from its layer-domain input information vector $s_n \varepsilon \mathbb{C}^{K \times 1}$. The precoder operates on to $|\mathcal{T}|$ of $|\mathcal{T}|$ tones and the remaining $|\mathcal{T}^C|$ tones are unused and set to zero, where $|\mathcal{T}|+|\mathcal{T}^C|=N$. The precoder matrix $P_n^{ZF}$ is set to the "right pseudo-inverse" $H_n^\backslash$ of the MIMO channel matrix $H_n$ as shown in Equation 1. The precoder enforces the spatial constraints given in Equation 2 such that tone $x_n = P_n s_n$ is received at the receiver (e.g., a User Equipment (UE) in a Long Term Evolution (LTE) or Fifth Generation (5G) New Radio (NR) based system) as $H_n x_n = H_n P_n s_n = H_n H_n^\dagger s_n = s_n$, and so this ZF precoding scheme removes all multiple access interference between layers in the ideal case.

Equation 1: ZF Precoding Solution $$P_n^{ZF} = H_n^\dagger = H_n^H (H_n H_n^H)^{-1}$$

Equation 2: ZF Spatial Constraints for a Given Tone Index n.

$$s_n = H_n x_n, n \in \mathcal{T}$$

$$s_n = 0^{K \times 1}, n \in \mathcal{T}^c$$

Each of the N precoded vectors $x_n$ contains M samples to be distributed evenly across the M antenna branches of the transmitter. This "reordering" generates a new set of M vectors $a_m$ each containing N frequency-domain samples. These vectors are converted to time-domain vectors $y_m$ using respective Inverse Fast Fourier Transforms (IFFTs), and then serialized and prepended with a Cyclic Prefix (CP) according to conventional OFDM practice.

Time-domain clipping of each antenna branch signal reduces the PAPR from a large value (typically ~10 Decibels (dB)) to a value in the range of 5.0 to 9.0 dB. This process introduces signal distortion both in-band and out-of-band, typically characterized by its Error Vector Magnitude (EVM) measured on each frequency-domain tone as a percentage between 3% and 20% depending on modulation format.

PAPR Reduction in Massive MIMO

Recent research demonstrates the large degrees of freedom afforded by large antenna arrays can be exploited in reciprocity-based systems to reduce PAPR to unforeseen levels by combining precoding, OFDM modulation, and PAPR reduction into a single complex optimization problem.

Consider a narrow-band Multi-User MIMO (MU-MIMO) system with K users and M antennas, where K<M. For a reciprocity-based system, the transmit vector x must satisfy s=Hx to eliminate fully the multi-user interference and convey the information vectors to the receiver (e.g., the UE). Since K<M, there are infinitely many vectors x satisfying s=Hx because the MIMO channel matrix H is rank-deficient. A new class of algorithms has emerged recently that use convex optimization techniques to identify candidate signals x that exhibit very low PAPR while still satisfying the spatial constraints s=Hx.

Several recent works demonstrate how this can be approached. Reference [1] proposes a method called "Fast Iterative Truncation Algorithm (FITRA)" that uses, at its core, a well-known convex optimization technique known as "Fast Iterative Shrinkage-Thresholding Algorithm (FISTA) ." A Lagrange formulation trades off the peak power minimization $\|x\|_\infty$ against the spatial constraints $\|s-Hx\|_2^2$. The problem is solved by using a steepest descent approach applied to the gradient of g(x) and a soft thresholding applied to the proximal operator of $f(x)$ using the FISTA method. Simulations demonstrate the FITRA algorithm can achieve a PAPR in the range of (2,4) dB in 250 to 2000 iterations.

Reference [2] proposes a Bayesian framework that treats the signal as a random vector with suitable priors to promote a low PAPR solution. The solution is found using a variational Expectation-Maximization (EM) framework using Generalized Approximate Message Passing (GAMP).

Reference [3] proposes adding a perturbation signal Δx to each OFDM tone such that it reduces PAPR without any multiple access interference or out-of-band radiation. A suitable perturbation signal is found using variable splitting and Alternative Direction Method of Multipliers (ADMM) techniques. The method is referred to as "PROXINF-ADMM." This method employs an identical set of spatial constraints as in FITRA. The resulting algorithm exhibits an outer loop that performs clipping and an inner loop that performs ADMM iterations to update the estimate of Δx. Simulations demonstrate the PROXINF-ADMM algorithm can achieve a PAPR in the range of (2,4) dB in 20 to 200 iterations.

Reference [4] proposes a method called "Convex Reduction of Amplitudes for Parseval frames (CRAMP)" based on a Douglas-Rachford (DR) splitting recursion to identify "democratic representations" of signals that exhibit similar magnitudes in all samples. These signals have favorable PAPR characteristics. Ref [4] demonstrates how CRAMP reduces PAPR in conventional OFDM systems such as the DVB-T2 broadcast system. When reformulated to the Massive MIMO context, CRAMP evolves to a related variant (herein referred to simply as CRAM) involving DR recursion procedures similar to [4], and involving an identical set of spatial constraints as in methods [1], [2], and [3]. Since CRAM solves for x directly rather than solving for the perturbation signal Δx, a simpler algorithm results with no inner loop, but only a single outer loop with a pair of proximal updates. Simulations demonstrate the CRAM algorithm can achieve a PAPR in the range of (2,4) dB in 4 to 8 iterations.

Methods [1], [3], and [4] all solve for the time-domain signal vector x using proximal methods of convex optimization [5] which lead to iterative solutions employing time-domain clipping and frequency-domain projection operations. In each case, the solutions solve Equation 3 where $f(x)$ and $g(x)$ are real-valued convex functions. Typically, the function $f(x)$ characterizes the peak properties of x, and $g(x)$ describes the spatial constraints of the reciprocity-based OFDM transmission.

Equation 3: Convex Optimization Problem to Solve for PAPR in Massive MIMO OFDM Systems.

$$\min_x f(x) + g(x)$$

The CRAM algorithm [4] represents the most promising member of this new class of solutions for PAPR reduction due to its simplicity, lack of nested iterative loops, and its attractive cost vs. performance trade-off.

SUMMARY

Systems and methods are disclosed herein that related to Peak-to-Average Power Ratio (PAPR) reduction in a (e.g., massive) Multiple Input Multiple Output (MIMO) Orthogonal Division Multiplexing (OFDM) transmitter system. In some embodiments, a method of operation of a MIMO OFDM transmitter system comprises, for each carrier of two or more carriers, performing precoding of a plurality of frequency-domain input signals for the carrier to provide a plurality of frequency-domain precoded signals for the carrier, the plurality of frequency-domain input signals for the carrier being for a plurality of transmit layers for the carrier, respectively. The method further comprises processing the frequency-domain precoded signals for the two or more carriers in accordance with a multi-carrier Convex Reduction of Amplitudes (CRAM) processing scheme to provide a plurality of multi-carrier time-domain transmit signals for a plurality of antenna branches, respectively, of the MIMO OFDM transmitter system.

Embodiments of a MIMO OFDM transmitter are also disclosed. In some embodiments, the MIMO OFDM transmitter system comprises precoding circuitry and processing circuitry. The precoding circuitry is operable to, for each carrier of two or more carriers, perform precoding of a plurality of frequency-domain input signals for the carrier to provide a plurality of frequency-domain precoded signals for the carrier, the plurality of frequency-domain input signals for the carrier being for a plurality of transmit layers for the carrier, respectively. The processing circuitry is operable to process the two or more pluralities of frequency-domain precoded signals for the two or more carriers, respectively, in accordance with a multi-carrier CRAM processing scheme to provide a plurality of multi-carrier time-domain transmit signals for a plurality of antenna branches, respectively, of the MIMO OFDM transmitter system.

In some embodiments, a MIMO OFDM transmitter system comprises a precoding unit and processing unit. The precoding unit is operable to, for each carrier of two or more carriers, perform precoding of a plurality of frequency-domain input signals for the carrier to provide a plurality of frequency-domain precoded signals for the carrier, the plurality of frequency-domain input signals for the carrier being for a plurality of transmit layers for the carrier, respectively. The processing unit is operable to process the two or more pluralities of frequency-domain precoded signals for the two or more carriers, respectively, in accordance with a multi-carrier CRAM processing scheme to provide a plurality of multi-carrier time-domain transmit signals for a plurality of antenna branches, respectively, of the MIMO OFDM transmitter system.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
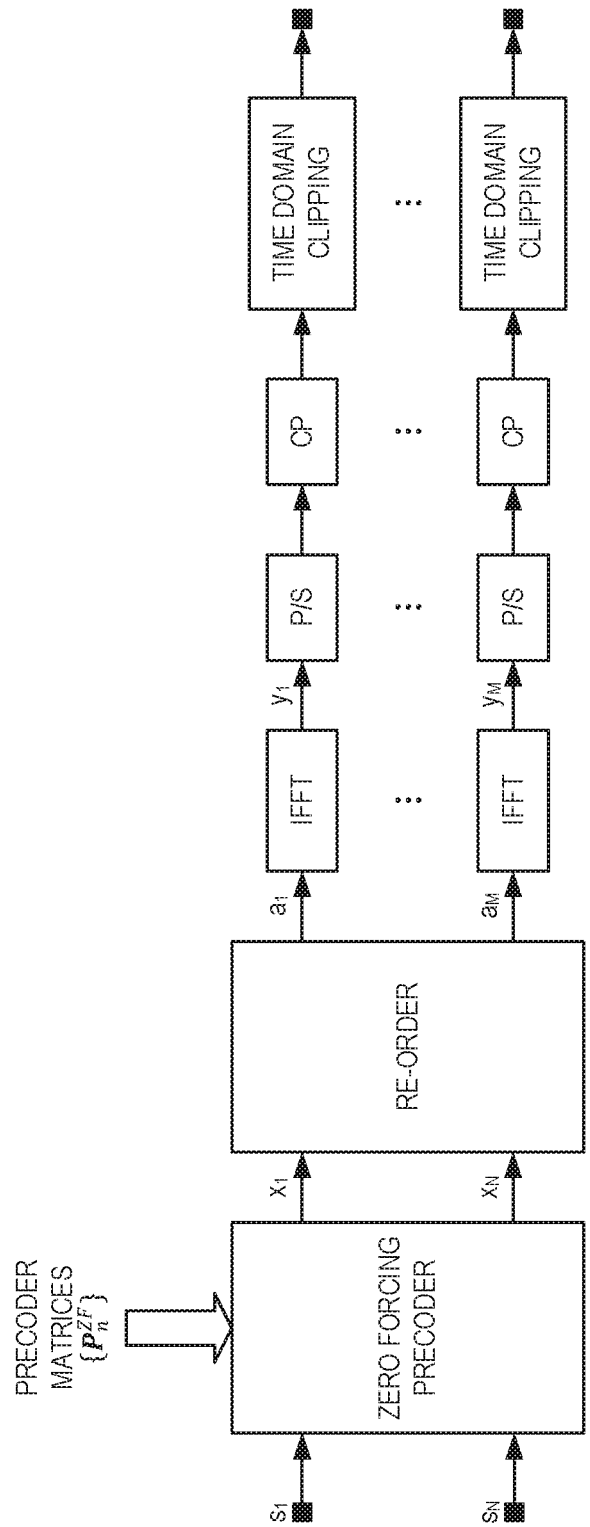
FIG. 1 is a block diagram for the transmitter of a reciprocity-based system based on Zero-Forcing (ZF) precoding.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Before describing embodiments of the present disclosure, it is useful to first describe the application of Convex Reduction of Amplitudes (CRAM) for Peak-to-Average Power Ratio (PAPR) reduction in reciprocity-based systems. The basic goal of the CRAM algorithm is to identify a frequency-domain vector $x_n$ for each Orthogonal Division Multiplexing (OFDM) tone that satisfies two requirements (considered as spatial constraints and peak power constraints, respectively):

The first requirement ensures $x_n$ satisfies the spatial constraints for Zero-Forcing (ZF) precoding in Equation 2 such that $s_n = H_n x_n$ for all the tones $n \in \mathcal{T}$ carrying information via $s_n$, and $s_n = 0^{K \times 1}$ for all unused tones $n \in \mathcal{T}^C$.

The second requirement ensures the time-domain signal $y_m$ on each antenna branch $1 \leq m \leq M$ satisfies the PAPR constraint $\|y_m\|_\infty < P \, \forall m$. The relationship between the frequency-domain $x_n$ and the time-domain $y_m$ involves a mapping of layers to antenna branches as shown in EquationEquation 4 and Equation 5, where the permutation matrix T re-orders the samples from layers into streams for transmission over M antennas, and $F_N \in \mathbb{C}^{N \times N}$ is the Discrete Fourier Transform (DFT) matrix of size N used to transform each antenna stream from time-domain to frequency-domain.

Equation 4: Permutation Matrix to Re-Order Precoded Symbols for OFDM Transmission.

$$[a_1^T, \ldots, a_M^T]^T = T[x_1^T, \ldots, x_N^T]^T$$

$$\bar{a} = T\bar{x}$$

Equation 5: Relationship Between Frequency and Time-Domain OFDM Signal Samples.

$$\begin{bmatrix} a_1 \\ a_2 \\ \vdots \\ a_M \end{bmatrix} = \begin{bmatrix} F_N & 0 & \ldots & 0 \\ 0 & F_N & \ldots & 0 \\ \vdots & \vdots & \ddots & \vdots \\ 0 & 0 & \ldots & F_N \end{bmatrix} \cdot \begin{bmatrix} y_1 \\ y_2 \\ \vdots \\ y_M \end{bmatrix}$$

$$\bar{a} = F\bar{y}$$

The CRAM algorithm [4] solves for $x_n$ using the iterative solution given in Equation 6. The vector $\bar{z}$, which is referred to herein as a vector or collection of Z-update outputs of the CRAM algorithm, accumulates the frequency-domain error in the spatial layers between $\bar{y}$ (a collection of $y_n$) and $\bar{x}$ (a collection of $x_n$) over all iterations of the algorithm. The vector $\bar{x}$ exhibits zero Error Vector Magnitude (EVM) and satisfies the spatial constraints in Equation 2. The vector $\bar{w}$ is the time-domain equivalent of the frequency-domain $\bar{y}$. The vector $\hat{w}$ is a clipped version of $\bar{w}$ satisfies the peak-power constraint $\|\hat{w}\|_\infty < P$.

Equation 6: The CRAM Algorithm for PAPR Reduction with Large Antenna Arrays.

$$\begin{aligned}
&\bar{z}^{(0)} = 0 \\
&\text{for } k = 1, 2, \ldots \text{ do} \\
&\quad x_n^{(k)} = z_n^{(k-1)} - P_n^{ZF}(H_n z_n^{(k-1)} - s_n), \forall n \in \mathcal{T} \\
&\quad x_n^{(k)} = 0, \forall n \in \mathcal{T}^c \\
&\quad \bar{w} = F^H T(2\bar{x}^{(k)} - \bar{z}^{(k-1)})
\end{aligned}$$

Figure 2:
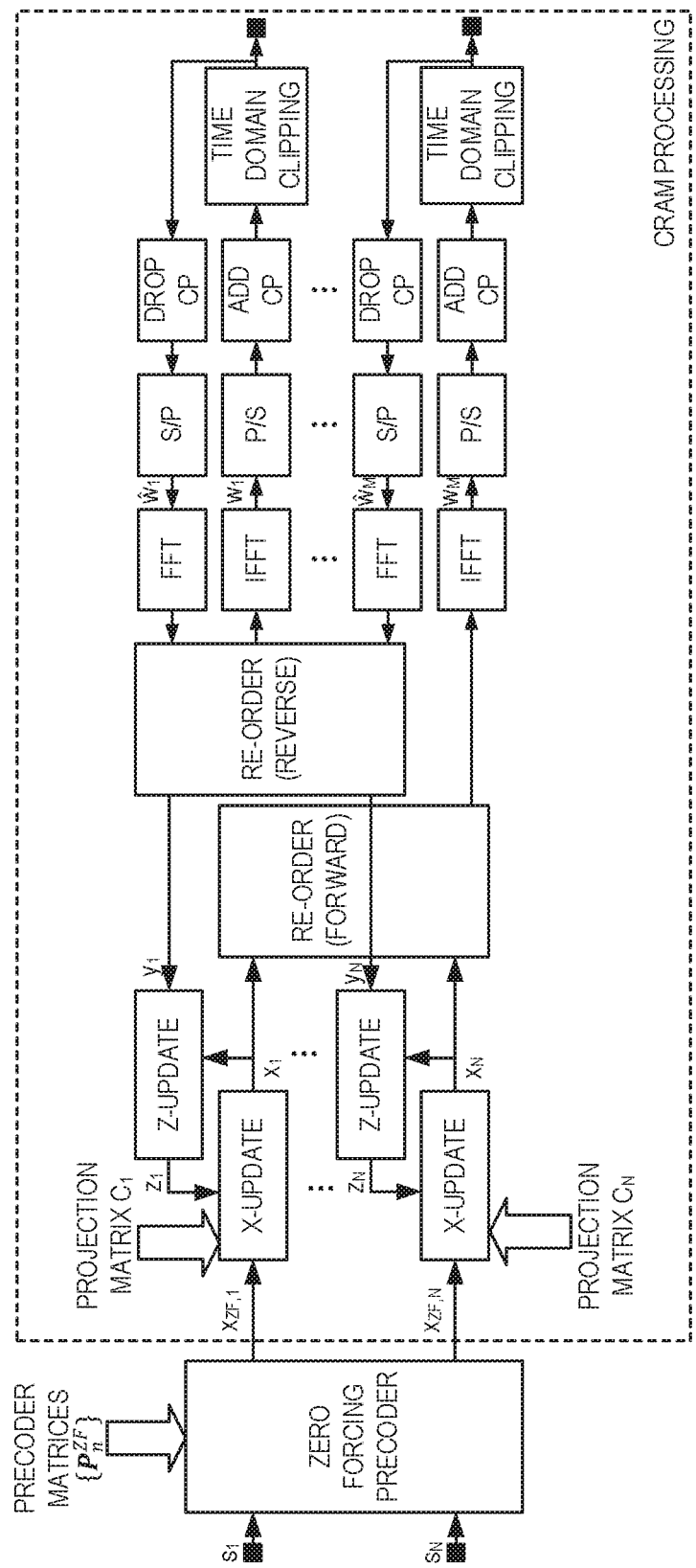
FIG. 2 is a block diagram for a reciprocity-based ZF transmitter that uses a Convex Reduction of Amplitudes (CRAM) algorithm for Peak-to-Average Power Ratio (PAPR) reduction.

-continued $$\hat{w} = \text{clip}(\overline{w}, P)$$
$$\overline{y}^{(k)} = T^T F \hat{w}$$
$$\overline{z}^{(k)} = \overline{z}^{(k-1)} + \overline{y}^{(k)} - \overline{x}^{(k)}$$
end A block diagram for a reciprocity-based ZF transmitter that uses the CRAM algorithm (i.e., the CRAM procedure or CRAM scheme) of Equation 6 for PAPR reduction is shown in FIG. 2. Note the Fast Fourier Transform (FFT) and Inverse FFT (IFFT) branches required by the CRAM iterations. The X-UPDATE blocks compute the respective values of $x_n^{(k)}$ for each k-th iteration of the CRAM algorithm in accordance with Equation 6. Together, the Z-UPDATE blocks maintain the z accumulator in accordance with Equation 6.

The X-UPDATE of Equation 6 may be expressed in an alternative form as shown in

EquationEquation 7, where $C_n = (I - P_n^{ZF} H_n)$ acts as a projection matrix for the CRAM algorithm.

Equation 7: CRAM X-UPDATE Interpreted as an Additive Perturbation to the ZF Solution.

$$x_n^{(k)} = z_n^{(k-1)} - P_n^{ZF}(H_n z_n^{(k-1)} - s_n), n \in \mathcal{T}$$
$$= (I - P_n^{ZF} H_n) \cdot z_n^{(k-1)} + P_n^{ZF} \cdot s_n$$
$$\equiv C_n \cdot z_n^{(k-1)} + x_n^{ZF}$$

Figure 3:
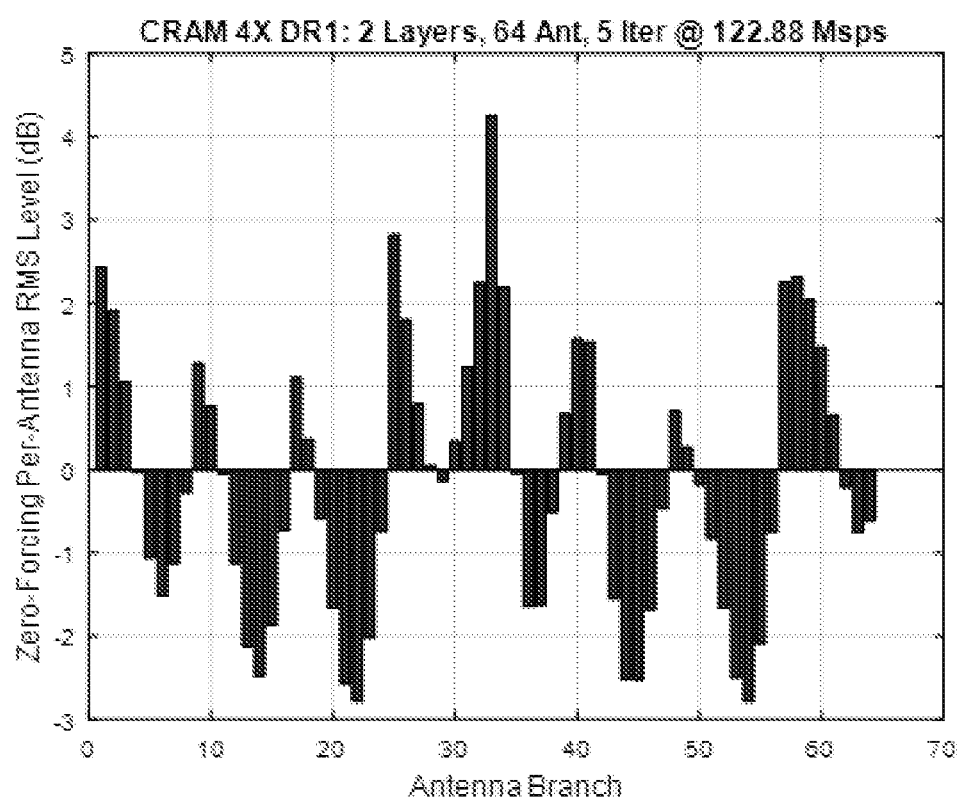
FIG. 3 illustrates example antenna branch variation in Root Mean Square (RMS) power level due to ZF precoding.

There are many problems that need to be solved in order to provide a practical low-PAPR precoding system for massive Multiple Input Multiple Output (MIMO) that is based on the CRAM algorithm of Equation 6. A first problem is poor CRAM performance with global clipping. One challenge with ZF solutions is the dynamic range challenge—the Root Mean Square (RMS) power level of each antenna branch varies dramatically across the full set of antennas based on the strengths of the individual components of the MIMO channel matrix $H_n$ for each tone. This is shown for the Third Generation Partnership Project (3GPP) Extended Vehicular A (EVA) channel model specified by 3GPP standards in FIG. 3, where a significant variation of ±4 dB is seen over the M=64 branches.

CRAM [4] as shown in Equation 6 treats the multi-branch antenna signal $\hat{w}$ as a single signal and clipping is performed in a "global" manner (i.e., $\hat{w} = \text{clip}(\hat{w}, P)$) using a single threshold P for the entire data set. Due to the large RMS variation in the antenna branch power due to ZF precoding, using a common threshold results in high power branches being clipped severely and low power branches not being clipped at all. The non-uniformity of the global clipping leads to relatively poor performance as shown in Table 1 for M=64. Global clipping results in a large RMS power penalty of 1.9 Decibels (dB) due to the heavy clipping on large antenna branches. An overall peak reduction of only 2.1 dB by CRAM over the ZF case. The CRAM signal peak compared to the ZF average (PAZF) is only 8.3 dB (reduced from 10.4 dB).

TABLE 1

Performance metrics for global vs. per-antenna clipping with 5 iterations.

| Metric (dB) | Global | Per-Antenna |
|---|---|---|
| PAPR (CRAM) | 6.3 | 5.5 |
| PAZF (CRAM) | 8.3 | 5.7 |
| Peak Reduction (CRAM) | 2.1 | 4.6 |
| RMS Penalty (CRAM) | 1.9 | 0.2 |

A second problem that needs to be solved is the lack of support for port reduction. Reciprocity-based MIMO OFDM systems are expensive. Costs of near-radio signal processing algorithms with high sampling rates inflate dramatically for systems with M=64 antenna branches or higher. This applies not only for data path functions, but also support functions such as channel estimation and precoding matrix computations.

This complexity increase may be managed using a scheme known as "port reduction." The concept is based on the observation from field trials that only a few beams contain significant energy in practical networks due to propagation effects, regardless of the number of antenna elements. Consequently, one may consider precoding into a subset of the available beams. This reduces complexity with little impact on network performance if the unused beams truly contain no usable signal.

Conventional CRAM as shown in Equation 6 and FIG. 2 employs ZF precoding into the full dimension M of antenna branches, and thus does not support port reduction in its current form.

A third problem is lack of support for multi-cell interference scenarios. Conventional CRAM as shown in Equation 6 and FIG. 2 supports only single cell operation. Practical wireless systems employ a cellular concept, reusing frequency bands in nearby cells and causing inter-cell interference. Ericsson Research developed a Reciprocity-Assisted Interference Transmission (RAIT) technique [6] to extend the conventional ZF precoding to mitigate this inter-cell interference in multi-cell scenarios. Like conventional ZF, RAIT generates signals with large PAPR. Consequently, there is a need to extend CRAM to handle RAIT transmission, but this is not supported by the conventional CRAM algorithm.

A fourth problem is lack of support for multi-carrier operation. Conventional CRAM as shown in Equation 6 and FIG. 2 supports only a single carrier. Most practical systems support several carriers typically two to four carriers per band in conventional systems, and this may grow to five or more for future Fifth Generation (5G) wireless systems. Moreover, the challenges associated with PAPR reduction tend to grow with a larger number of carriers, so the need for more efficient PAPR reduction techniques becomes even more critical. Consequently, there is a need to extend CRAM to handle systems with multiple carriers, but this is not supported by the conventional CRAM algorithm.

A fifth problem is lack of support for multi-band operation. Conventional CRAM as shown in Equation 6 and FIG. 2 supports only a single band. Current classical radio architectures are just now beginning to support multiple bands concurrently in the same radio. Future Adaptive Antenna System (AAS) radios are anticipated to follow this trend as well. Considerable cost savings may be realized for multi-band AAS systems if the large antenna array is wideband and may be shared across multiple bands in a single radio. Like combining multiple carriers, combining multiple bands makes PAPR reduction even more challenging. Consequently, there is a need to extend CRAM to handle systems with multiple bands, but this is not supported by the prior art.

A sixth problem is lack of support for incomplete channel knowledge. Both the ZF system in Equation 1 and the CRAM system as shown in Equation 6 and FIG. 2 require the channel matrix $H_n$ and its pseudo-inverse matrix $H_n^\dagger$ for every tone $n \in \mathcal{T}$ bearing information. In practical systems, the base station measures the channel $\tilde{H}_n$ not on every tone but with a pre-specified frequency granularity. For example, Long Term Evolution (LTE) embeds one pilot per Physical Resource Block (PRB) (a group of 12 contiguous tones). A 20 Megahertz (MHz) LTE signal with 15 Kilohertz (kHz) tone spacing contains 1200 information-bearing tones and 100 PRBs, so only 100 channel estimates are available for processing 1200 tones. Consequently, practical systems require a robust procedure to deal with this incomplete channel knowledge, but this is not supported by the prior art.

Systems and methods for addressing the problems described above are disclosed herein. Note that while a number of solutions are described below, these solutions may be used in combination.

Figure 4:
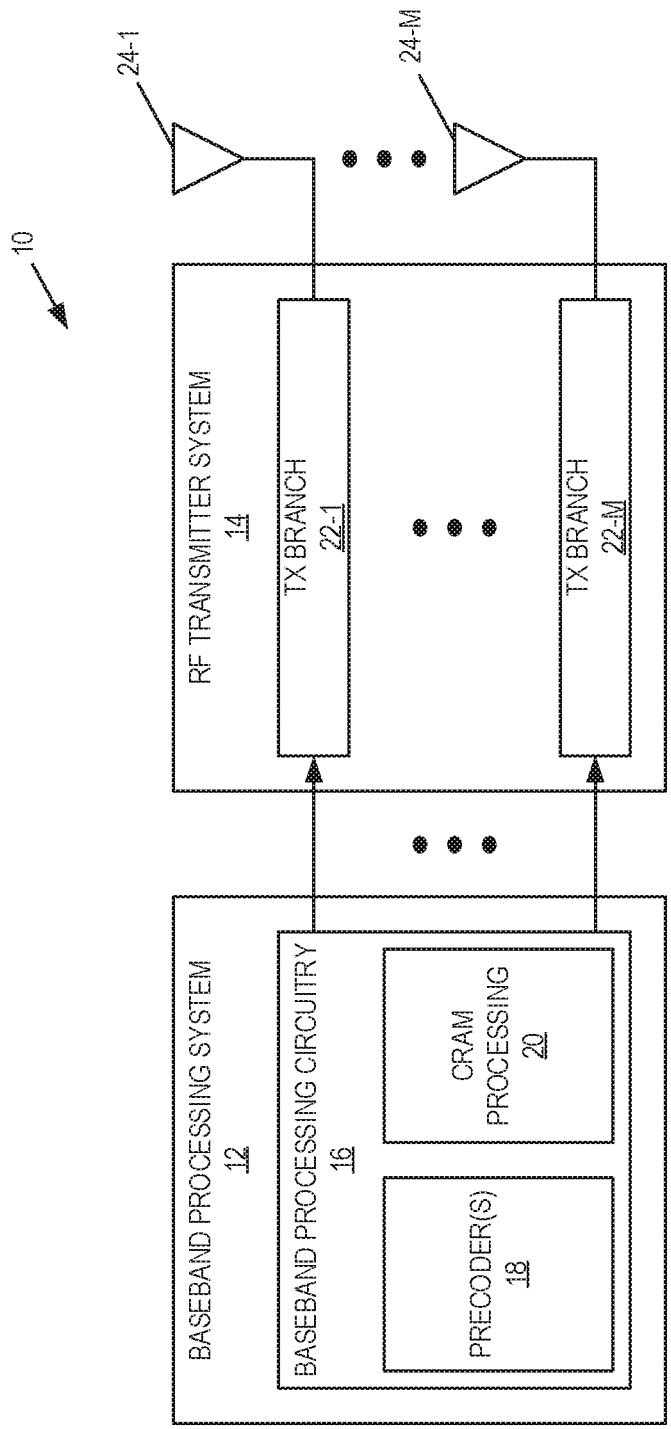
FIG. 4 illustrates a transmitter system in which embodiments of the present disclosure may be implemented.

FIG. 4 illustrates a transmitter system 10 in which embodiments of the present disclosure may be implemented. The transmitter system 10 may be part of a wireless device (e.g., a User Equipment (UE)) or a base station in a cellular communications network (e.g., a 5G cellular communications network), but is not limited thereto. The transmitter system 10 includes baseband processing system 12 and Radio Frequency (RF) transmitter circuitry 14. The baseband processing system 12 includes hardware or a combination of hardware and software. In particular, the baseband processing system 12 includes baseband processing circuitry 16 (e.g., one or more Digital Signal Processors (DSPs), one or more Application Specific Integrated Circuits (ASICs), one or more Field Programmable Gate Arrays (FPGAs), and/or the like). In some embodiments, the baseband processing circuitry 16 includes memory storing software that is executed by one or more of processors within the baseband processing circuitry 16. This hardware and, in some embodiments, software implements a one or more precoders 18 (e.g., one or more ZF precoders) and a CRAM processing system 20, as will be described in detail below. The precoder(s) 18 and the CRAM processing system 20 perform the precoding and CRAM processing according to embodiments of the present disclosure. The RF transmitter circuitry 14 includes multiple transmitter branches 22-1 through 22-M coupled to antenna elements or antenna element subarrays 24-1 through 24-M, respectively. As will be appreciated by one of skill in the art, each of the transmitter branches 22-1 through 22-M includes circuitry such as, for example, an Analog-to-Digital Converter (ADC), upconversion circuitry (e.g., mixers), a filter, a power amplifier, and the like. Each transmitter branch 22 and its respective antenna element or antenna element subarray 24 is referred to herein as an antenna branch of the transmitter system 10.

CRAM with Per-Antenna PAPR Reduction (e.g., Per-Antenna Clipping)

In some embodiments, the CRAM processing system 20 performs a CRAM algorithm that is extended to include per-antenna PAPR reduction in the time-domain. The per-antenna time-domain PAPR reduction uses a separate PAPR reduction limit (i.e., bound) which is set for each antenna branch based on an RMS signal level of the time-domain transmit signal for that antenna branch (i.e., the antenna branch signal component $w_m$ $\forall m=1, \ldots, M$). The per-antenna time-domain PAPR reduction is, in some particular embodiments, per-antenna time-domain clipping in which a separate clipping threshold $P_m$ is set for each antenna branch based on an RMS signal level of time-domain transmit signal for that antenna branch. In this manner, time-domain PAPR reduction is performed for each antenna branch independently to a level that is appropriate to its own RMS signal level.

Figure 5:
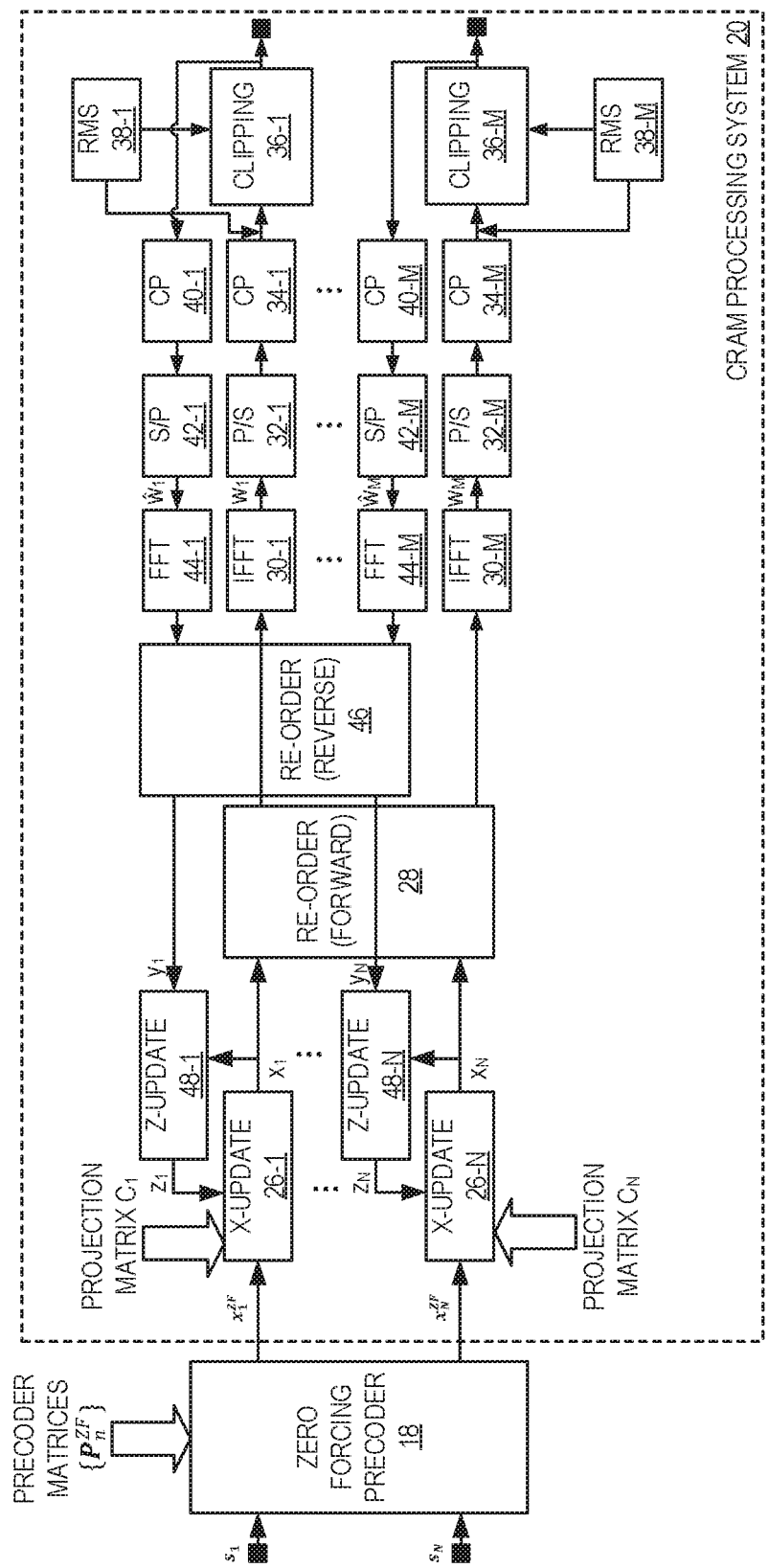
FIG. 5 illustrates the precoder(s) and the CRAM processing system of FIG. 4 in accordance with some embodiments of the present disclosure in which the CRAM algorithm implemented by the CRAM processing system provides per-antenna time-domain PAPR reduction.

In this regard, FIG. 5 illustrates the precoder(s) 18 and the CRAM processing system 20 in accordance with some embodiments of the present disclosure in which the CRAM algorithm implemented by the CRAM processing system 20 provides per-antenna time-domain PAPR reduction. As illustrated, in this example, the precoder(s) 18 is a ZF precoder, which, for consistency, is referred to as a ZF precoder 18.

The ZF precoder 18 receives a number (N) of frequency-domain input signals $s_n \in \mathbb{C}^{K \times 1}$ for $n=1, \ldots, N$. The frequency-domain input signals $s_n$ are also referred to herein as layer-domain input vectors. The number N is the number of tones in the OFDM symbol. For example, for a 20 MHz LTE signal, N=2048 and K is typically in the range of, e.g., 2 to 8. The ZF precoder 18 is a linear precoder that performs digital beamforming individually on each frequency-domain input signal $s_n$ using a respective ZF precoding matrix $p_n^{ZF}$ to produce a respective frequency-domain precoded signal $x_n^{ZF} \in \mathbb{C}^{M \times 1}$. The ZF precoder 18 operates on a total of $|\mathcal{T}|$ tones and the remaining $|\mathcal{T}^C|$ tones are unused and set to zero, where $|\mathcal{T}| + |\mathcal{T}^C| = N$. The precoder matrix $P_n^{ZF}$ is set to the "right pseudo-inverse" $H_n^\dagger$ of the MIMO channel matrix $H_n$ as shown in Equation 8. The ZF precoder 18 enforces the spatial constraints given in Equation 9, such that tone $x_n^{ZF} = P_n^{ZF} s_n$ is received at the UE as $H_n x_n^{ZF} = H_n P_n^{ZF} s_n = H_n H_n^\dagger s_n = s_n$, and so this ZF precoding scheme removes all multiple access interference between layers in the ideal case.

Equation 8: ZF Precoding Solution $$P_n^{ZF} = H_n^\dagger = H_n^H (H_n H_n^H)^{-1}$$

Equation 9: ZF Spatial Constraints for a Given Tone Index n.

$$s_n = H_n x_n^{ZF}, \; n \in \mathcal{T}$$

$$s_n = 0^{K \times 1}, \; n \in \mathcal{T}^C.$$

Each of the N precoded vectors $x_n^{ZF}$ contains M samples to be distributed evenly across the M antenna branches after performing respective CRAM X-updates, as described below. The frequency-domain precoded vectors $x_n^{ZF}$ for $n=1, \ldots, N$ (also referred to herein as frequency-domain precoded signals $x_n^{ZF}$ for $n=1, \ldots, N$) are provided to the CRAM processing system 20.

The CRAM processing system 20 performs a CRAM algorithm that includes per-antenna PAPR reduction according to Equation 10.

Equation 10: CRAM Algorithm with Per-Antenna PAPR Reduction $$\bar{z}^{(0)} = 0$$
$$\text{for } k = 1, 2, \ldots \text{ do}$$
$$x_n^{(k)} = z_n^{(k-1)} - P_n^{ZF} (H_n z_n^{(k-1)} - s_n), \; \forall n \in \mathcal{T}$$
$$x_n^{(k)} = 0, \; \forall n \in \mathcal{T}^c$$

-continued $$\bar{w} = \bar{F}^H T(2\bar{x}^{(k)} - \bar{z}^{(k-1)})$$
$$\hat{w} = \text{clip}(\bar{w}, \bar{P})$$
$$\bar{y}^{(k)} = T^T F \hat{w}$$
$$\bar{z}^{(k)} = \bar{z}^{(k-1)} + \bar{y}^{(k)} - \bar{x}^{(k)}$$
end In Equation 10:
- $\bar{z}^{(k)}$ is a collection of frequency-domain Z-update outputs generated by the CRAM processing system 20 for all N tones for the k-th iteration of the CRAM algorithm.
- $x_n^{(k)}$ is a frequency-domain X-update output generated by the CRAM processing system 20 for the n-th tone for the k-th iteration of the CRAM algorithm.
- $z_n^{(k-1)}$ is a frequency-domain Z-update output generated by the CRAM processing system 20 for the n-th tone for the (k−1)-th iteration of the CRAM algorithm.
- $\bar{w}$ is a collection of time-domain signals $w_m$ for m=1, . . . , M generated by the CRAM processing system 20 for the M antenna branches, respectively.
- $\bar{F}^H$ is a matrix transform equivalent to the Inverse Discrete Fourier transform.
- T( ) is a permutation matrix that re-orders the samples from layers into streams for transmission over M antenna branches.
- $\hat{w}$ is a collection of clipped versions of the time-domain signals $w_m$ for m=1, . . . , M generated by the CRAM processing system 20 for the M antenna branches, respectively.
- $\bar{P}$ is a collection of separate clipping thresholds $P_m$ for m=1, . . . , M for the M antenna branches of the transmitter system 10.
- $\bar{y}^{(k)}$ is a collection of frequency-domain feedback signals $y_n^{(k)}$ generated by the CRAM processing system 20 for the n-th tone for the k-th iteration of the CRAM algorithm.

The X-update in the CRAM algorithm of Equation 10 can be expressed in an alternative form as shown in Equation 11, where $C_n = (I - P_n^{ZF} H_n)$ acts as a projection matrix for the CRAM algorithm for the n-th tone.

Equation 11: CRAM X-UPDATE Interpreted as an Additive Perturbation to the ZF Solution $$x_n^{(k)} = z_n^{(k-1)} - P_n^{ZF}(H_n z_n^{(k-1)} - s_n), n \in \mathcal{T}$$
$$= (I - P_n^{ZF} H_n) \cdot z_n^{(k-1)} + P_n^{ZF} \cdot s_n$$
$$\equiv C_n \cdot z_n^{(k-1)} + x_n^{ZF}$$

The CRAM processing system 20 of FIG. 5 operates to perform the CRAM algorithm of Equations 10 and 11 as follows. A number of X-update functions 26-1 through 26-N operate to perform frequency-domain X-update procedures for the N tones for n=1, . . . , N, respectively, in accordance with Equation 11. In the forward direction, the frequency-domain X-update outputs $x_n^{(k)}$ for n=1, . . . , N are provided to a re-ordering function 28 that re-orders the frequency-domain X-update outputs $x_n^{(k)}$ to generate a new set of M vectors $a_m$ each containing N frequency-domain samples. In other words, each of the N frequency-domain X-update outputs $x_n^{(k)}$ contains M samples that are distributed evenly across the M antenna branches via the re-ordering function 28. The re-ordered vectors $a_m$ for m=1, . . . , M (also referred to herein as re-ordered signals) are converted from the frequency-domain to the time-domain via respective IFFTs 30-1 through 30-M to provide the time-domain signals $w_m$ for m=1, . . . , M for the M antenna branches, respectively. Time-domain processing is then performed on the M time-domain signals $w_m$ to provide M time-domain transmit signals. In this example, the time-domain processing includes Parallel-to-Serial (P/S) conversion by P/S converters 32-1 through 32-M and prepending Cyclic Prefixes (CPs) via CP functions 34-1 through 34-M, respectively. Time-domain clipping functions 36-1 through 36-M perform time-domain clipping of the M time-domain transmit signals for the M antenna branches using the M separate clipping thresholds $P_m$ for the M antenna branches, respectively, to thereby provide M clipped time-domain transmit signals for the M antenna branches. The M clipped time-domain transmit signals are output to the RF transmitter system 14 for transmission.

The M separate clipping thresholds $P_m$ for the M antenna branches are determined, e.g., by the time-domain clipping functions 36-1 through 36-M as a function of the RMS levels of the respective time-domain transmit signals. For example, the clipping threshold $P_m$ can be set to the desired level of PAPR reduction. As a specific example, to achieve a final PAPR of 3 dB to 5 dB, the clipping threshold $P_m$ can be set to be 4 dB above the measured RMS level. The RMS levels of the M time-domain transmit signals are determined by respective RMS level measurement functions 38-1 through 38-M. In this manner, each of the time-domain transmit signals is independently clipped to a level that is appropriate for its own RMS signal level. Note that while clipping is used in the example of FIG. 5 and Equation 10, other time-domain PAPR reduction techniques may be used. Some examples of other time-domain PAPR reduction techniques that can be used include a Lookup Table (LUT) use to shape the signal envelope. Rather than hard clipping based on the envelope, the envelope can be passed through a LUT that implements a "soft compression" function. This performs an arbitrary shaping of the signal envelope as a more flexible alternative to hard clipping.

In the reverse direction, the M clipped time-domain transmit signals are fed back through respective CP dropping functions 40-1 through 40-M and respective Serial-to-Parallel (S/P) converters 42-1 through 42-M to provide the M time-domain feedback signals for the M antenna branches, respectively, which correspond to the collection $\hat{w}$ of the clipped time-domain signals in Equation 10 above. The M time-domain feedback signals are converted from the time-domain to the frequency-domain via respective FFTs 44-1 through 44-M. A re-ordering function 46 performs a reverse re-ordering of the frequency-domain feedback signals to provide the N frequency-domain feedback signals $y_n^{(k)}$ for the N tones, respectively. The N frequency-domain feedback signals $y_n^{(k)}$ are provided to respective Z-update functions 48-1 through 48-N, which operate to perform a frequency-domain Z-update procedure in accordance with Equation 10 above. In particular, for each k-th iteration of the CRAM algorithm, the Z-update functions 48-1 through 48-N compute the collection of frequency-domain Z-update outputs as:

$$\bar{z}^{(k)} = \bar{z}^{(k-1)} + \bar{y}^{(k)} - \bar{x}^{(k)}.$$

The N frequency-domain Z-update outputs $z_n^{(k)}$ are provided to the N X-update functions 26-1 through 26-N, respectively, where they are used by the X-update functions 26-1 through 26-N to perform the frequency-domain X-update procedure for the N tones.

Figure 6:
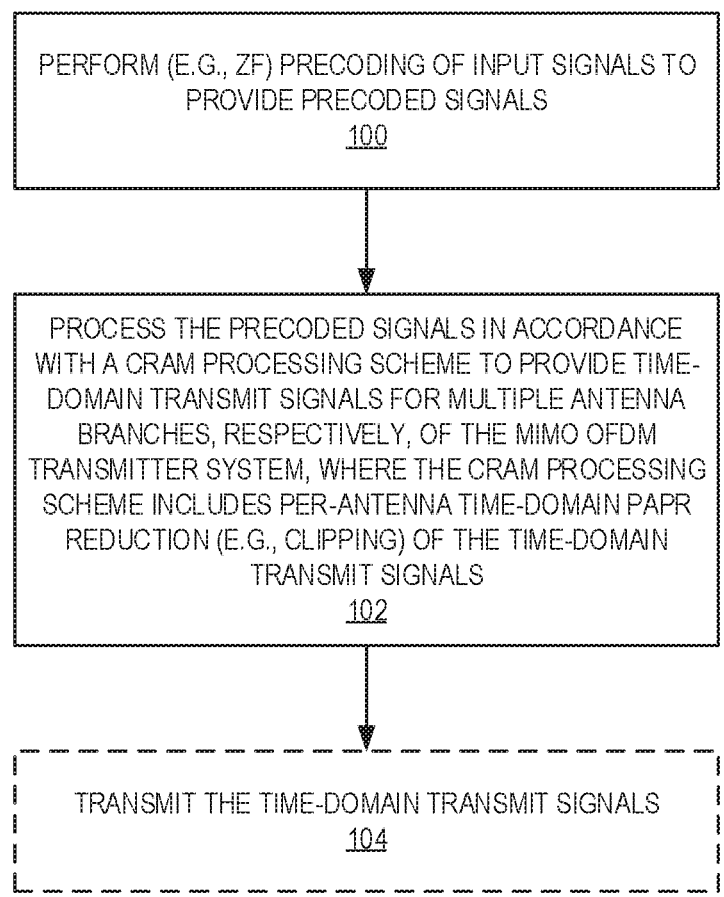
FIG. 6 is a flow chart that illustrates the operation of the transmitter system in accordance with some embodiments of the present disclosure.

FIG. 6 is a flow chart that illustrates the operation of the transmitter system 10 in accordance with some embodiments of the present disclosure. As illustrated, the transmitter system 10, and in particular the baseband processing system 12, performs (e.g., ZF) precoding of the frequency-domain input signals $s_n$ for n=1, ..., N to provide the frequency-domain precoded signals $x_n^{ZF}$ for n=1, ..., N, as described above (step 100). Note that while ZF precoding is used for the examples described herein, other types of precoding may be used. The transmitter system 10, and in particular the baseband processing system 12, processes the frequency-domain precoded signals $x_n^{ZF}$ for n=1, ..., N in accordance with a CRAM processing scheme to provide M time-domain transmit signals for the M antenna branches of the transmitter system 10 (step 102). The CRAM processing scheme includes per-antenna time-domain PAPR reduction (e.g., clipping) of the M time-domain transmit signals. In particular, in this embodiment, the CRAM processing scheme is that described above with respect to Equations 10 and 11. Optionally, the transmitter system 10, and in particular the RF transmitter circuitry 14, transmits the M time-domain transmit signals (step 104).

The CRAM algorithm with per-antenna PAPR improves the performance of CRAM significantly.

Figure 7:
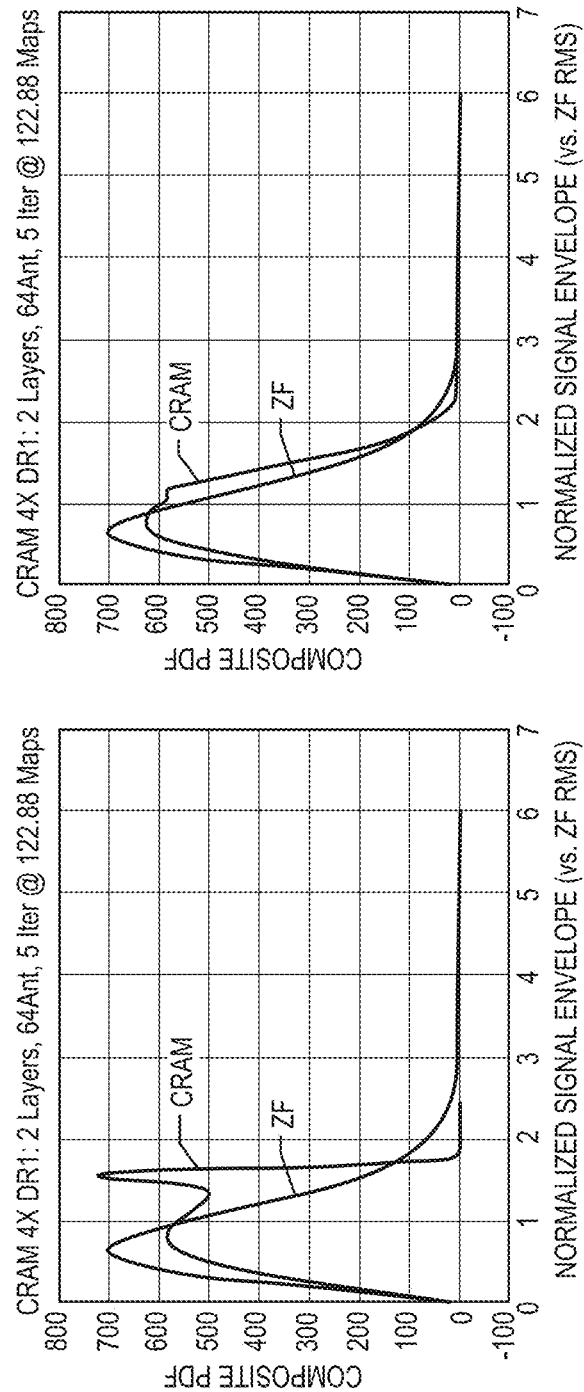
FIG. 7 illustrates one example of simulation results for composite envelope Probability Density Function (PDF) for global clipping versus per-antenna clipping.

Table 1 above shows the RMS penalty of CRAM with per-antenna clipping is only 0.2 dB as compared to a penalty of 1.9 dB for "global" clipping. Overall, a peak reduction of 4.6 dB over ZF is achieved by the CRAM algorithm with per-antenna clipping as compared to 2.1 dB when using the conventional CRAM algorithm with global clipping. FIG. 7 shows how per-antenna clipping results in only a minor modification of the composite signal envelope PDF as compared to the global clipping case where heavy clipping of strong antenna branches has a dramatic impact on the signal envelope leading to an increase in its RMS power.

CRAM with Port Reduction

In some embodiments, the transmitter system 10 utilizes an extension of the conventional CRAM algorithm of Equations 6 and 7 or an extension of the CRAM algorithm with per-antenna PAPR reduction of Equations 10 and 11 that supports port reduction. In particular, in contrast to the full-dimension system in which precoding uses a M×K precoding matrix $P_n^{ZF} \in \mathbb{C}^{M \times K}$, the port reduced system performs precoding into a subset of $N_B < M$ beams using a $N_B \times K$ matrix $P_n^{ZFB} \in \mathbb{C}^{B \times K}$ for each data bearing tone $n \in \mathcal{T}$. Here, $N_B$ is the number of (available) beams used in the port reduction scheme.

The set of $N_B$ precoded signals is then transmitted over the M antenna branches by applying a M×$N_B$ spatial transformation matrix $\varphi \in \mathbb{C}^{M \times N_B}$. In practice, $\varphi$ may be chosen using different strategies offering unique performance versus complexity tradeoffs. A fixed "grid-of-beams" strategy uses a fixed matrix v forming a set of uniformly distributed spatial beams across the coverage area. A Two-Dimensional DFT (2D-DFT) represents a common example of this type. A "channel-aware" strategy based on, for example, the Singular Value Decomposition (SVD) of the channel matrix can offer improved performance in certain conditions.

The CRAM algorithm operates on the signals output from the spatial transformation. To achieve the desired PAPR reduction, both the ZF precoding $P_n^{ZF}$ and CRAM projection matrix $C_n$ must be modified to take account of the specific spatial transformation matrix $\varphi$ used for port reduction.

Figure 8:
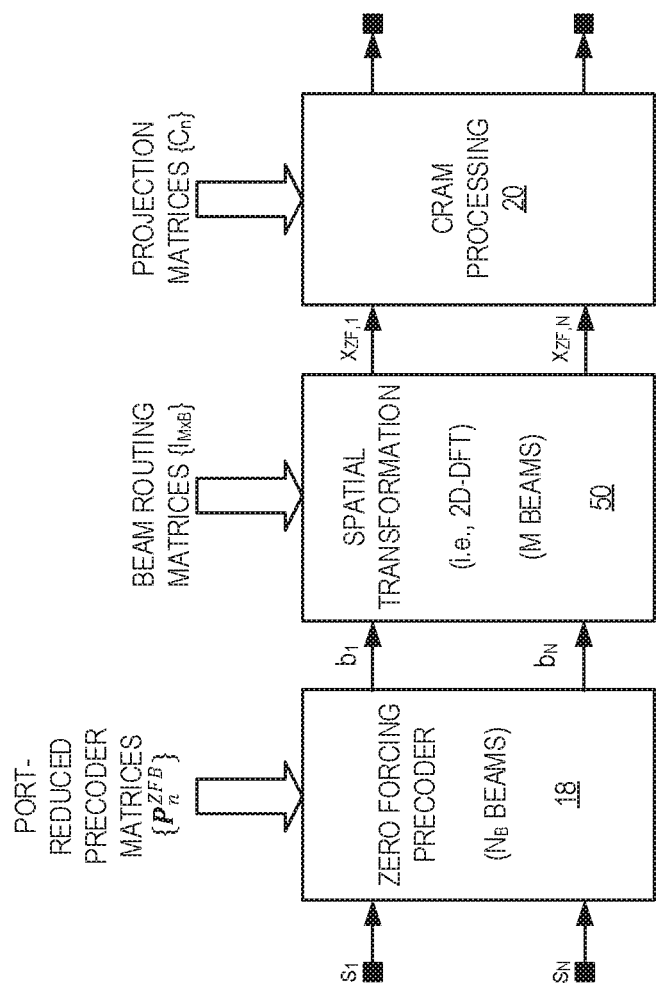
FIG. 8 illustrates the baseband processing system of the transmitter system of FIG. 4 that implements a CRAM algorithm with port reduction according to some embodiments of the present disclosure.

In this regard, FIG. 8 illustrates the baseband processing system 12 of the transmitter system 10 that implements a CRAM algorithm with port reduction according to some embodiments of the present disclosure. As illustrated, the ZF precoder 18 receives the N frequency-domain input signals $s_n$ and performs digital beamforming individually on each frequency-domain input signal $s_n$ using a respective port-reduced ZF precoding matrix $P_n^{ZFB}$ to produce N port reduced frequency-domain precoded signals $b_n \in \mathbb{C}^{N_B \times 1}$ for n=1, ..., N. A spatial transformation function 50 applies a M×$N_B$ spatial transformation matrix $\varphi \in \mathbb{C}^{M \times N_B}$ to each of the N port-reduced frequency-domain precoded signals $b_n$ to provide the N frequency-domain precoded signals $x_n^{ZF} \in \mathbb{C}^{M \times 1}$.

The CRAM processing system 20 performs a CRAM algorithm on the N frequency-domain precoded signals $x_n^{ZF} \in \mathbb{C}^{M \times 1}$. In some embodiments, the CRAM algorithm is the conventional CRAM algorithm of Equations 6 and 7. In some other embodiments, the CRAM algorithm is the CRAM algorithm of Equations 10 and 11, which includes per-antenna PAPR reduction as described above.

Figure 9:
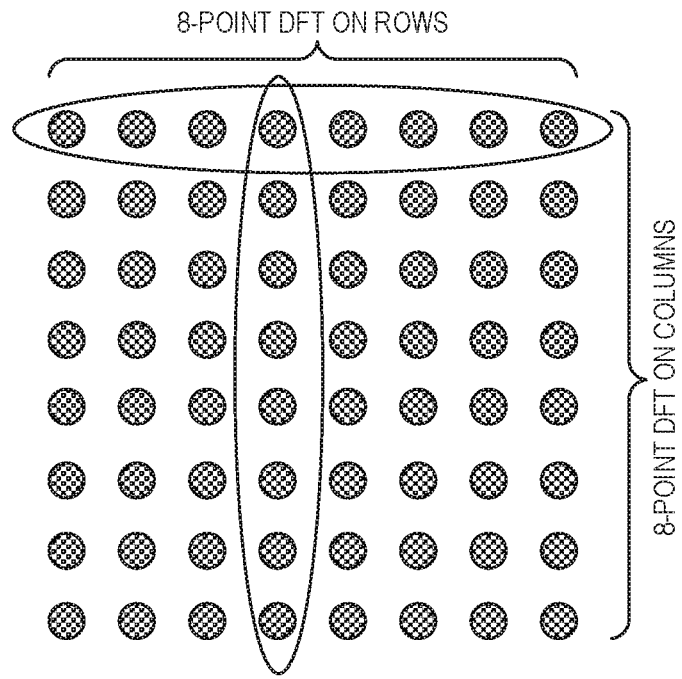
FIG. 9 illustrates an example Two Dimensional Discrete Fourier Transform (2D-DFT) antenna array concept.

To illustrate how ZF precoding and the CRAM algorithm can be extended to support port reduction, a fixed "grid-of-beams" strategy for the spatial transformation is used as an example. For simplicity, consider the 2D-DFT antenna array concept shown in FIG. 9. The antenna array supports M=64 beams in total using an 8×8 square grid of elements. To transmit a set of $N_B$ beams from the array, one must excite a subset of $N_B < M$ of the available antenna elements with the desired input beam signals while driving the remaining $N_B - M$ elements with zero-valued signals. The 2D-DFT spatial transformation will then first apply a One Dimensional DFT (1D-DFT) in the horizontal direction on each row of elements, followed by a second 1D-DFT (applied to the outputs of the first transform) in the vertical direction on each column of elements.

For this array configuration, the spatial transformation matrix v may be expressed as in Equation 12, where $I_{M \times N_B}$ is a routing matrix with $N_B$ ones in total distributed across its M rows such that there is at most one non-zero entry per row and both $R_H$ and $R_V$ are matrices related to the 1D DFT transformations performed on the rows and columns, respectively, of the array.

Equation 12: 2D-DFT Spatial Transformation Matrix.

$$\varphi = R_V R_H I_{M \times B}$$

ZF Precoding Modifications to Support Port Reduction: To achieve ZF precoding, the port reduced system applies a $N_B \times M$ precoding matrix $P_n^{ZFB} \in \mathbb{C}^{K \times N_B}$ to form a reduced set of $N_B < M$ beams such that $\hat{s} \cong s$. To make this true, the precoding must be designed to satisfy $\hat{s} = H_n \cdot \varphi \cdot P_n^{ZFB} \cdot s \cong s$. It follows that $P_n^{ZFB} = (H_n \cdot \varphi)^\dagger$ as shown in Equation 13.

Equation 13: ZF Precoding Solution with Port Reduction to B Ports.

$$P_n^{ZFB} = (H_n \cdot \varphi)^\dagger$$
$$= (H_n \cdot R_V R_H I_{M \times B})^\dagger$$

CRAM Modifications to Support Port Reduction: To support port reduction, the CRAM X-update reproduced in Equation 14 (for convenience) must be modified to account for $P_n^{ZFB} \in \mathbb{C}^{K \times N_B}$ and $\varphi$.

Equation 14: Conventional CRAM X-Update Prior to Modification for Port Reduction.

$$x_n^{(k)} = z_n^{(k-1)} - P_n^{ZF}(H_n z_n^{(k-1)} - s_n), \forall n \in \mathcal{T}$$

Figure 10:
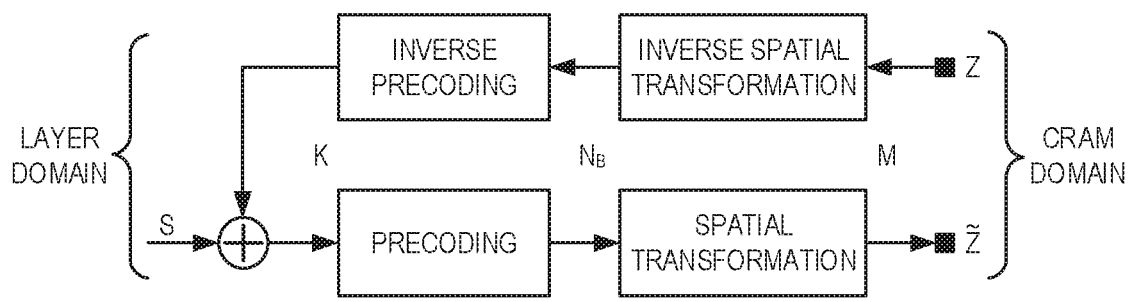
FIG. 10 illustrates the derivation of the CRAM X-update for port reduction.

The CRAM $z_n^{(k)}$ accumulator lies in the antenna branch domain, but must be transformed into the layer domain before it can be compared to $s_n$. FIG. 10 shows how this is done. First, an inverse spatial transformation (given by $\varphi^\dagger$) is applied to transform from the antenna domain to the beam domain (of dimension $N_B$). Then, an inverse precoding operation (given by $P_n^{ZFB\dagger}$) transforms the beam domain result to the layer domain (of dimension K). Once in the layer domain, the transformed $z_n^{(k)}$ may be compared to $s_n$ and then the result may be brought back to the antenna domain by precoding with $P_n^{ZFB}$ followed by applying the spatial transformation matrix $\varphi$.

Equation 14 provides the final CRAM X-update modified for port reduction based on the description above. The simplifications involve substitution of $P_n^{ZFB}$ into Equation 7 (or alternatively Equation 11), and then writing $(H_n \cdot \varphi)^\dagger = \varphi^\dagger H_n^\dagger$ and simplifying when the spatial transformation matrix is multiplied by its right pseudo-inverse (i.e., $\varphi \varphi^\dagger \equiv I$).

Equation 15: CRAM X-Update Modified for Port Reduction $$\begin{aligned} x_n^{(k)} &= z_n^{(k-1)} - \varphi P_n^{ZFB}(P_n^{ZFB\dagger} \varphi^\dagger z_n^{(k-1)} - s_n), \forall n \in \mathcal{T} \\ &= z_n^{(k-1)} - \varphi(H_n \cdot \varphi)^\dagger (H_n \cdot \varphi) \varphi^\dagger z_n^{(k-1)} + \varphi P_n^{ZFB} s_n \\ &= z_n^{(k-1)} - \varphi \varphi^\dagger H_n^\dagger H_n \varphi \varphi^\dagger z_n^{(k-1)} + \varphi P_n^{ZFB} s_n \\ &= z_n^{(k-1)} - H_n^\dagger H_n z_n^{(k-1)} + \varphi P_n^{ZFB} s_n \\ &= (I - H_n^\dagger H_n) z_n^{(k-1)} + \varphi P_n^{ZFB} s_n \\ &\equiv C_n z_n^{(k-1)} + x_n^{ZF} \end{aligned}$$

The following points highlight the modifications provided by the embodiments of the present disclosure to extend the reciprocity-based ZF precoding system with CRAM to support port reduction:

The vector $x_n^{ZF} \equiv \varphi P_n^{ZFB} s_n$ provides the ZF solution for the port-reduced system.

The CRAM projection matrix $C_n = (I - H_n^\dagger H_n)$ is independent of the spatial transformation matrix $\varphi$ and can be used to affect a PAPR reduction in the port-reduced system.

Figure 11:
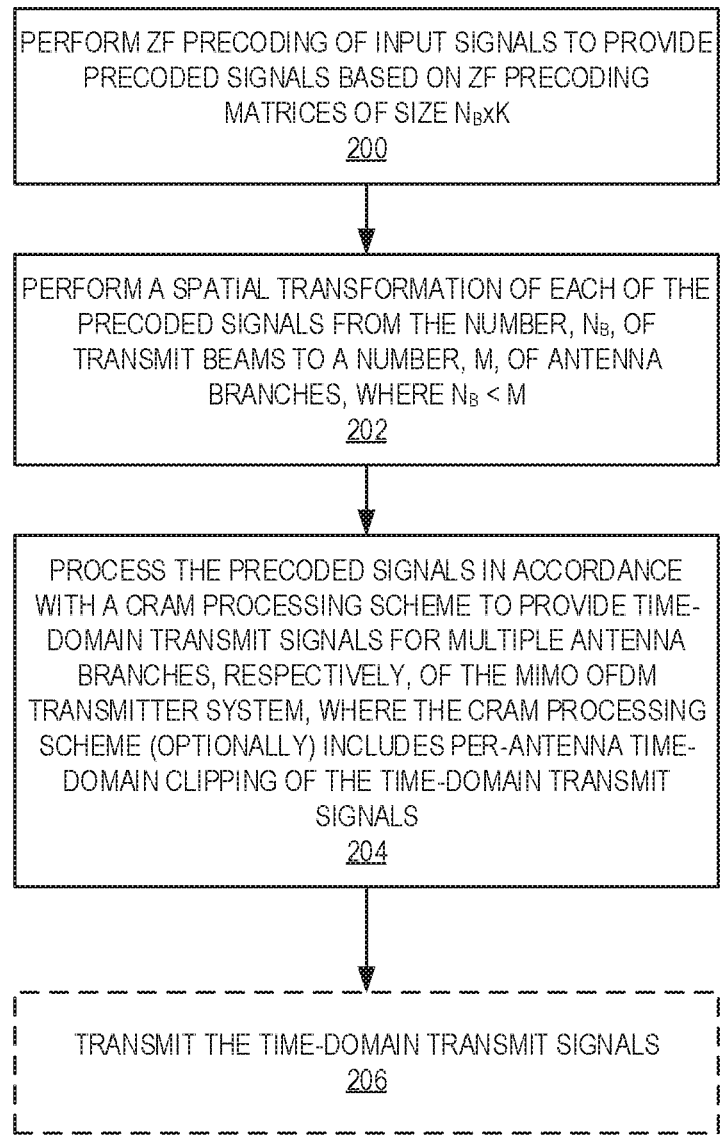
FIG. 11 is a flow chart that illustrates the operation of the transmitter system in accordance with some embodiments of the present disclosure in which port reduction is provided.

FIG. 11 is a flow chart that illustrates the operation of the transmitter system 10 in accordance with some embodiments of the present disclosure. As illustrated, the transmitter system 10, and in particular the baseband processing system 12, performs (e.g., ZF) precoding of the frequency-domain input signals $s_n$ for n=1, . . . , N to provide the N port-reduced frequency-domain precoded signals, as described above (step 200). Note that while ZF precoding is used for the examples described herein, other types of precoding may be used. The transmitter system 10, and in particular the baseband processing system 12, performs a spatial transformation of each of the N port-reduced frequency-domain precoded signals from the number ($N_B$) of transmit beams to the number (M) of antenna branches where $N_B$<M to thereby provide the N frequency-domain precoded signals $x_n^{ZF}$, as described above (step 202).

The transmitter system 10, and in particular the baseband processing system 12, processes the frequency-domain precoded signals $x_n^{ZF}$ for n=1, . . . , N in accordance with a CRAM processing scheme to provide M time-domain transmit signals for the M antenna branches of the transmitter system 10 (step 204). The CRAM processing scheme may be, e.g., the CRAM processing scheme of Equations 6 and 7 or the CRAM processing scheme of Equations 10 and 11, which includes per-antenna time-domain PAPR reduction (e.g., clipping) of the M time-domain transmit signals. Optionally, the transmitter system 10, and in particular the RF transmitter system 14, transmits the M time-domain transmit signals (step 206).

Any port reduced reciprocity-based system can achieve a significant PAPR reduction using the extensions to CRAM and the ZF precoding system provided by embodiments of the present disclosure. This applies for any number of beams $N_B$<M, and for any spatial transformation matrix $\varphi$.

CRAM Extension for Multi-Cell Interference Scenarios

Some embodiments of the present disclosure extend the conventional CRAM algorithm of Equations 6 and 7, the CRAM algorithm of Equations 10 and 11 that provide per-antenna time-domain PAPR, or the extension of the CRAM algorithm that supports port reduction described above to support RAIT transmission through the following modifications. First, the spatial constraints of the CRAM algorithm are extended to include a new spatial beamforming constraint that forces all inter-cell interference to zero. The CRAM algorithm thus modified then enforces both this new inter-cell interference constraint while at the same time maintaining its original spatial constraints to affect the desired home-cell beamforming. Secondly, three different methods of incorporating, into the CRAM algorithm, Channel State Information (CSI) that characterizes the radio propagation medium between the interfering cell and the home cell are disclosed. Embodiments of the present disclosure incorporate into the CRAM iterations knowledge of the respective radio link's MIMO channel matrix $H_{Inter}$, its covariance matrix $\Lambda = \hat{H}_{Inter}^H \cdot \hat{H}_{Inter}$, or a smoothed estimate $\hat{\Lambda}_f$ of that covariance matrix so that practical PAPR reduction can be achieved for multi-cell systems employing RAIT for inter-cell interference mitigation.

A discussion will now be provided to demonstrate how the CRAM X-update procedure can be modified to incorporate inter-cell CSI to allow multi-cell operation using RAIT.

CRAM for RAIT with Perfect Channel Matrix Information:

In this subsection, we will assume that the transmitter system 10 is a base station that can estimate the inter-channel response $H_{Inter}$. From Equation 7 for the conventional CRAM algorithm:

$$\begin{aligned} x_n^{(k)} &= z_n^{(k-1)} - P_n^{ZF}(H_n z_n^{(k-1)} - s_n), n \in \mathcal{T} \\ &= (I - P_n^{ZF} H_n) \cdot z_n^{(k-1)} + P_n^{ZF} \cdot s_n \\ &\equiv C_n \cdot z_n^{(k-1)} + x_n^{ZF} \end{aligned}$$

But from Equation 1, the precoding matrix $P_n^{ZF}$ is given by the pseudo-inverse of the channel matrix, $P_n^{ZF} = H_n^\dagger = H_n^H (H_n H_n^H)^{-1}$. Therefore, Equation 7 can be effectively rewritten as:

$$x_n^{(k)} = H_n^\dagger \cdot s_n + (I - H_n^\dagger H_n) \cdot z_n^{(k-1)}, n \in \mathcal{T}$$

This equation can be extended to RAIT by expressing the CRAM X-update as follows in Equation 16.

Equation 16: CRAM X-Update for RAIT with Perfect Channel Matrix Information $$x_n^{(k)} = \begin{bmatrix} H_{intra,n} \\ H_{inter,n} \end{bmatrix}^\dagger \cdot \begin{bmatrix} s_n \\ 0 \end{bmatrix} + \left( I - \begin{bmatrix} H_{intra,n} \\ H_{inter,n} \end{bmatrix}^\dagger \begin{bmatrix} H_{intra,n} \\ H_{inter,n} \end{bmatrix} \right) \cdot z_n^{(k-1)}, n \in \mathcal{T}$$

The "intra" label to the MIMO channel matrix refers to the current cell, and the "inter" label for the MIMO channel matrix refers to the interfering cell. The dimensions are the same for both matrices (i.e., L×M for L layers and M antennas). However, it is also possible that the desired cell uses $K_{intra}$ layers and the interfering cell uses $K_{inter}$ layers. In that case, $H_{intra,n}$ is a $K_{intra}$×M matrix, and $H_{inter,n}$ is a $K_{inter}$×M matrix. These two can still be stacked as shown in Equation 16 and the solution will work. So, there is no restriction that both cells need to use the same number of layers. Note that Equation 11 for the CRAM algorithm that uses per-antenna time-domain PAPR reduction can be rewritten in the same manner.

Using the X-update of Equation 16 will enforce both the zero-EVM and zero-interference constraints.

CRAM for RAIT with Perfect Covariance Information:

In practice, the base station does not typically have access to the inter-cell channel $H_{Inter}$ matrix. Instead, the base station can only estimate the covariance matrix $\Lambda = \hat{H}_{Inter}^H \cdot \hat{H}_{Inter}$. Here, the X update equation is reformulated to use only the covariance matrix $\Lambda$.

While the RAIT equation solved the problem [6]

$$W = \underset{W}{\operatorname{argmin}} \left\| \begin{bmatrix} H^{DL} \\ G^{DL} \end{bmatrix} W - \begin{bmatrix} H^{ref} \\ 0 \end{bmatrix} \right\|_{fro}^2$$

with a form equivalent to a Tikhonov regularization, the problem is reformulated as a generalized Tikhonov like problem more suitable for iterative approaches. Applying similar derivation to the CRAM/RAIT problem leads to the following equations:

$$K = (\hat{H}_{Intra}^H \hat{H}_{Intra} + \Lambda)^{-1}; \Theta = \hat{H}_{Intra}^H \cdot \hat{H}_{Intra}; \Lambda H_{Inter}^H \cdot \hat{H}_{Inter}$$

$$x_n^{(k)} = z_n^{(k-1)} - K \cdot \hat{H}_{Intra}^H (\hat{H}_{Intra} z_n^{(k-1)} - s_n) - K \cdot \Lambda \cdot z_n^{(k-1)}$$

The equivalent X-update equation is given in Equation 17.

Equation 17: CRAM X-update for RAIT with Perfect Covariance Information $$x_n^{(k)} = KH_{intra,n}^H \cdot s_n + (I - K\Theta - K\Lambda) \cdot z_n^{(k-1)}, n \in \mathcal{T}$$

Note that the X-update in Equation 17 was extended with the term $K \cdot \Lambda z_n^{(k-1)}$ instead of being augmented with the pseudo-inverse involving $H_{Inter}$ as in the X-update when using perfect channel matrix information.

CRAM for RAIT with Imperfect Covariance Information:

In practice, the base station does not have an ideal measurement of the covariance matrix $\Lambda$. Instead, the base station estimates the covariance matrix. The estimated covariance matrix is denoted as $\hat{\Lambda}$. In some embodiments, the channel covariance estimation described in [6] is applied to generate the estimated covariance matrix $\hat{\Lambda}$.

When using the estimated covariance matrix $\hat{\Lambda}$, the new X-update equation is given by:

$$K = (\hat{H}_{Intra}^H \hat{H}_{Intra} + \hat{\Lambda})^{-1}; \Theta = \hat{H}_{Intra}^H \cdot \hat{H}_{Intra};$$

$$\hat{\Lambda}_f = \frac{1}{N_{isc}} \sum_{f - \frac{N_{isc}}{2} < \bar{f} < f + \frac{N_{isc}}{2}} \Lambda_{\bar{f}} \Lambda_{\bar{f}}^H$$

$$x_n^{(k)} = z_n^{(k-1)} - K \cdot \hat{H}_{Intra}^H (\hat{H}_{Intra} z_n^{(k-1)} - s_n) - K \cdot \hat{\Lambda} \cdot z_n^{(k-1)}$$

The equivalent X update equation is given by Equation 18:
Equation 18: CRAM X-Update for RAIT with Imperfect Covariance Information $$x_n^{(k)} = KH_{intra,n}^H \cdot s_n + (I - K\Theta - K\hat{\Lambda}) \cdot z_n^{(k-1)}, n \in \mathcal{T}$$

Figure 12:
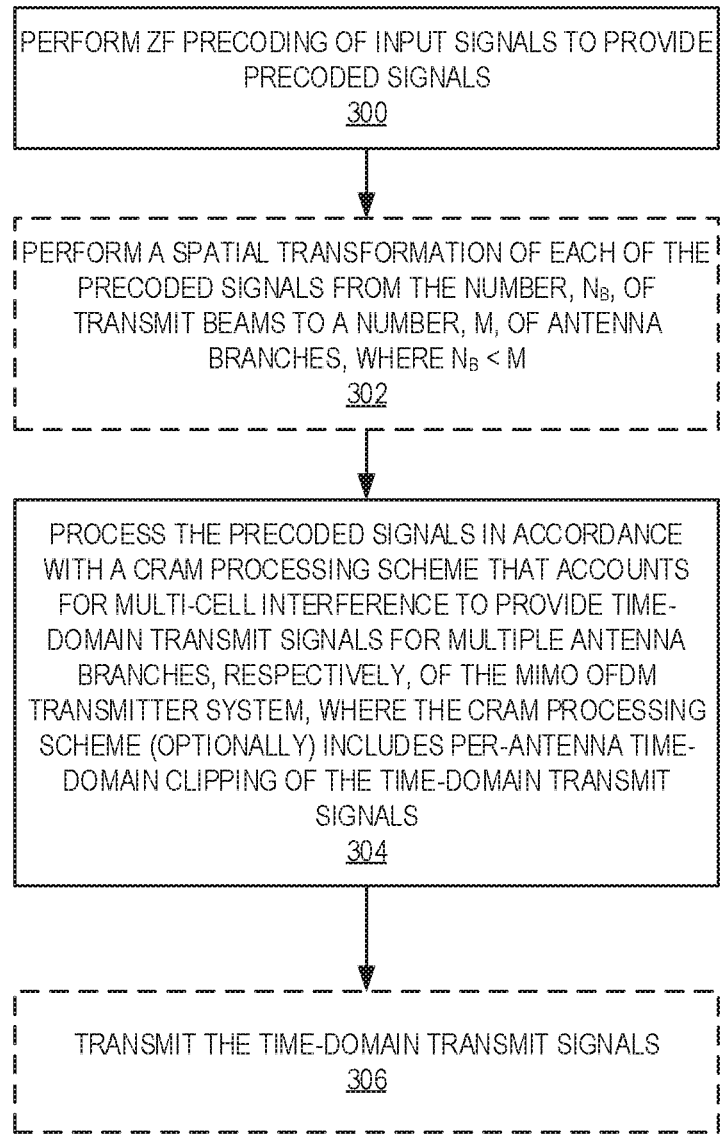
FIG. 12 is a flow chart that illustrates the operation of the transmitter system of FIG. 4 in accordance with some embodiments of the present disclosure in which the CRAM algorithm is extended for multi-cell interference scenarios.

FIG. 12 is a flow chart that illustrates the operation of the transmitter system 10 in accordance with some embodiments of the present disclosure in which the CRAM algorithm is extended for multi-cell interference scenarios. The CRAM algorithm used here may be the conventional CRAM algorithm of Equations 6 and 7, the CRAM algorithm of Equations 10 and 11 in which per-antenna time-domain PAPR reduction is performed, or the CRAM algorithm described above that supports port reduction, where the CRAM algorithm is extended to for multi-cell interference scenarios by using the X-update of Equation 16, 17, or 18. This process is performed by the transmitter system 10 of FIG. 4 using, e.g., the architecture for the CRAM processing system 20 of FIG. 5 or the architecture for the baseband processing system 12 that includes the spatial transformation function 50 of FIG. 8.

As illustrated, the transmitter system 10, and in particular the baseband processing system 12, performs (e.g., ZF) precoding of the frequency-domain input signals $s_n$ for n=1, N to provide the N (potentially port-reduced) frequency-domain precoded signals, as described above (step 300). In some embodiments, port reduction is not performed, and as such the N frequency-domain precoded signals are the N frequency-domain precoded signals $x_n^{ZF}$ for n=1, . . . , N. In some other embodiments, the N frequency-domain precoded signals are the N port-reduced frequency-domain precoded signals. If port reduction is used, then the transmitter system 10, and in particular the baseband processing system 12, performs a spatial transformation of each of the N port-reduced frequency-domain precoded signals from the number ($N_B$) of transmit beams to the number (M) of antenna branches where $N_B$<M to thereby provide the N frequency-domain precoded signals $x_n^{ZF}$, as described above (step 302). Note that step 302 is optional, as indicated by the dashed lines, depending on whether or not port reduction is used.

The transmitter system 10, and in particular the baseband processing system 12, processes the frequency-domain precoded signals $x_n^{ZF}$ for n=1, . . . , N in accordance with a CRAM processing scheme to provide M time-domain transmit signals for the M antenna branches of the transmitter system 10 (step 304). In this embodiment, the CRAM processing scheme is a CRAM processing scheme that supports multi-cell interference scenarios. In particular, the CRAM processing scheme uses frequency-domain X-update procedures in accordance with Equation 16, 17, or 18. The CRAM processing scheme may or may not provide per-antenna time-domain PAPR reduction. Optionally, the transmitter system 10, and in particular the RF transmitter system 14, transmits the M time-domain transmit signals (step 306).

By using the CRAM extensions to support RAIT, embodiments of the present disclosure provide a significant PAPR reduction for reciprocity-based ZF transmission in multi-cell environments where both PAPR reduction and zero-EVM transmission can be achieved simultaneously in conditions of significant multiple-access interference from neighboring cells.

Figure 13:
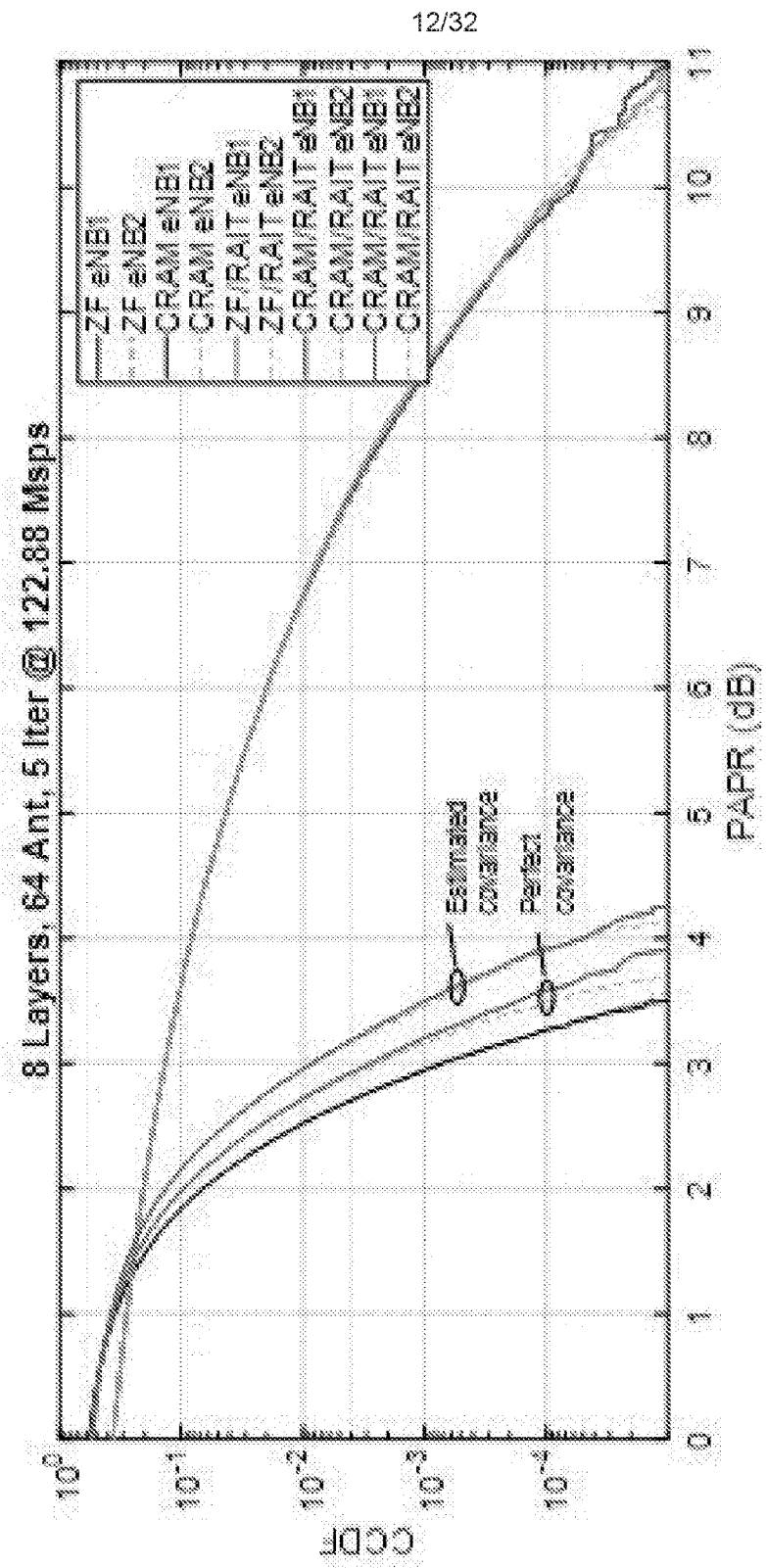
FIG. 13 shows the Complementary Cumulative Distribution Function (CCDF) performance for an example implementation of the transmitter system using a CRAM algorithm that addresses multi-cell interference for a two-cell scenario (i.e., Evolved or Enhanced Node Bs (eNB1 and eNB2)), each supporting 8-layer transmission with a 64-element array.

FIG. 13 shows the Complimentary Cumulative Distribution Function (CCDF) performance for an example implementation of the transmitter system 10 using a CRAM algorithm that addresses multi-cell interference for a two-cell scenario (i.e., Evolved or Enhanced Node Bs (eNB1 and eNB2)), each supporting 8-layer transmission with a 64-element array. The solid and dotted lines represent the performance for eNB1 and eNB2, respectively. The plots may be explained as follows:

- The blue lines show the baseline ZF performance without RAIT or CRAM for both cells. The Multi-User Interference (MUI) is very high since RAIT is not used. The PAPR is very high since CRAM is not used. Observe the large EVM that occurs for "ZF" and "CRAM" in FIG. 14 in the multi-cell environment when the RAIT algorithm is not employed. This large EVM is due to the high levels of MUI occurring in this two-cell scenario.
- The green lines show the baseline ZF performance with RAIT but without CRAM for both cells. The MUI is nearly zero due to RAIT, but the PAPR is very high since CRAM is not used. Observe the EVM is nearly zero in FIG. 14 when RAIT is employed in the multi-cell environment. RAIT removes the MUI resulting in near-zero EVM.
- The black lines show the single-cell performance of ZF with the prior art version of CRAM. There is no MUI here with a single cell, and CRAM delivers a large PAPR reduction.
- The red lines show the ZF performance with RAIT and CRAM for both cells when using perfect covariance CSI. The MUI here is nearly zero due to RAIT, and CRAM with extensions provided by the present disclosure achieves a significant PAPR reduction, nearly equivalent to that of the single-cell prior art case.
- The pink lines show the ZF performance with RAIT and CRAM for both cells when using estimated covariance CSI. Again, the MUI is nearly zero due to RAIT, and CRAM with extensions provided by the present disclosure achieves a significant PAPR reduction.

Figure 14:
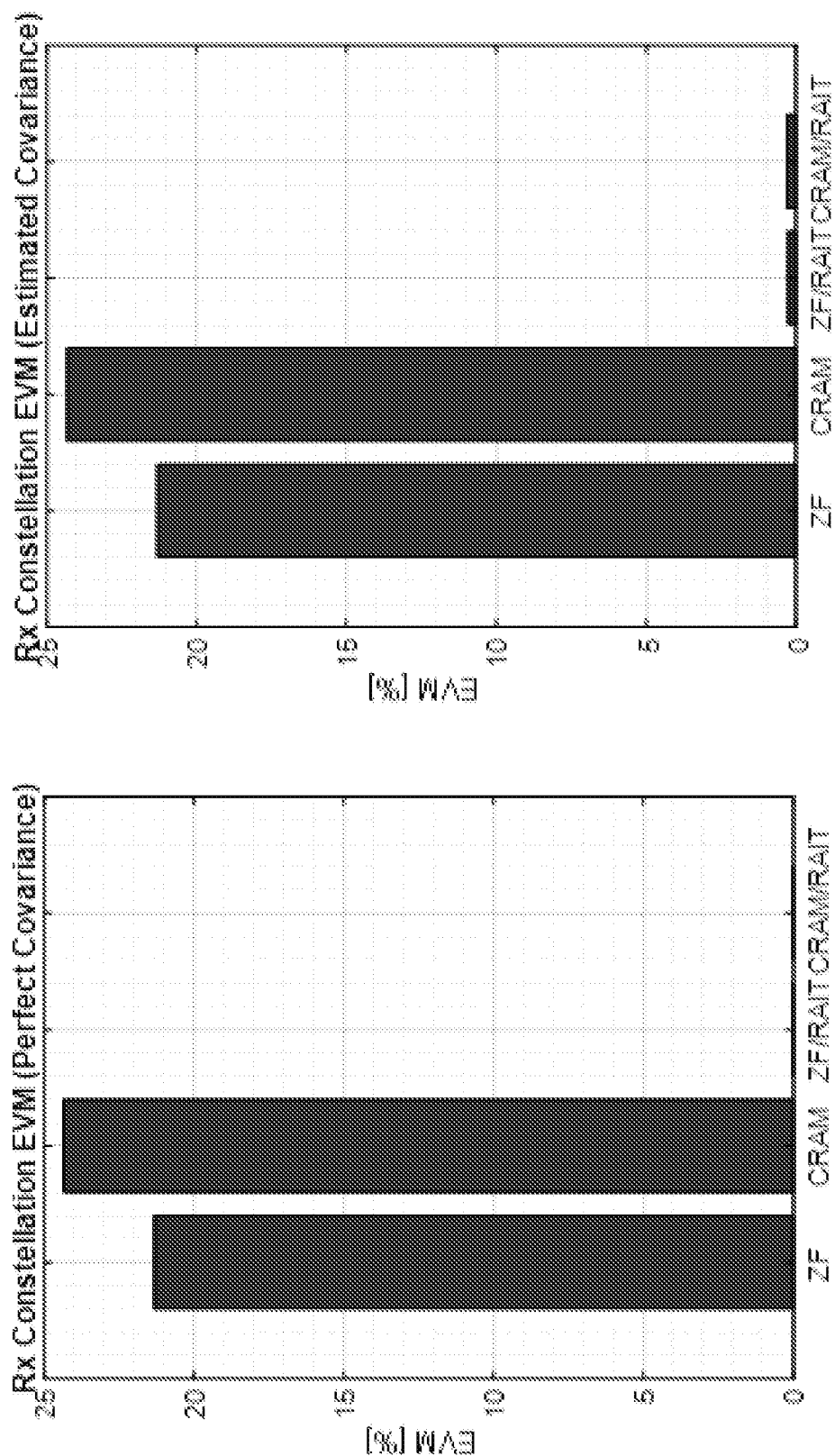
FIG. 14 illustrates an example Error Vector Magnitude (EVM) performance of ZF/CRAM with and without Reciprocity-Assisted Interference Transmission (RAIT) for perfect versus estimated covariance matrix.

FIG. 14 shows the EVM performance of the system in four cases: (i) "ZF" uses neither RAIT nor CRAM, (ii) "CRAM" uses only CRAM, (iii), "ZF/RAIT" uses only RAIT, and (iv) "CRAM/RAIT" uses both RAIT and CRAM. Here "CRAM" refers to the extended version provided by the present disclosure. Notice how the embodiment of the present disclosure allows one to achieve a significant PAPR reduction (shown in FIG. 13), while still achieving the near-zero MUI capability of RAIT with negligible EVM penalty. Also, there is only a minor degradation in performance in the case of estimated versus ideal covariance matrix knowledge.

CRAM Extension for Multi-Carrier Operation

Some embodiments of the present disclosure utilize a CRAM algorithm that extends CRAM to support multi-carrier systems through the following modifications:

- A higher sampling rate is adopted for the CRAM Y-update so that the clipping function may produce a more reliable peak cancellation that is preferable for multi-carrier signals. The PAPR reduction capability of CRAM is preserved by incorporating this high sample rate clipping directly into the iterative loop of CRAM. This sampling rate increase may be realized, e.g., by conventional time-domain interpolation filters or by zero-padding a larger dimension IFFT within the CRAM iteration.
- Tuning blocks are incorporated within the CRAM iterations so that individual carriers may be tuned from their baseband origin of the X-update into proper position within the frequency-band to construct the multi-carrier signal utilized by the Y-update. Two sets of tuning blocks are used per carrier. The first set of tuners tune the signals from baseband to their proper offsets for clipping, and the second set of tuners tunes the clipped signals back to baseband for the next CRAM iteration. Note that decimation back to the original baseband sampling rate is also performed.
- The CRAM Z-update is modified to move the CRAM Z-update from the frequency-domain to the time-domain. Consequently, the solution error difference is accumulated in the time-domain at the new higher sampling rate of the newly constructed multi-carrier signal rather than in the frequency-domain at the low sampling rate of the individual carriers. This allows the multi-carrier CRAM algorithm to achieve PAPR reduction of the multi-carrier signal comparable to that achieved for a single carrier signal.

Figure 15:
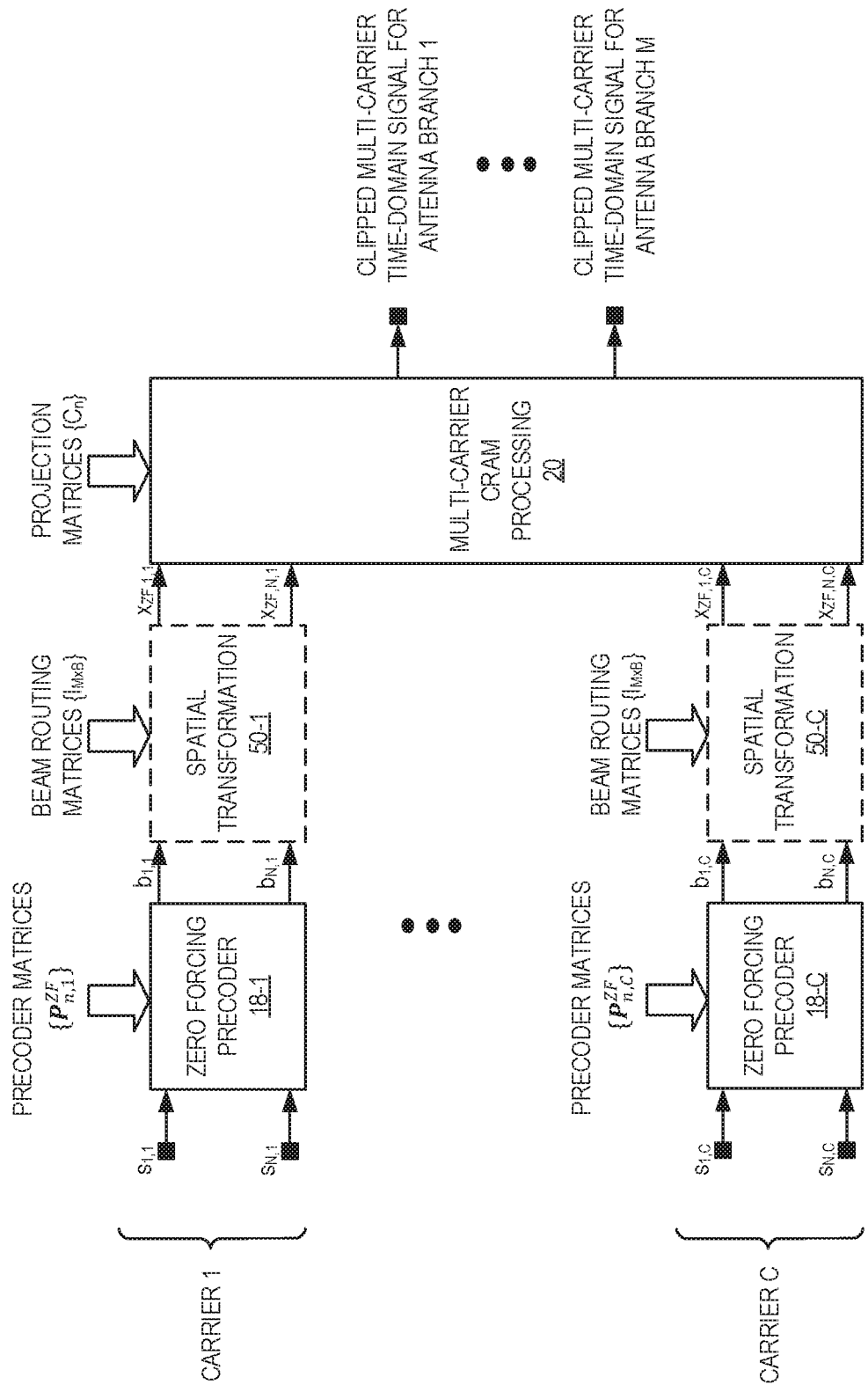
FIG. 15 illustrates the precoders, optional spatial transformation functions, and the (multi-carrier) CRAM processing system of FIG. 4 in accordance with some embodiments of the present disclosure in which the CRAM algorithm implemented by the CRAM processing system supports multi-carrier operation.

In this regard, FIG. 15 illustrates the precoders 18-1 through 18-C, optional spatial transformation functions 50-1 through 50-C, and the (multi-carrier) CRAM processing system 20 in accordance with some embodiments of the present disclosure in which the CRAM algorithm implemented by the CRAM processing system 20 supports multi-carrier operation. Here, C is the number of carriers, where C is greater than or equal to 2. As illustrated, in this example, the precoders 18-1 through 18-C are ZF precoders, which for consistency are referred to as ZF precoders 18-1 through 18-C.

The ZF precoder 18-c for c=1, ..., C receives a number (N) of frequency-domain input signals $s_{n,c} \in \mathbb{C}^{K \times 1}$ for n=1, ..., N for the c-th carrier. The frequency-domain input signals $s_{n,c}$ are also referred to herein a layer-domain input vectors for the c-th carrier. The number N is the number of layers in the layer-domain for the c-th carrier, where N is also the number of tones (i.e., OFDM tones or subcarriers) for the c-th carrier. Note that since the bandwidth and thus the number of tones for each carrier may vary, then N may also vary from one carrier to another. The ZF precoder 18-c is a linear precoder that performs digital beamforming individually on each frequency-domain input signal $s_{n,c}$ using a respective ZF precoding matrix $P_{n,c}^{ZF}$ to produce a respective frequency-domain precoded signal $x_{n,c}^{ZF} \in \mathbb{C}^{M \times 1}$ for the c-th carrier. The ZF precoder 18-c operates on total of $|\mathcal{T}|$ tones for the c-th carrier and the remaining $|\mathcal{T}^C|$ tones for the c-th carrier are unused and set to zero, where $|\mathcal{T}|+|\mathcal{T}^C|=N$. The precoder matrix $P_{n,c}^{ZF}$ is set to the "right pseudo-inverse" $H_{n,c}^\dagger$ of the MIMO channel matrix $H_{n,c}$ for the c-th carrier as shown in Equation 19. The ZF precoder 18-c enforces the spatial constraints given in Equation 20 for the c-th carrier such that tone $x_{n,c}^{ZF}=P_{n,c}^{ZF}s_{n,c}$ is received at the UE as $H_{n,c}x_{n,c}^{ZF}=H_{n,c}P_{n,c}^{ZF}s_{n,c}=H_{n,c}H_{n,c}^\dagger s_{n,c}=s_{n,c}$, and so this ZF precoding scheme removes all multiple access interference between layers in the ideal case.

Equation 19: ZF Precoding Solution $$P_{n,c}^{ZF}=H_{n,c}^\dagger=H_{n,c}^H(H_{n,c}H_{n,c}^H)^{-1}$$

Equation 20: ZF Spatial Constraints for a Given Tone Index n.

$$s_{n,c}=H_{n,c}x_{n,c}^{ZF}, n \in \mathcal{T}$$

$$s_{n,c}=0^{K \times 1}, n \in \mathcal{T}^C.$$

Each of the N precoded vectors $x_{n,c}^{ZF}$ for the c-th carrier contains M samples to be distributed evenly across the M antenna branches after performing respective CRAM X-updates, as described below. The frequency-domain precoded vectors $x_{n,c}^{ZF}$ for n=1, ..., N for the c-th carrier (also referred to herein as frequency-domain precoded signals $x_{n,c}^{ZF}$ for n=1, ..., N for the c-th carrier) are provided to the CRAM processing system 20.

Alternatively, if port reduction is used, the ZF precoder 18-*c* for c=1, ..., C receives the N frequency-domain input signals $s_{n,c}$ for the c-th carrier and performs digital beamforming individually on each frequency-domain input signal $s_{n,c}$ using a respective port-reduced ZF precoding matrix $P_{n,c}^{ZFB}$ to produce N port reduced frequency-domain precoded signals $b_{n,c} \in \mathbb{C}^{N_B \times 1}$ for n=1, ..., N for the c-th carrier. A spatial transformation function 50-*c* applies a $M \times N_B$ spatial transformation matrix $\varphi \in \mathbb{C}^{M \times N_B}$ to each of the N port-reduced frequency-domain precoded signals $b_{n,c}$ for the c-th carrier to provide the N frequency-domain precoded signals $x_{n,c}^{ZF} \in \mathbb{C}^{M \times 1}$ for the c-th carrier.

Figure 16A:
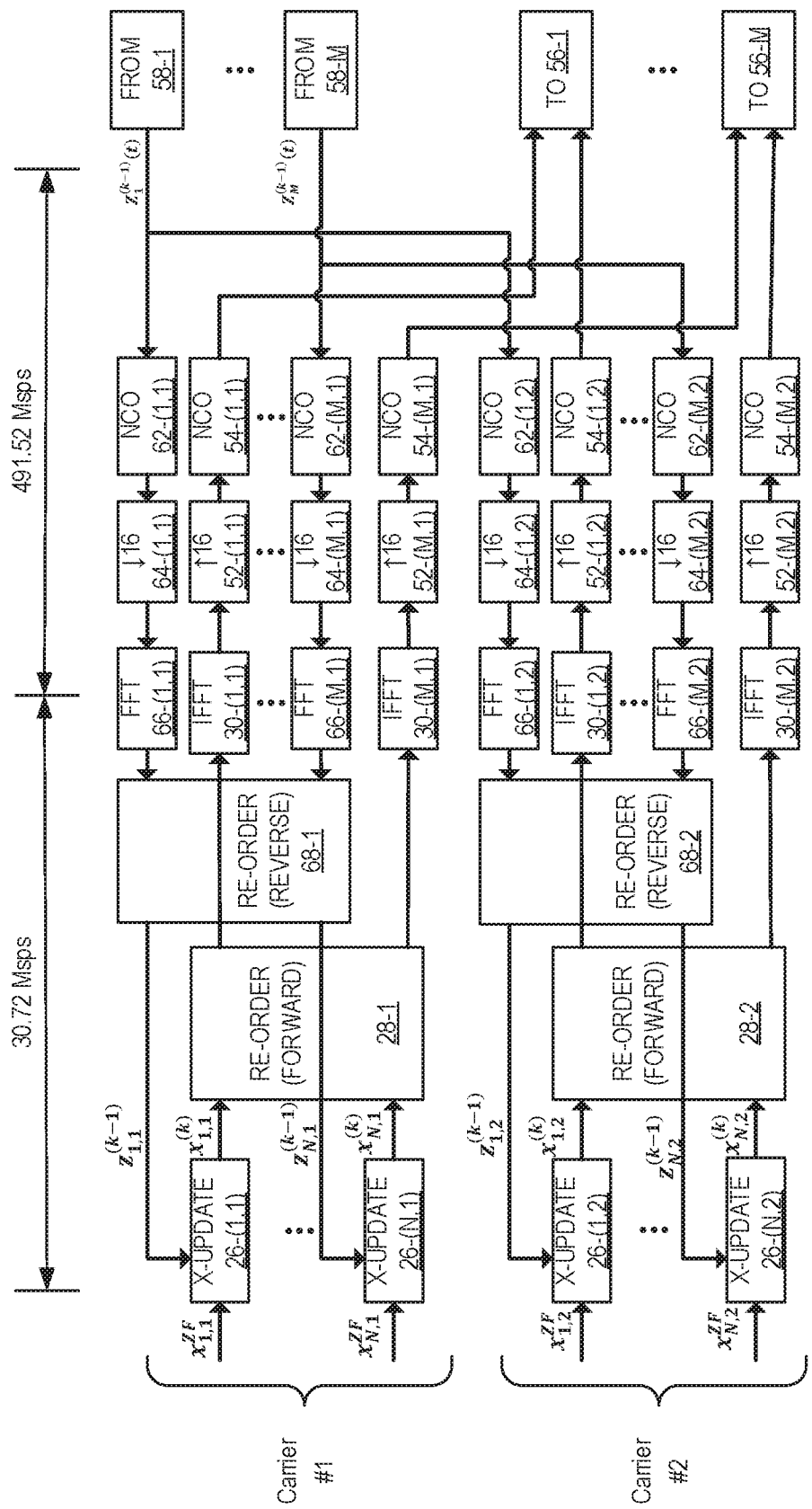
FIGS. 16A and 16B illustrate one example of the CRAM processing system of FIG. 15 that implements a multi-carrier CRAM algorithm.
Figure 16B:
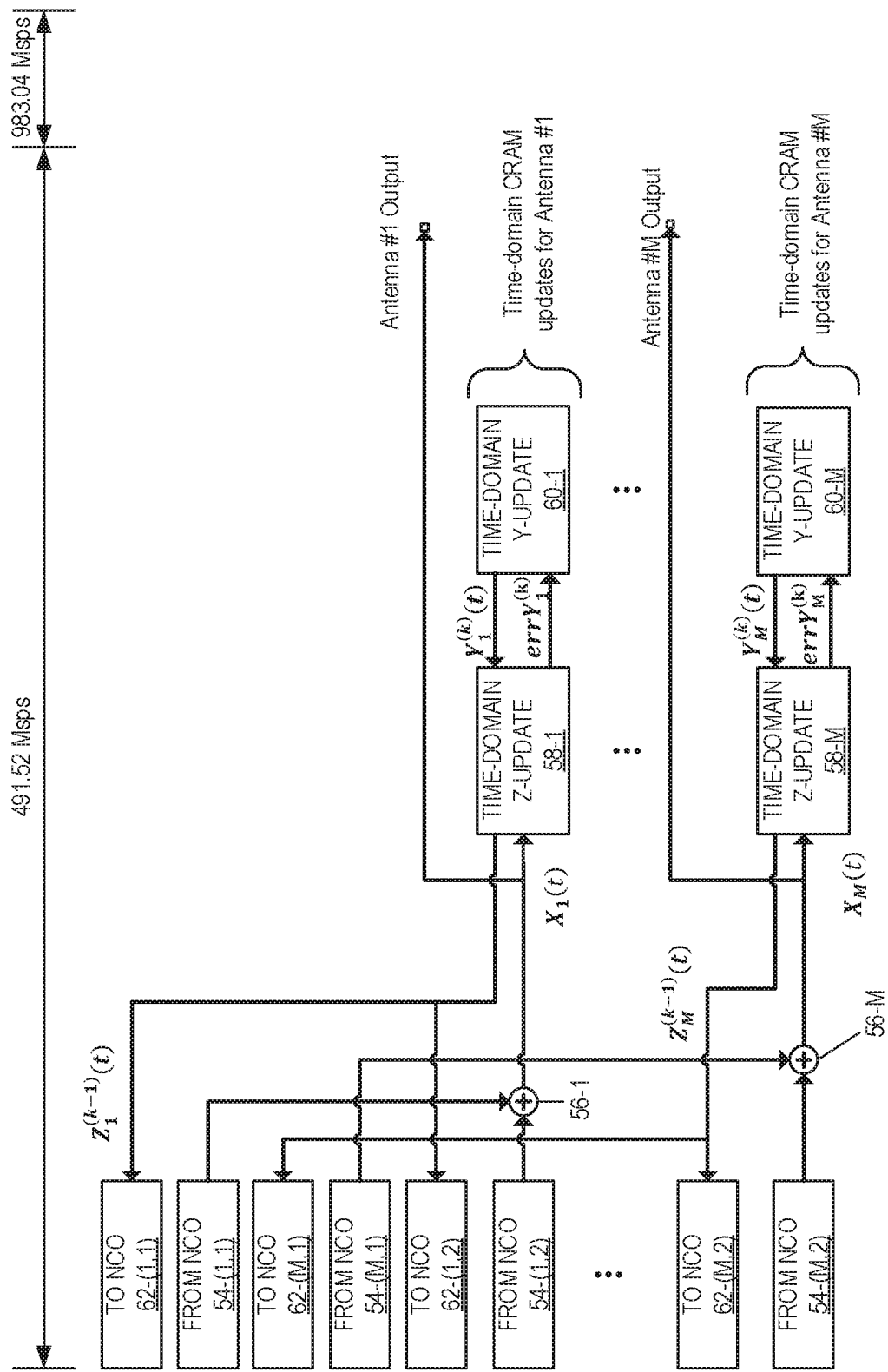

The CRAM processing system 20 performs a multi-carrier CRAM algorithm to generate M multi-carrier time-domain transmit signals for the M antenna branches, respectively. FIGS. 16A and 16B illustrate one example of the CRAM processing system 20 of FIG. 15 that implements a multi-carrier CRAM algorithm. For clarity and ease of discussion, there are only two carriers in the example of FIGS. 16A and 16B. However, the architecture in FIGS. 16A and 16B can be extended to any number of two or more carriers.

The CRAM processing system 20 of FIGS. 16A and 16B operates to perform a multi-carrier CRAM algorithm as follows. Looking first at the first carrier (i.e., Carrier #1), a number of X-update functions 26-(1,1) through 26-(N,1) operate to perform frequency-domain X-update procedures for the N tones for n=1, ..., N for the first carrier, respectively, in accordance with the X-update procedure of Equation 7 (conventional), the X-update procedure of Equation 11 (for CRAM with per-antenna time-domain PAPR reduction), the X-update procedure of Equation 15 (CRAM with port reduction), or the X-update procedure of one of Equations 16 to 18 (CRAM for multi-cell interference scenarios).

In the forward direction, the frequency-domain X-update outputs $x_{n,1}^{(k)}$ for n=1, ..., N for the first carrier are provided to a re-ordering function 28-1 for the first carrier that re-orders the frequency-domain X-update outputs $x_{n,1}^{(k)}$ for the first carrier to generate a new set of M vectors $a_{m,1}$ for the first carrier, each containing N frequency-domain samples. In other words, each of the N frequency-domain X-update outputs $x_{n,1}^{(k)}$ for the first carrier contains M samples that are distributed evenly across the M antenna branches via the re-ordering function 28-1. The re-ordered vectors $a_{m,1}$ for m=1, ..., M (also referred to herein as re-ordered signals) are converted from the frequency-domain to the time-domain via respective IFFTs 30-(1,1) through 30-(M,1) to provide M time-domain signals for the M antenna branches, respectively, for the first carrier. While not illustrated, time-domain processing such as P/S conversion and CP insertion may be performed.

Interpolators 52-(1,1) through 52-(M,1) interpolate the M time-domain signals for the first carrier from a lower sampling rate used for the frequency-domain processing to a higher sampling rate. In this example, the first and second carriers are 20 MHz carriers, and the IFFTs (for both the first carrier and the second carrier) are 2048 point carriers, where the lower sampling rate is 30.72 Mega-Samples Per Second (Msps) and the higher sampling rate is 491.52 Msps. Note that these sampling rates are only examples. Other sampling rates may be used. Further, the interpolators 52-(1,1) through 52-(M,1) are upsamplers in this example, but any time-domain interpolation technique may be used. The upsamplers may be implemented as a number of cascaded filters. Since the carriers are centered around 0 Hz, the filter requirements can be relaxed as we progress through the interpolation chain. Further, upsampling may alternatively be performed in the frequency-domain by using larger IFFTs 30-(1,1) through 30-(M,1) and zero-padding the additional subcarriers.

The M interpolated time-domain signals for the first carrier are tuned to an appropriate frequency offset for the first carrier by, in this example, corresponding Numerically Controlled Oscillators (NCOs) 54-(1,1) through 54-(M,1). The NCOs 54-(1,1) through 54-(M,1) may be implemented using a Look Up Table (LUT) or Coordinate Rotation Digital Computer (CORDIC) techniques, as will be appreciated by one of ordinary skill in the art. Note that there are no restrictions on the positions of the carriers (i.e., any desired carrier frequencies can be used). The M tuned time-domain signals for the first carrier are input to M combiners 56-1 through 56-M, respectively.

Turning to the second carrier (i.e., Carrier #2), a number of X-update functions 26-(1,2) through 26-(N,2) operate to perform frequency-domain X-update procedures for the N tones for n=1, ..., N for the second carrier, respectively, in accordance with the X-update procedure of Equation 7 (conventional), the X-update procedure of Equation 11 (for CRAM with per-antenna time-domain PAPR reduction), the X-update procedure of Equation 15 (CRAM with port reduction), or the X-update procedure of one of Equations 16 to 18 (CRAM for multi-cell interference scenarios).

In the forward direction, the frequency-domain X-update outputs $x_{n,2}^{(k)}$ for n=1, ..., N for the second carrier are provided to a re-ordering function 28-2 for the second carrier that re-orders the frequency-domain X-update outputs $x_{n,2}^{(k)}$ for the second carrier to generate a new set of M vectors $a_{m,2}$ for the second carrier, each containing N frequency-domain samples. In other words, each of the N frequency-domain X-update outputs $x_{n,2}^{(k)}$ for the second carrier contains M samples that are distributed evenly across the M antenna branches via the re-ordering function 28-2. The re-ordered vectors $a_{m,2}$ for m=1, ..., M (also referred to herein as re-ordered signals) are converted from the frequency-domain to the time-domain via respective IFFTs 30-(1,2) through 30-(M,2) to provide M time-domain signals for the M antenna branches, respectively, for the second carrier. While not illustrated, time-domain processing such as P/S conversion and CP insertion may be performed.

The interpolators 52-(1,2) through 52-(M,2) interpolate the M time-domain signals for the second carrier from the lower sampling rate used for the frequency-domain processing to the higher sampling. Again, in this example, the first and second carriers are 20 MHz carriers, and the IFFTs (for both the first carrier and the second carrier) are 2048 point carriers, where the lower sampling rate is 30.72 Msps and the higher sampling rate is 491.52 Msps. Note that these sampling rates are only examples. Other sampling rates may be used. Further, the interpolators 52-(1,2) through 52-(M,2) are upsamplers in this example, but any time-domain interpolation technique may be used. The upsamplers may be implemented as a number of cascaded filters. Since the carriers are centered around 0 Hz, the filter requirements can be relaxed as we progress through the interpolation chain. Further, upsampling may alternatively be performed in the frequency-domain by using larger IFFTs 30-(1,2) through 30-(M,2) and zero-padding the additional subcarriers.

The M interpolated time-domain signals for the second carrier are tuned to an appropriate frequency offset for the second carrier by, in this example, the corresponding NCOs 54-(1,2) through 54-(M,2). The NCOs 54-(1,2) through 54-(M,2) may be implemented using a LUT or CORDIC techniques, as will be appreciated by one of ordinary skill in the art. Note that there are no restrictions on the positions of the carriers (i.e., any desired carrier frequencies can be used). The M tuned time-domain signals for the second carrier are input to the M combiners 56-1 through 56-M, respectively.

Each combiner 56-m for m=1, . . . , M combines the tuned time-domain signal for the first carrier for the m-th antenna branch and the tuned time-domain signal for the second carrier for the m-th antenna branch to provide a multi-carrier time-domain signal for the m-th antenna branch. In this example, carrier combining is performed at the 491.52 Msps sampling rate. Note that, for each m-th antenna branch, the corresponding multi-carrier time-domain signal is referred to herein as $X_m(t)$, meaning that it still corresponds to the (frequency-domain) X-update output where the only difference is that it is now in the form of a multi-carrier time-domain signal.

The M multi-carrier time-domain signals $X_m(t)$ output by the combiners 56-1 through 56-M are provided to time-domain Z-update functions 58-1 through 58-M for the M antenna branches, respectively. The time-domain Z-update functions 58-1 through 58-M operate together with time-domain Y-update functions 60-1 through 60-M to perform a time-domain Z-update procedure as follows. For each m-th antenna branch (for m=1, . . . , M), the time-domain Z-update function 58-m and the time-domain Y-update function 60-m operate together to perform the time-domain Z-update procedure for the m-th antenna branch in accordance with Equation 21.

Equation 21: Time-Domain Z-Update $$errY_m^{(k)}(t) = 2 \cdot X_m^{(k)}(t) - Z_m^{(k-1)}(t)$$

$$Z_m^{(k)}(t) = Z_m^{(k-1)}(t) + Y_m^{(k)}(t) - X_m^{(k)}(t)$$

where:
- $errY_m^{(k)}(t)$ is an output of the time-domain Z-update function 58-m for the m-th antenna branch for the k-th iteration of the CRAM algorithm that is provided to the Y-update function 60-m for the m-th antenna branch for the k-th iteration of the CRAM algorithm;
- $X_m^{(k)}(t)$ is the multi-carrier time-domain signal for the m-th antenna branch for the k-th iteration of the CRAM algorithm that is input to the Z-update function 58-m;
- $Z_m^{(k-1)}(t)$ is the time-domain Z-update output generated by the Z-update function 58-m for the m-th antenna branch for the (k−1)-th iteration of the CRAM algorithm;
- $Z_m^{(k)}(t)$ is the time-domain Z-update output generated by the Z-update function 58-m for the m-th antenna branch for the k-th iteration of the CRAM algorithm; and
- $Y_m^{(k)}(t)$ is the time-domain Y-update output generated by Y-update function 60-m and provided to the Z-update function 58-m for the m-th antenna branch for the k-th iteration of the CRAM algorithm.

The Y-update function 60-m generates $Y_m^{(k)}(t)$ in accordance with Equation 22.

Equation 22: Y-Update $$Y_m(t) = \begin{cases} \frac{Th_{high}}{|errY_m|} \times errY_m, & \text{if } |errY_m| > Th_{high} \\ \frac{Th_{low}}{|errY_m|} \times errY_m, & \text{if } |errY_m| < Th_{low} \\ Th_{low}, & \text{if } |errY_m| = 0 \\ errY_m, & \text{otherwise} \end{cases}$$

where:
- $Th_{high}$ is an upper clipping threshold; and
- $Th_{low}$ is a lower clipping threshold.

Note that $Th_{high}$ and $Th_{low}$ are global clipping thresholds in the example of Equation 22. However, in some alternative embodiments, per-antenna time-domain clipping may be provided by utilizing separate clipping thresholds for the antenna branches.

In the reverse direction, the M time-domain Z-update outputs of the M time-domain Z-update functions 58-1 through 58-m are tuned back to baseband by respective NCOs 62-(1,1) through 62-(M,1) for the first carrier and NCOs 62-(1,2) through 62-(M,2) for the second carrier and then decimated back to the lower sampling rate by respective decimators 64-(1,1) through 64-(M,1) for the first carrier and decimators 64-(1,2) through 64-(M,2) for the second carrier, thereby providing M time-domain Z-update outputs for the first carrier and M time-domain Z-update outputs for the second carrier. The M time-domain Z-update outputs for the first carrier are converted to the frequency-domain by respective FFTs 66-(1,1) through 66-(M,1) to thereby provide M frequency-domain Z-update outputs. A re-ordering function 68-1 performs a reverse re-ordering of the M frequency-domain Z-update outputs for the first carrier to provide the N frequency-domain Z-update outputs that are input to the X-update functions 26-(1,1) through 26-(N,1) for the first carrier. Likewise, the M time-domain Z-update outputs for the second carrier are converted to the frequency-domain by respective FFTs 66-(1,2) through 66-(M,2) to thereby provide M frequency-domain Z-update outputs. A re-ordering function 68-2 performs a reverse re-ordering of the M frequency-domain Z-update outputs for the second carrier to provide the N frequency-domain Z-update outputs that are input to the X-update functions 26-(1,2) through 26-(N,2) for the second carrier.

Figure 17:
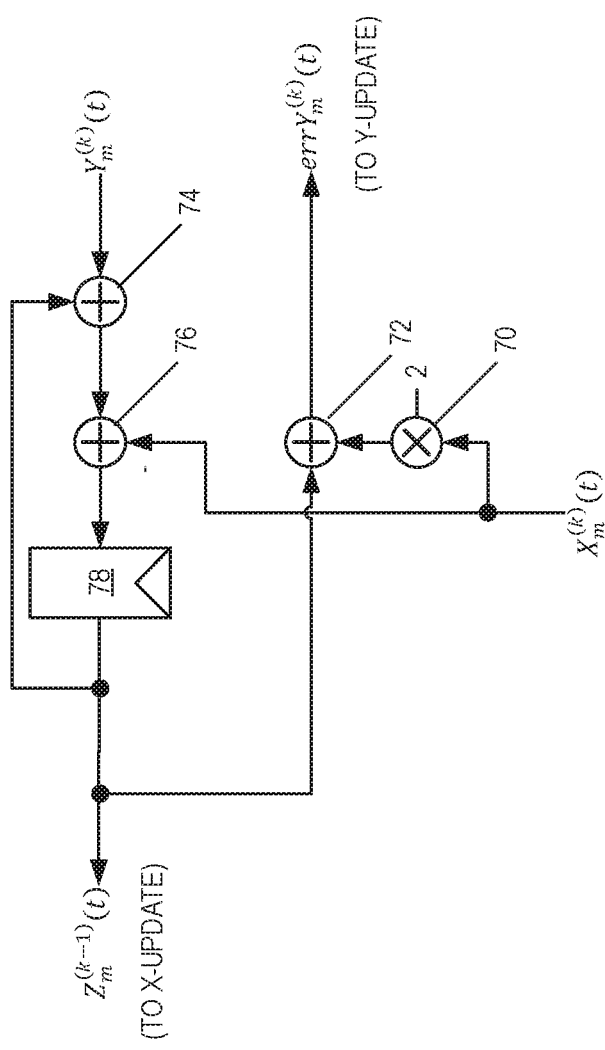
FIG. 17 illustrates one example implementation of the time-domain Z-update procedure for multi-carrier CRAM.

FIG. 17 illustrates one implementation of the time-domain Z-update procedure of Equation 21. In other words, FIG. 17 illustrates one example implementation of the m-th time-domain Z-update function 58-m. As illustrated, the time-domain Z-update function 58-m includes a multiplication node 70, a number of summation nodes 72-76, and a Flip/Flop (F/F) 78, connected as shown. The multiplication node 70 multiplies $X_m^{(k)}(t)$ by 2 and subtracts $Z_m^{(k-1)}(t)$ (stored at the output of the F/F 78) from the result of the multiplication to thereby generate $errY_m^{(k)}(t)$. $Y_m^{(k)}(t)$ is received from the Y-update function 60-m and summed together with $Z_m^{(k-1)}(t)$ at the summation node 74. The summation node 76 subtracts $X_m^{(k)}(t)$ from the output of the summation node 74 to thereby provide $Z_m^{(k)}(t)$.

Note that, for the multi-carrier embodiment of FIGS. 16A and 16B, one should ensure that the roundtrip delay from the X-update back to the X-update corresponds to an integer number of samples at the baseband sampling rate of 30.72 Msps for 20 MHz LTE signals in the example of FIGS. 16A and 16B. Therefore, special attention should be paid to the overall group delay when designing the interpolation and the decimation filter chains shown in FIGS. 16A and 16B.

Figure 18:
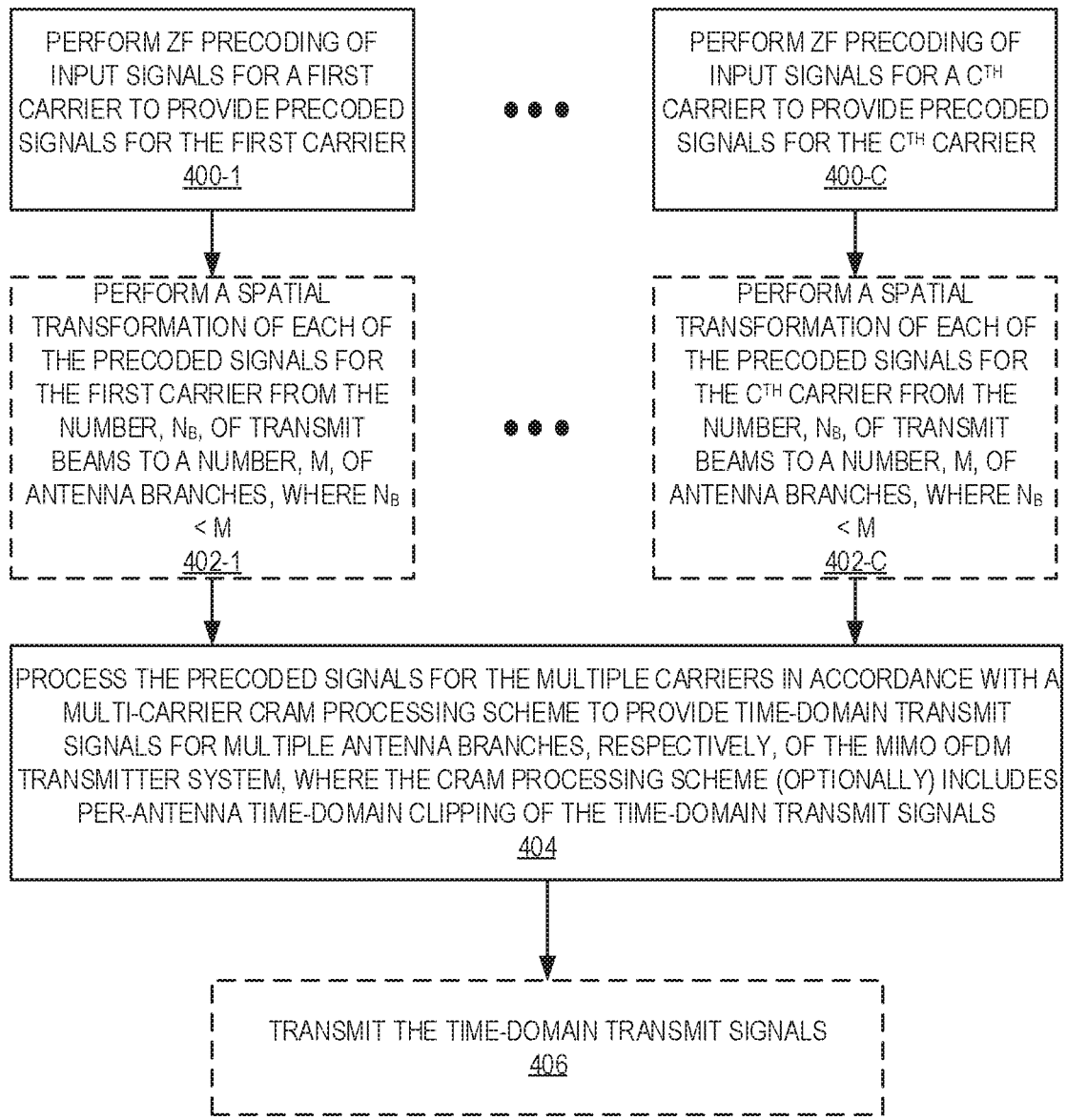
FIG. 18 is a flow chart that illustrates the operation of the transmitter system in accordance with some embodiments of the present disclosure in which the CRAM algorithm is the multi-carrier CRAM algorithm.

FIG. 18 is a flow chart that illustrates the operation of the transmitter system 10 in accordance with some embodiments of the present disclosure in which the CRAM algorithm is the multi-carrier CRAM algorithm described above. The CRAM algorithm used here may use the conventional frequency-domain X-update of Equation 7, the frequency-domain X-update of Equation 11, or the frequency-domain X-update of Equation 16, 17, or 18. This process is performed by the transmitter system 10 of FIG. 4 using, e.g., the architecture for the baseband processing system 12 of FIGS. 15, 16A, and 16B.

As illustrated, for each c-th carrier for c=1, . . . , C, the transmitter system 10, and in particular the baseband processing system 12, performs (e.g., ZF) precoding of the frequency-domain input signals $s_{n,c}$ for n=1, . . . , N to provide the N (potentially port-reduced) frequency-domain precoded signals for the c-th carrier, as described above (step 400-c). In some embodiments, port reduction is not performed, and as such the N frequency-domain precoded signals for the c-th carrier are the N frequency-domain precoded signals $x_{n,c}^{ZF}$ for n=1, . . . , N for the c-th carrier. In some other embodiments, the N frequency-domain precoded signals for the c-th carrier are the N port-reduced frequency-domain precoded signals for the c-th carrier. If port reduction is used, then the transmitter system 10, and in particular the baseband processing system 12, performs a spatial transformation of each of the N port-reduced frequency-domain precoded signals for the c-th carrier from the number ($N_B$) of transmit beams to the number (M) of antenna branches where $N_B$<M to thereby provide the N frequency-domain precoded signals $x_{n,c}^{ZF}$ for the c-th carrier, as described above (step 402-c). Note that step 402-c is optional, as indicated by the dashed lines, depending on whether or not port reduction is used.

The transmitter system 10, and in particular the baseband processing system 12, processes the frequency-domain precoded signals $x_{n,c}^{ZF}$ for n=1, . . . , N for all C carriers in accordance with a multi-carrier CRAM processing scheme to provide M time-domain multi-carrier transmit signals for the M antenna branches of the transmitter system 10 (step 404), as described above. Optionally, the transmitter system 10, and in particular the RF transmitter system 14, transmits the M time-domain multi-carrier transmit signals (step 406).

Figure 19A:
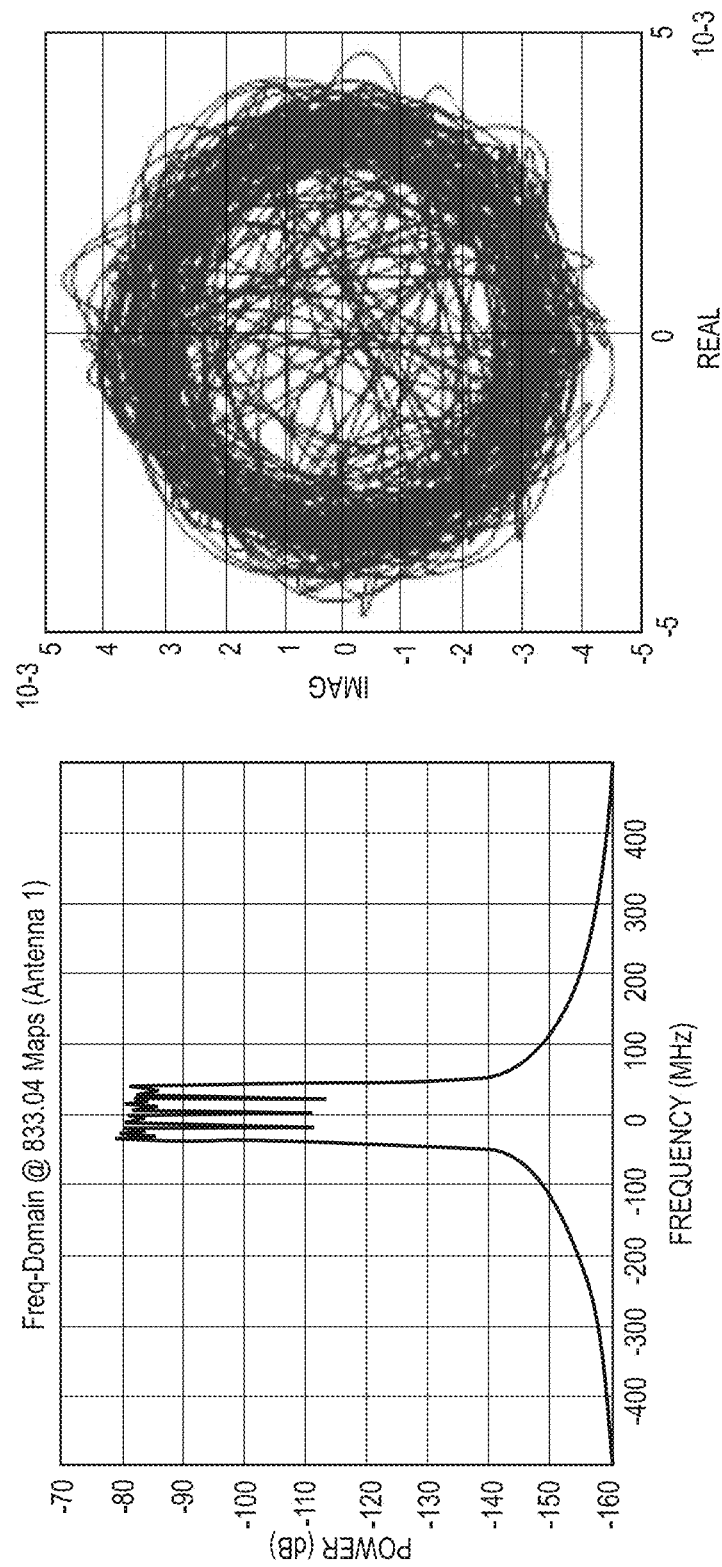
FIGS. 19A and 19B illustrate simulation results that demonstrate the successful operation of the CRAM extensions for multi-carrier operation provided by embodiments of the present disclosure.
Figure 19B:
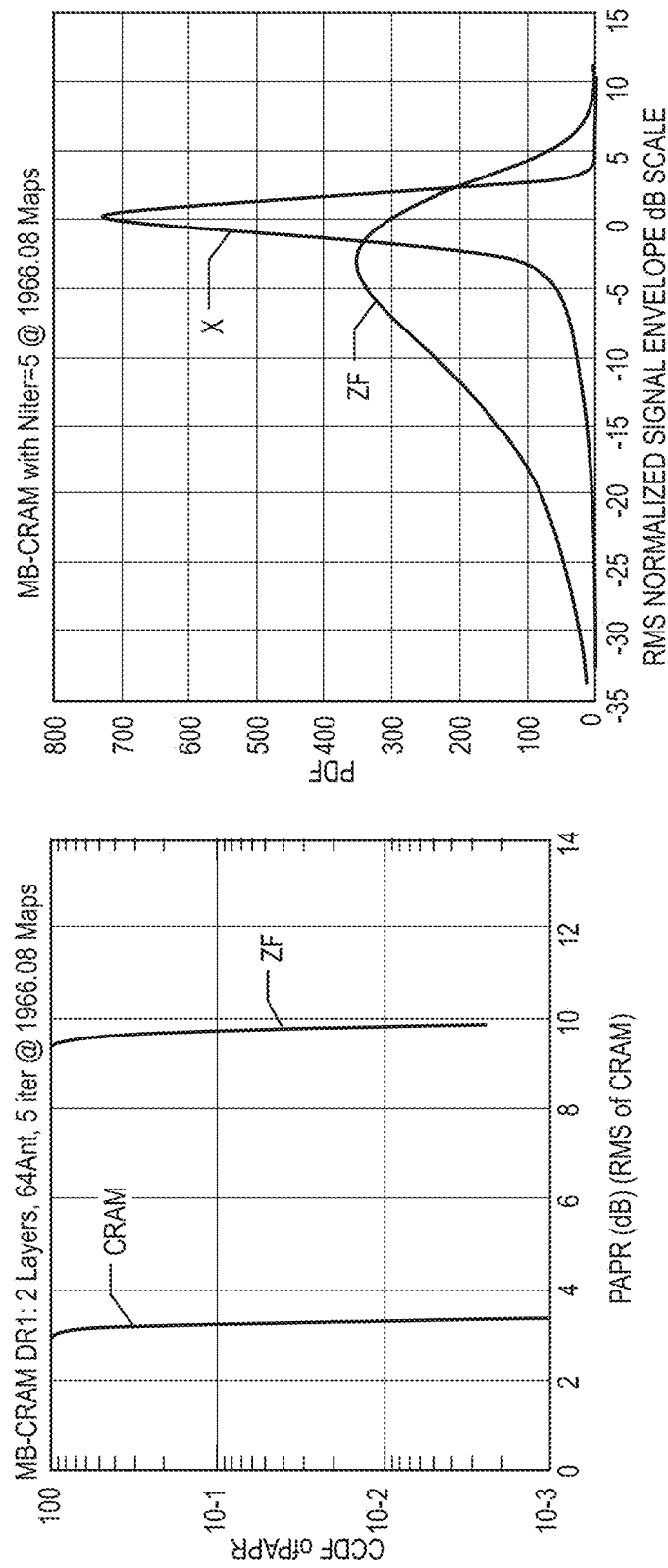

Simulations presented in FIGS. 19A and 19B demonstrate the successful operation of the CRAM extensions for multi-carrier operation provided embodiments of the present disclosure. The simulations capture the following scenario:

Four 20 MHz LTE carriers each sampled at 30.72 Msps.
A high sampling rate of 491.52 Msps is used for the Z-Update and Y-Update of CRAM.
A sampling rate of 983.04 Msps is used for post-processing results to observe the final time-domain waveforms.

The simulation results demonstrate a scenario with 4×20 MHz contiguous LTE carriers. As seen in FIGS. 19A and 19B, the CRAM algorithm reduces the PAPR to 3.3 dB which is identical to the PAPR that is obtained in single-carrier simulations.

Table shows the peak reduction and PAPR reduction achieved by an embodiment of the present disclosure for the four-carrier scenario shown in FIGS. 19A and 19B.

These results demonstrate that the multi-carrier extension to CRAM provided by an embodiment of the present disclosure may be used successfully to handle multi-carrier systems in a flexible manner with no compromise in PAPR reduction capability.

CRAM Extension for Multi-Band Operation

Some embodiments of the present disclosure utilize a CRAM algorithm that extends CRAM to support multi-band systems, with each band including one or more carriers, through the following modifications:

A bank of separate baseband frequency-domain CRAM X-Update blocks are adopted for each carrier in the multi-band system. These updates operate at, e.g., the conventional sampling rate.

Tuning blocks and interpolation blocks are incorporated in a manner identical to the CRAM extension for multi-carrier operation. Separate tuning and interpolation branches and their associated tuning and decimation branches are provided for each carrier in the multi-band system.

Separate time-domain Z-Update block (from the multi-carrier CRAM extension) are included for each band supported in its multi-band embodiment.

The Y-Update of the multi-carrier CRAM extension is modified to use multi-band peak detection to enable multi-band clipping of the signal based on its per-band constituent components. This multi-band Y-Update produces a clipped version of each per-band signal which drives the CRAM iterations performed in parallel for each carrier in each band.

Figure 20:
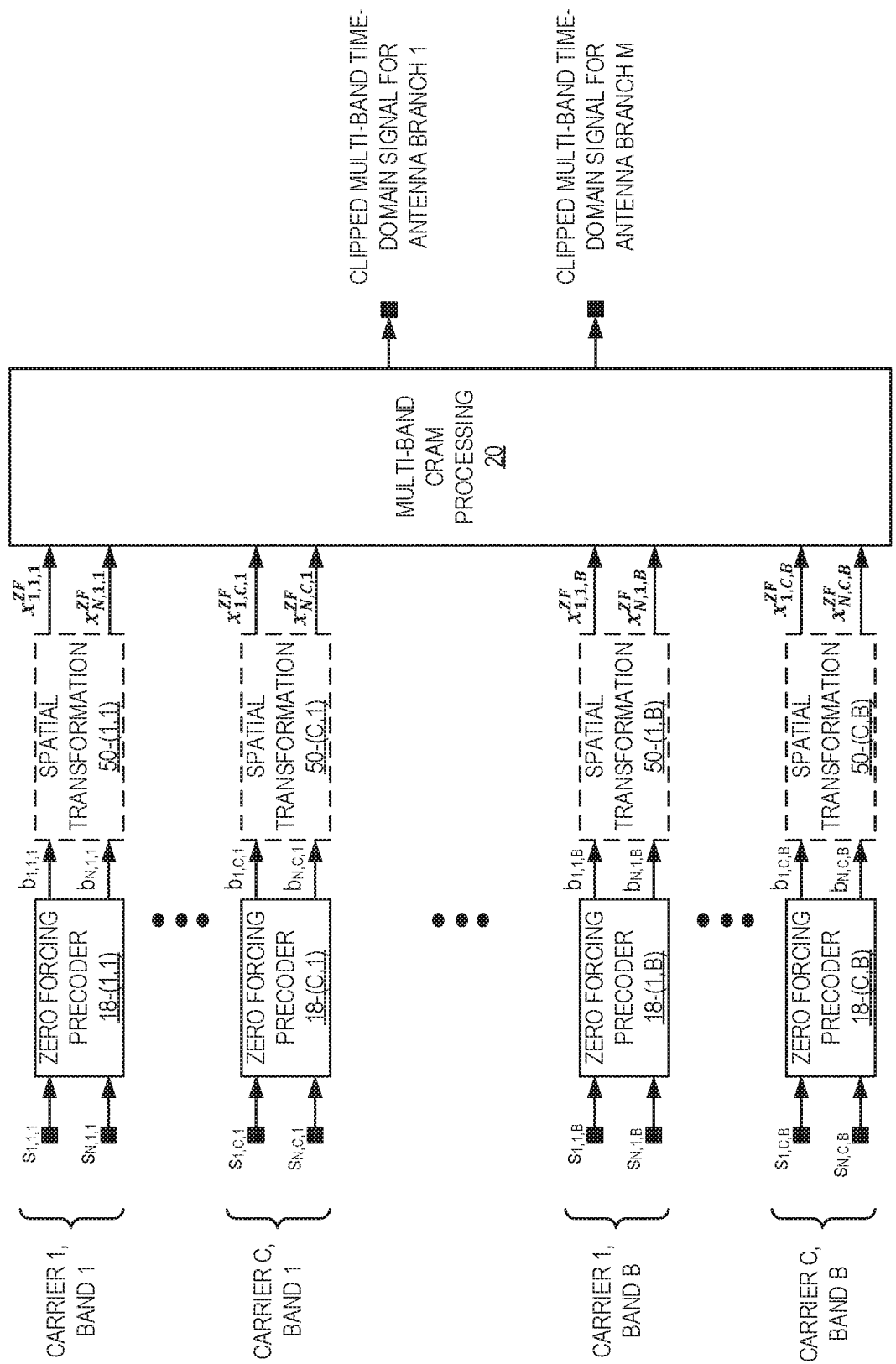
FIG. 20 illustrates the precoders, optional spatial transformation functions, and the (multi-band) CRAM processing system in accordance with some embodiments of the present disclosure in which the CRAM algorithm implemented by the CRAM processing system supports multi-band operation.

In this regard, FIG. 20 illustrates the precoders 18-(1,1) through 18-(C,B), optional spatial transformation functions 50-(1,1) through 50-(C,B), and the (multi-band) CRAM processing system 20 in accordance with some embodiments of the present disclosure in which the CRAM algorithm implemented by the CRAM processing system 20 supports multi-band operation. Here, B is the number of frequency bands, and C is the number of carriers for a particular frequency band. Note that B is greater than or equal to 2. Also, the value of C may vary among bands. For example, one frequency band may include one carrier in which case, for that frequency band, C=1. In contrast, another frequency band may include two carriers in which case, for that frequency band, C=2. As illustrated, in this example, the precoders 18-(1,1) through 18-(C,B) are ZF precoders, which for consistency are referred to as ZF precoders 18-(1,1) through 18-(C,B).

The ZF precoder 18-(c,b) for c=1, . . . , C and b=1, . . . , B receives a number (N) of frequency-domain input signals $s_{n,c,b} \in \mathbb{C}^{K \times 1}$ for n=1, . . . , N for the c-th carrier in the b-th

TABLE 2

Performance of Multi-carrier CRAM for 20 channel instances,
20 symbols per channel instance and 5 CRAM iterations PAPR target: 4 dB
Donut level: 0.8

| Carrier configuration | 99.9% RMS Penalty [dB] | 99.9% PAPR Level [dB] | 99.9% Peak Reduction [dB] | 99.9% PAZF Level [dB] |
|---|---|---|---|---|
| B0: 4 × 20 MHz contiguous<br>B1: 4 × 20 MHz contiguous | 2.5 | 3.3 | 4.1 | 5.8 | frequency band. The frequency-domain input signals $s_{n,c,b}$ are also referred to herein a layer-domain input vectors for the c-th carrier in the b-th frequency band. The number K is the number of layers in the layer-domain for the c-th carrier in the b-th frequency band, and N is the number of tones (i.e., OFDM tones or subcarriers) for the c-th carrier in the b-th frequency band. Note that since the bandwidth and thus the number of tones for each carrier may vary, the N may also vary from one carrier to another. The ZF precoder 18-(c,b) is a linear precoder that performs digital beamforming individually on each frequency-domain input signal $s_{n,c,b}$ using a respective ZF precoding matrix $P_{n,c,b}^{ZF}$ to produce a respective frequency-domain precoded signal $x_{n,c,b}^{ZF} \in \mathbb{C}^{M \times 1}$ for the c-th carrier in the b-th frequency band. The ZF precoder 18-(c,b) operates on a total of $|\mathcal{T}|$ tones for the c-th carrier in the b-th frequency band and the remaining $|\mathcal{T}^C|$ tones for the c-th carrier in the b-th frequency band are unused and set to zero, where $|\mathcal{T}|+|\mathcal{T}^C|=N$. The precoder matrix $P_{n,c,b}^{ZF}$ is set to the "right pseudo-inverse" $H_{n,c}^{\dagger}$ of the MIMO channel matrix $H_{n,c,b}$ for the c-th carrier in the b-th frequency band as shown in Equation 23. The ZF precoder 18-(c,b) enforces the spatial constraints given in Equation 24 for the c-th carrier in the b-th frequency band such that tone $x_{n,c}^{ZF}=P_{n,c,b}^{ZF}s_{n,c,b}$ is received at the UE as $H_{n,c,b}x_{n,c,b}^{ZF}=H_{n,c,b}P_{n,c,b}^{ZF}s_{n,c,b}=H_{n,c,b}H_{n,c,b}^{\dagger}s_{n,c,b}=s_{n,c,b}$, and so this ZF precoding scheme removes all multiple access interference between layers in the ideal case.

Equation 23: ZF Precoding Solution $$P_{n,c,b}^{ZF}=H_{n,c,b}^{\dagger}=H_{n,c,b}^{H}(H_{n,c,b}H_{n,c,b}^{H})^{-1}$$

Equation 24: ZF spatial constraints for a given tone index n.

$$s_{n,c,b}=H_{n,c,b}x_{n,c,b}^{ZF}, n \in \mathcal{T}$$

$$s_{n,c,b}=0^{K \times 1}, n \in \mathcal{T}^C.$$

Each of the N precoded vectors $x_{n,c,b}^{ZF}$ for the c-th carrier in the b-th frequency band contains M samples to be distributed evenly across the M antenna branches after performing respective CRAM X-updates, as described below. The frequency-domain precoded vectors $x_{n,c,b}^{ZF}$ for n=1, . . . , N for the c-th carrier in the b-th frequency band (also referred to herein as frequency-domain precoded signals $x_{n,c,b}^{ZF}$ for n=1, . . . , N for the c-th carrier in the b-th frequency band) are provided to the CRAM processing system 20.

Alternatively, if port reduction is used, the ZF precoder 18-(c,b) for c=1, . . . , C and b=1, . . . , B receives the N frequency-domain input signals $s_{n,c,b}$ for the c-th carrier in the b-th frequency band and performs digital beamforming individually on each frequency-domain input signal $s_{n,c}$ using a respective port-reduced ZF precoding matrix $P_{n,c,b}^{ZFB}$ to produce N port reduced frequency-domain precoded signals $b_{n,c,b} \in \mathbb{C}^{N_B \times 1}$ for n=1, . . . , N for the c-th carrier in the b-th frequency band. A spatial transformation function 50-(c,b) applies a $M \times N_B$ spatial transformation matrix $\varphi \in \mathbb{C}^{M \times N_B}$ to each of the N port-reduced frequency-domain precoded signals $b_{n,c,b}$ for the c-th carrier in the b-th frequency band to provide the N frequency-domain precoded signals $x_{n,c,b}^{ZF} \in \mathbb{C}^{M \times 1}$ for the c-th carrier in the b-th frequency band.

The CRAM processing system 20 performs a multi-band CRAM algorithm to generate M multi-band time-domain transmit signals for the M antenna branches, respectively. FIGS. 21A through 21D illustrates one example of the multi-band CRAM processing system 20 of FIG. 20 that implements a multi-band CRAM algorithm. For clarity and ease of discussion, there are two carriers in each of two frequency bands in the example of FIGS. 21A through 21D. However, the architecture in FIGS. 21A through 21D can be extended to any number of two or more frequency bands and any number of carriers within each frequency band.

The CRAM processing system 20 of FIGS. 21A through 21D operates to perform a multi-carrier CRAM algorithm as follows. Looking first at the first carrier (Carrier #1) in the first frequency band (Band #1), a number of X-update functions 26-(1,1,1) through 26-(N,1,1) operate to perform frequency-domain X-update procedures for the N tones for n=1, . . . , N for the first carrier in the first frequency band, respectively, in accordance with the X-update procedure of Equation 7 (conventional), the X-update procedure of Equation 11 (for CRAM with per-antenna time-domain PAPR reduction), the X-update procedure of Equation 15 (CRAM with port reduction), or the X-update procedure of one of Equations 16 to 18 (CRAM for multi-cell interference scenarios).

In the forward direction, the frequency-domain X-update outputs $x_{n,1,1}^{(k)}$ for n=1, . . . , N for the first carrier in the first frequency band are provided to a re-ordering function 28-(1,1) for the first carrier in the first frequency band that re-orders the frequency-domain X-update outputs $x_{n,1,1}^{(k)}$ for the first carrier in the first frequency band to generate a new set of M vectors $a_{m,1,1}$ for the first carrier in the first frequency band, each containing N frequency-domain samples. In other words, each of the N frequency-domain X-update outputs $x_{n,1,1}^{(k)}$ for the first carrier in the first frequency band contains M samples that are distributed evenly across the M antenna branches via the re-ordering function 28-(1,1). The re-ordered vectors $a_{m,1,1}$ for m=1, . . . , M (also referred to herein as re-ordered signals) are converted from the frequency-domain to the time-domain via respective IFFTs 30-(1,1,1) through 30-(M,1,1) to provide M time-domain signals for the M antenna branches, respectively, for the first carrier in the first frequency band. While not illustrated, time-domain processing such as P/S conversion and CP insertion may be performed.

Interpolators 52-(1,1,1) through 52-(M,1,1) interpolate the M time-domain signals for the first carrier in the first frequency band from a lower sampling rate used for the frequency-domain processing to a higher sampling rate. In this example, the first and second carriers in the first and second frequency band are all 20 MHz carriers, and the IFFTs (for both the first carrier and the second carrier in both the first and second frequency band) are 2048 point carriers, where the lower sampling rate is 30.72 Msps and the higher sampling rate is 491.52 Msps. Note that these sampling rates are only examples. Other sampling rates may be used. Further, the interpolators 52-(1,1,1) through 52-(M,1,1) are upsamplers in this example, but any time-domain interpolation technique may be used. The upsamplers may be implemented as a number of cascaded filters. Since the carriers are centered around 0 Hz, the filter requirements can be relaxed as we progress through the interpolation chain. Further, upsampling may alternatively be performed in the frequency-domain by using larger IFFTs 30-(1,1,1) through 30-(M,1,1) and zero-padding the additional subcarriers.

The M interpolated time-domain signals for the first carrier in the first frequency band are tuned to an appropriate frequency offset for the first carrier in the first frequency band by, in this example, corresponding NCOs 54-(1,1,1) through 54-(M,1,1). The NCOs 54-(1,1,1) through 54-(M,1,1) may be implemented using a LUT or CORDIC techniques, as will be appreciated by one of ordinary skill in the art. Note that there are no restrictions on the positions of the carriers (i.e., any desired carrier frequencies can be used). The M tuned time-domain signals for the first carrier in the first frequency band are input to M combiners 56-(1,1) through 56-(M,1), respectively. See FIG. 21C and FIG. 21D which illustrate the combiners 56-(1,1) and 56-(M,1) respectively. Note the FIGS. 21C and 21D illustrate the architecture for only antenna branches 1 and M. However, the details of FIGS. 21C and 21D are included for all M antenna branches.

Turning to the second carrier (i.e., Carrier #2) in the first frequency band, a number of X-update functions 26-(1,2,1) through 26-(N,2,1) operate to perform frequency-domain X-update procedures for the N tones for n=1, ..., N for the second carrier in the first frequency band, respectively, in accordance with the X-update procedure of Equation 7 (conventional), the X-update procedure of Equation 11 (for CRAM with per-antenna time-domain PAPR reduction), the X-update procedure of Equation 15 (CRAM with port reduction), or the X-update procedure of one of Equations 16 to 18 (CRAM for multi-cell interference scenarios).

In the forward direction, the frequency-domain X-update outputs $x_{n,2,1}^{(k)}$ for n=1, ..., N for the second carrier in the first frequency band are provided to a re-ordering function 28-(2,1) for the second carrier in the first frequency band that re-orders the frequency-domain X-update outputs $x_{n,2,1}^{(k)}$ for the second carrier in the first frequency band to generate a new set of M vectors $a_{m,2,1}$ for the second carrier in the first frequency band, each containing N frequency-domain samples. In other words, each of the N frequency-domain X-update outputs $x_{n,2,1}^{(k)}$ for the second carrier in the first frequency band contains M samples that are distributed evenly across the M antenna branches via the re-ordering function 28-(2-1). The re-ordered vectors $a_{m,2,1}$ for m=1, ..., M (also referred to herein as re-ordered signals) are converted from the frequency-domain to the time-domain via respective IFFTs 30-(1,2,1) through 30-(M,2,1) to provide M time-domain signals for the M antenna branches, respectively, for the second carrier in the first frequency band. While not illustrated, time-domain processing such as P/S conversion and CP insertion may be performed.

Interpolators 52-(1,2,1) through 52-(M,2,1) interpolate the M time-domain signals for the second carrier in the first frequency band from the lower sampling rate used for the frequency-domain processing to the higher sampling. Again, in this example, the first and second carriers are 20 MHz carriers, and the IFFTs (for both the first carrier and the second carrier) are 2048 point carriers, where the lower sampling rate is 30.72 Msps and the higher sampling rate is 491.52 Msps. Note that these sampling rates are only examples. Other sampling rates may be used. Further, the interpolators 52-(1,2,1) through 52-(M,2,1) are upsamplers in this example, but any time-domain interpolation technique may be used. The upsamplers may be implemented as a number of cascaded filters. Since the carriers are centered around 0 Hz, the filter requirements can be relaxed as we progress through the interpolation chain. Further, upsampling may alternatively be performed in the frequency-domain by using larger IFFTs 30-(1,2,1) through 30-(M,2,1) and zero-padding the additional subcarriers.

The M interpolated time-domain signals for the second carrier in the first frequency band are tuned to an appropriate frequency offset for the second carrier by, in this example, corresponding NCOs 54-(1,2,1) through 54-(M,2,1). The NCOs 54-(1,2,1) through 54-(M,2,1) may be implemented using a LUT or CORDIC techniques, as will be appreciated by one of ordinary skill in the art. Note that there are no restrictions on the positions of the carriers (i.e., any desired carrier frequencies can be used). The M tuned time-domain signals for the second carrier are input to the M combiners 56-(1,1) through 56-(M,1) for the M antenna branches for the first frequency band, respectively.

Figure 21A:
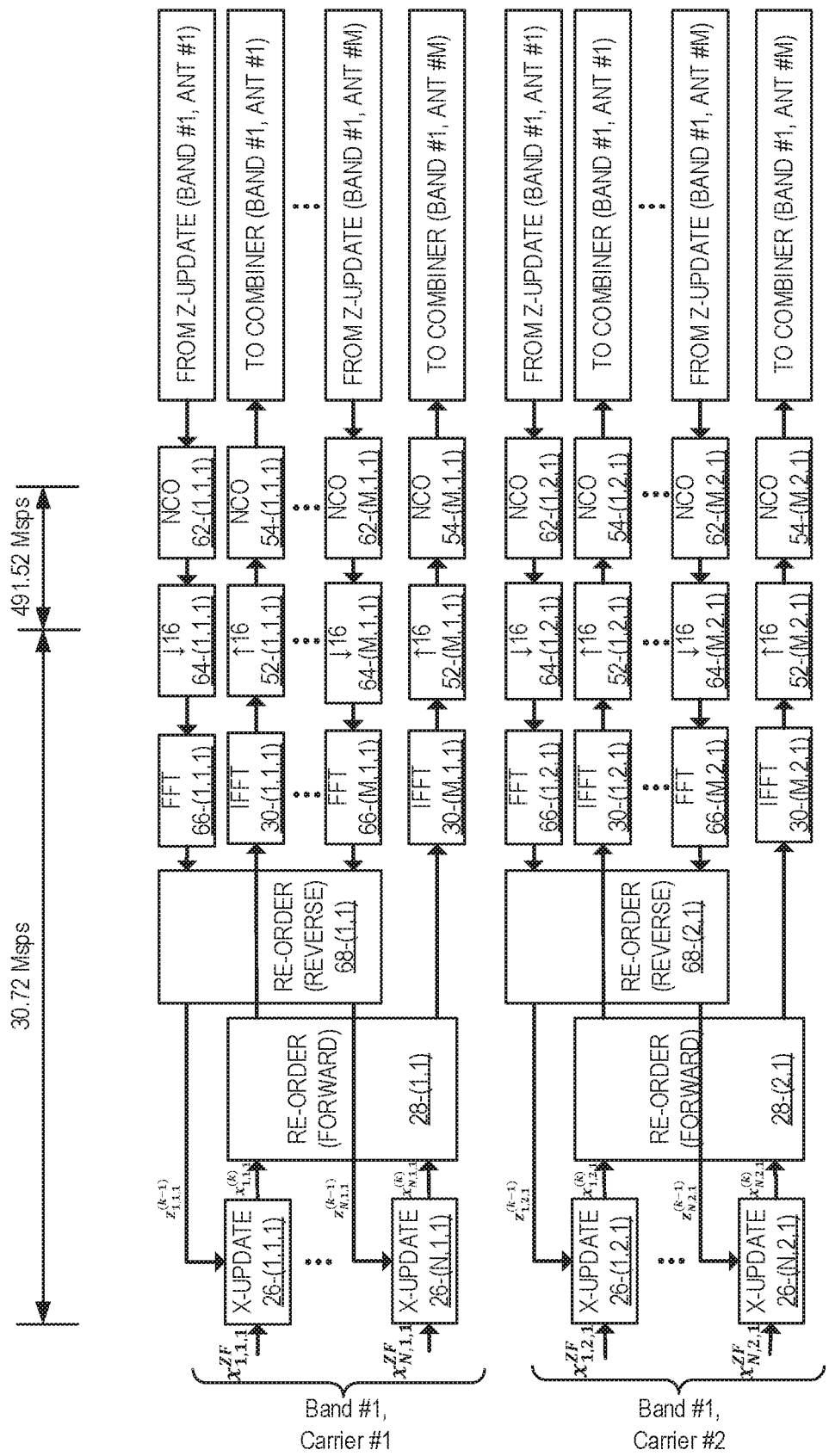
FIGS. 21A through 21D illustrate one example of the multi-band CRAM processing system of FIG. 20 that implements a multi-band CRAM algorithm.
Figure 21B:
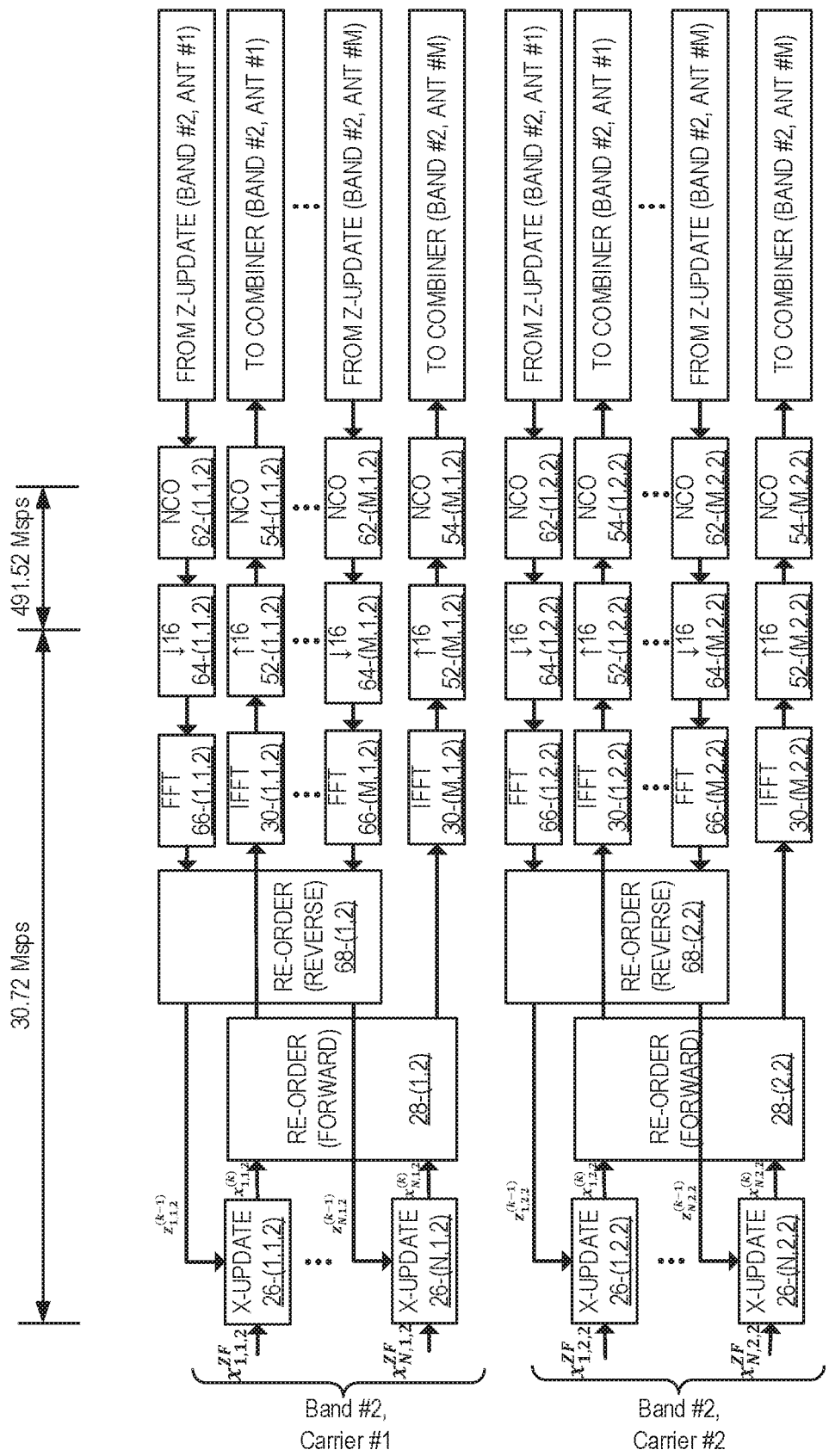
Figure 21C:
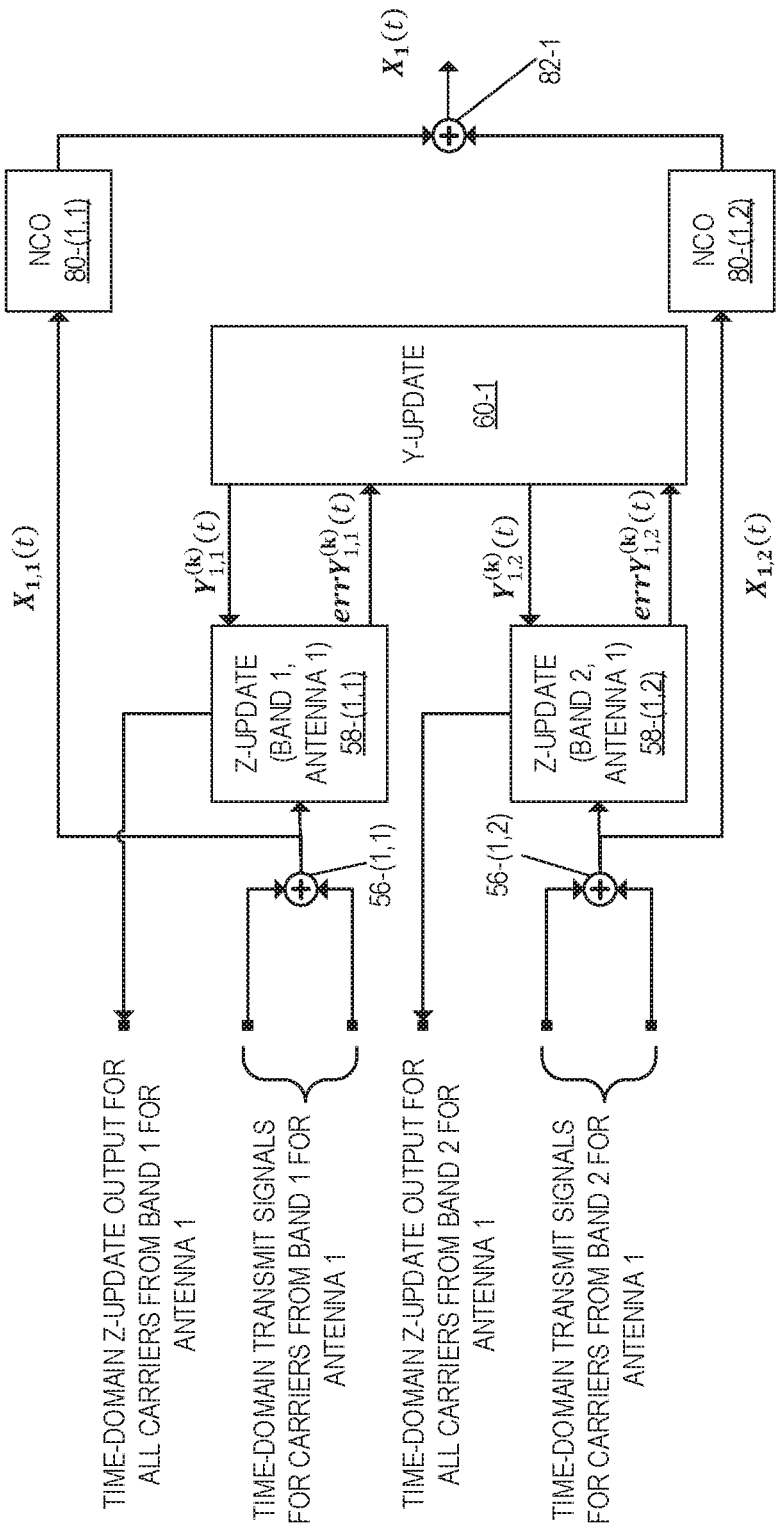
Figure 21D:
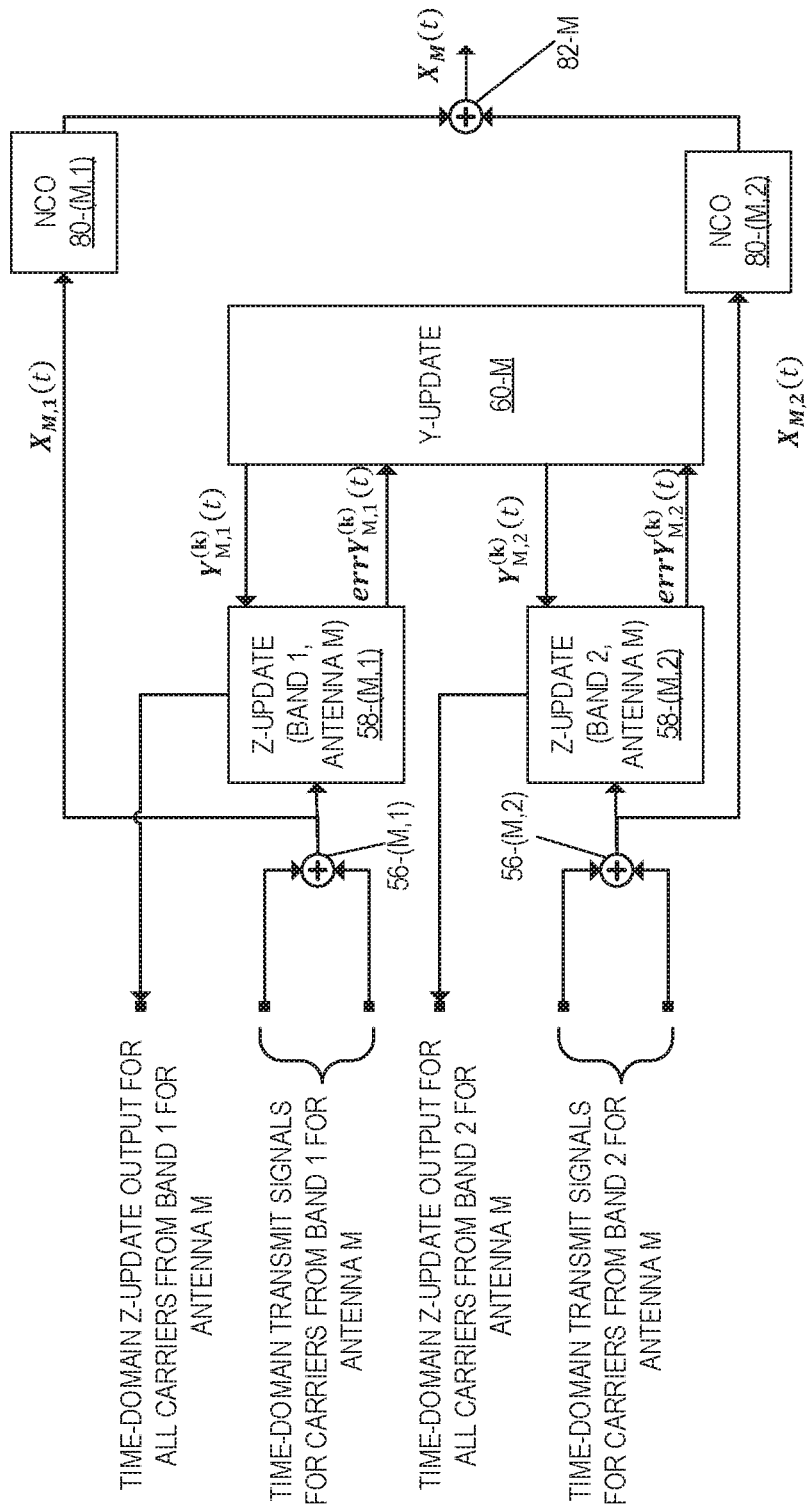

As illustrated in FIG. 21B, processing for the first and second carriers in the second frequency band is performed in the same manner as described above for the first carrier except that the M tuned time-domain signals for the first carrier in the second frequency band are input to M combiners 56-(1,2) through 56-(M,2) for the M antenna branches for the second frequency band, respectively. Likewise, the M tuned time-domain signals for the second carrier in the second frequency band are input to the M combiners 56-(1,2) through 56-(M,2) for the M antenna branches for the second frequency band, respectively.

Each combiner 56-(m,1) for m=1, ..., M for the first frequency band combines the tuned time-domain signals for the first and second carriers in the first frequency band for the m-th antenna branch to thereby provide a multi-carrier transmit signal for the first band for the m-th antenna branch. Likewise, each combiner 56-(m,2) for m=1, ..., M for the second frequency band combines the tuned time-domain signals for the first and second carriers in the second frequency band for the m-th antenna branch to thereby provide a multi-carrier transmit signal for the second band for the m-th antenna branch. In this example, carrier combining is performed at the 491.52 Msps sampling rate. Note that, for each m-th antenna branch, the corresponding multi-carrier time-domain signal for the first band is referred to herein as $X_{m,1}(t)$, meaning that it still corresponds to the (frequency-domain) X-update output for the first band where the only difference is that it is now in the form of a multi-carrier time-domain signal. Likewise, for each m-th antenna branch, the corresponding multi-carrier time-domain signal for the second band is referred to herein as $X_{m,2}(t)$, meaning that it still corresponds to the (frequency-domain) X-update output for the second band where the only difference is that it is now in the form of a multi-carrier time-domain signal.

The M multi-carrier time-domain signals $X_{m,1}(t)$ for the first frequency band output by the combiners 56-(1,1) through 56-(M,1) are provided to time-domain Z-update functions 58-(1,1) through 58-(M,1) for the first frequency band for the M antenna branches, respectively. Likewise, the M multi-carrier time-domain signals $X_{m,2}(t)$ for the second frequency band output by the combiners 56-(1,2) through 56-(M,2) are provided to time-domain Z-update functions 58-(1,2) through 58-(M,2) for the second frequency band for the M antenna branches, respectively. The time-domain Z-update functions 58-(1,1) through 58-(M,1) for the first frequency band and the time-domain Z-update functions 58-(1,2) through 58-(M,2) for the second frequency band operate together with time-domain Y-update functions 60-1 through 60-M to perform a time-domain Z-update procedure as follows. For each m-th antenna branch (for m=1, ..., M), the time-domain Z-update functions 58-(m,1) and 58-2(m,2) and the time-domain Y-update function 60-m operate together to perform the time-domain Z-update procedure for the m-th antenna branch in accordance with Equation 25. Equation 25: Time-Domain Z-Update $$errY_{m,b}^{(k)}(t) = 2 \cdot X_{m,b}^{(k)}(t) - Z_{m,b}^{(k-1)}(t)$$

$$Z_{m,b}^{(k)}(t) = Z_{m,b}^{(k-1)}(t) + Y_{m,b}^{(k)}(t) - X_{m,b}^{(k)}(t)$$

where:
errY$_{m,b}^{(k)}$(t) is an output of the time-domain Z-update function 58-($m,b$) for the m-th antenna branch for the b-th frequency band for the k-th iteration of the CRAM algorithm that is provided to the Y-update function 60-$m$ for the m-th antenna branch for the b-th frequency band for the k-th iteration of the CRAM algorithm;

X$_{m,b}^{(k)}$(t) is the multi-carrier time-domain signal for the m-th antenna branch for the b-th frequency band for the k-th iteration of the CRAM algorithm that is input to the Z-update function 58-$m$;

Z$_{m,b}^{(k-1)}$(t) is the time-domain Z-update output generated by the Z-update function 58-$m$ for the m-th antenna branch for the b-th frequency band for the (k−1)-th iteration of the CRAM algorithm;

Z$_{m,b}^{(k)}$(t) is the time-domain Z-update output generated by the Z-update function 58-$m$ for the m-th antenna branch for the b-th frequency band for the k-th iteration of the CRAM algorithm; and Y$_{m,b}^{(k)}$(t) is the time-domain Y-update output generated by Y-update function 60-$m$ and provided to the Z-update function 58-($m,b$) for the m-th antenna branch for the b-th frequency band for the k-th iteration of the CRAM algorithm.

The Y-update function 60-$m$ generates Y$_{m,b}^{(k)}$(t) in accordance with Equation 26.

Equation 26: Y-Update $$Y_{m,b}(t) = \begin{cases} \frac{Th_{high}}{PE} \times errY_{m,b}, & \text{if } PE > Th_{high} \\ \frac{Th_{low}}{PE} \times errY_{m,b}, & \text{if } PE < Th_{low} \\ \frac{Th_{low}}{B}, & \text{if } PE = 0 \\ errY_{m,b}, & \text{otherwise} \end{cases}$$

where:
Th$_{high}$ is an upper clipping threshold;
Th$_{low}$ is a lower clipping threshold; and $$PE = \sum_{b=1}^{B} |errY_{m,b}|$$

Note that Th$_{high}$ and Th$_{low}$ are global clipping thresholds in the example of Equation 26. However, in some alternative embodiments, per-antenna time-domain clipping may be provided by utilizing separate clipping thresholds for the antenna branches.

For multi-band clipping, peak estimation is implemented by summing the absolute values of the multi-carrier signal errY$_{m,b}$ signal for each band as shown in Equation 26. One particularity of Equation 26 is that it clips each of the bands proportionally to their contribution to the peak, i.e., clipping more heavily the band that has the largest amplitude.

For each m-th antenna branch, the multi-carrier time-domain signals for the first and second frequency band are frequency-translated to an appropriate frequency offset relative to one another by respective NCOs 80-($m$,1) and 80-($m$-2) such that, after combined by combiner 82-$m$ and upconverted to RF, each of the resulting multi-carrier time-domain transmit signals are in the appropriate frequency band. This results in a multi-band time-domain transmit signal for each m-th antenna branch.

In the reverse direction, for each b-th frequency bands for b=1, . . . , B, the M time-domain Z-update outputs of the M time-domain Z-update functions 58-(1,$b$) through 58-($m,b$) are tuned back to baseband by respective NCOs 62-(1,1,$b$) through 62-(M,1,$b$) for the first carrier and NCOs 62-(1,2,$b$) through 62-(M,2,$b$) for the second carrier and then decimated back to the lower sampling rate by respective decimators 64-(1,1,$b$) through 64-(M,1,$b$) for the first carrier and decimators 64-(1,2,$b$) through 64-(M,2,$b$) for the second carrier, thereby providing M time-domain Z-update outputs for the first carrier and M time-domain Z-update outputs for the second carrier, for the b-th frequency band. The M time-domain Z-update outputs for the first carrier are converted to the frequency-domain by respective FFTs 66-(1,1,$b$) through 66-(M,1,$b$) to thereby provide M frequency-domain Z-update outputs for the first carrier in the b-th frequency band. A re-ordering function 68-(1,$b$) performs a reverse re-ordering of the M frequency-domain Z-update outputs for the first carrier in the b-th frequency band to provide the N frequency-domain Z-update outputs that are input to the X-update functions 26-(1,1,$b$) through 26-(N,1,$b$) for the first carrier in the b-th frequency band. Likewise, the M time-domain Z-update outputs for the second carrier in the b-th frequency band are converted to the frequency-domain by respective FFTs 66-(1,2,$b$) through 66-(M,2,$b$) to thereby provide M frequency-domain Z-update outputs for the b-th frequency band. A re-ordering function 68-(2,$b$) performs a reverse re-ordering of the M frequency-domain Z-update outputs for the second carrier in the b-th frequency band to provide the N frequency-domain Z-update outputs that are input to the X-update functions 26-(1,2,$b$) through 26-(N,2,$b$) for the second carrier in the b-th frequency band.

Figure 22:
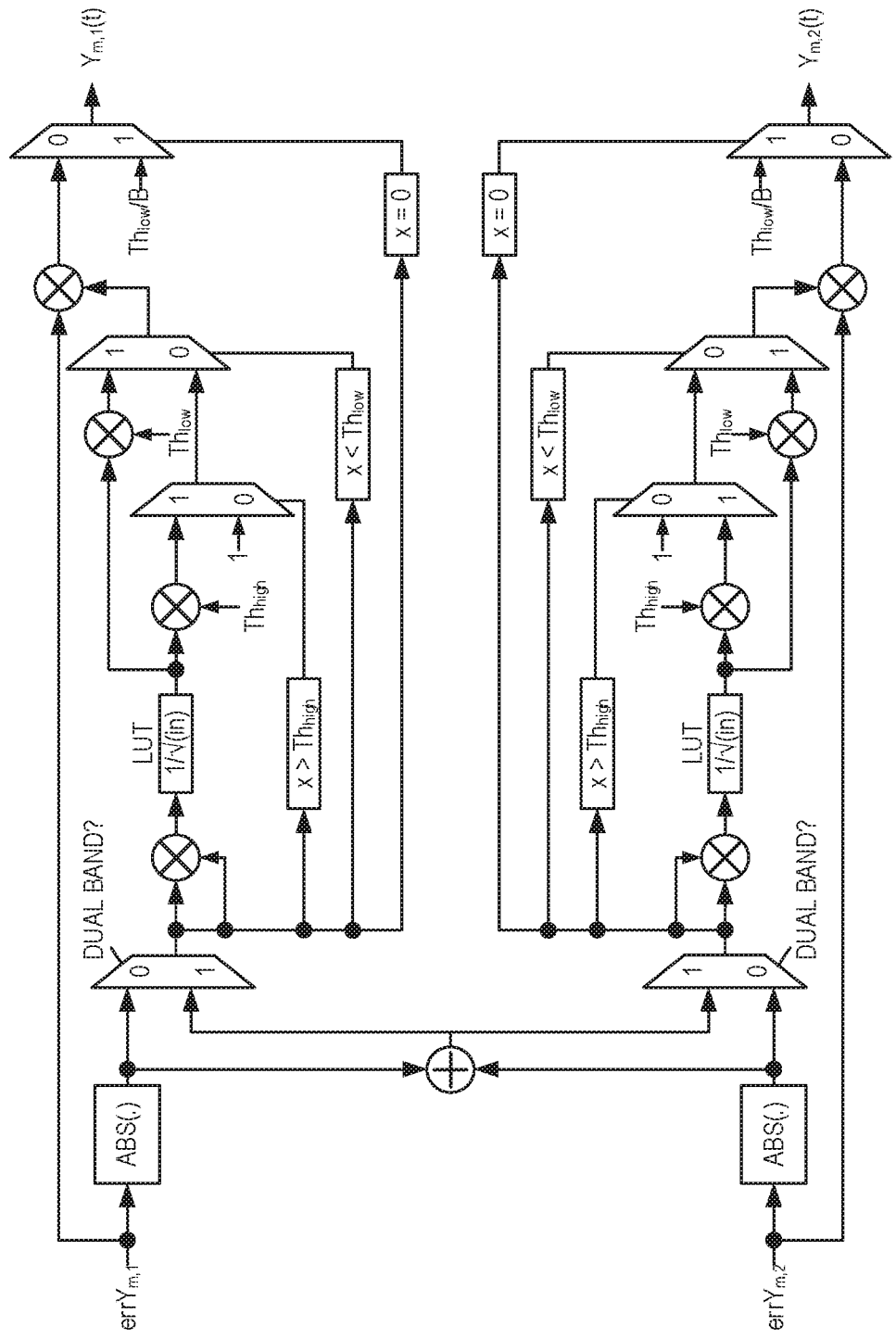
FIG. 22 illustrates one example hardware implementation of the m-th Y-update function of FIGS. 21C and 21D.

FIG. 22 illustrates one example hardware implementation of the m-th Y-update function 60-$m$.

Figure 23:
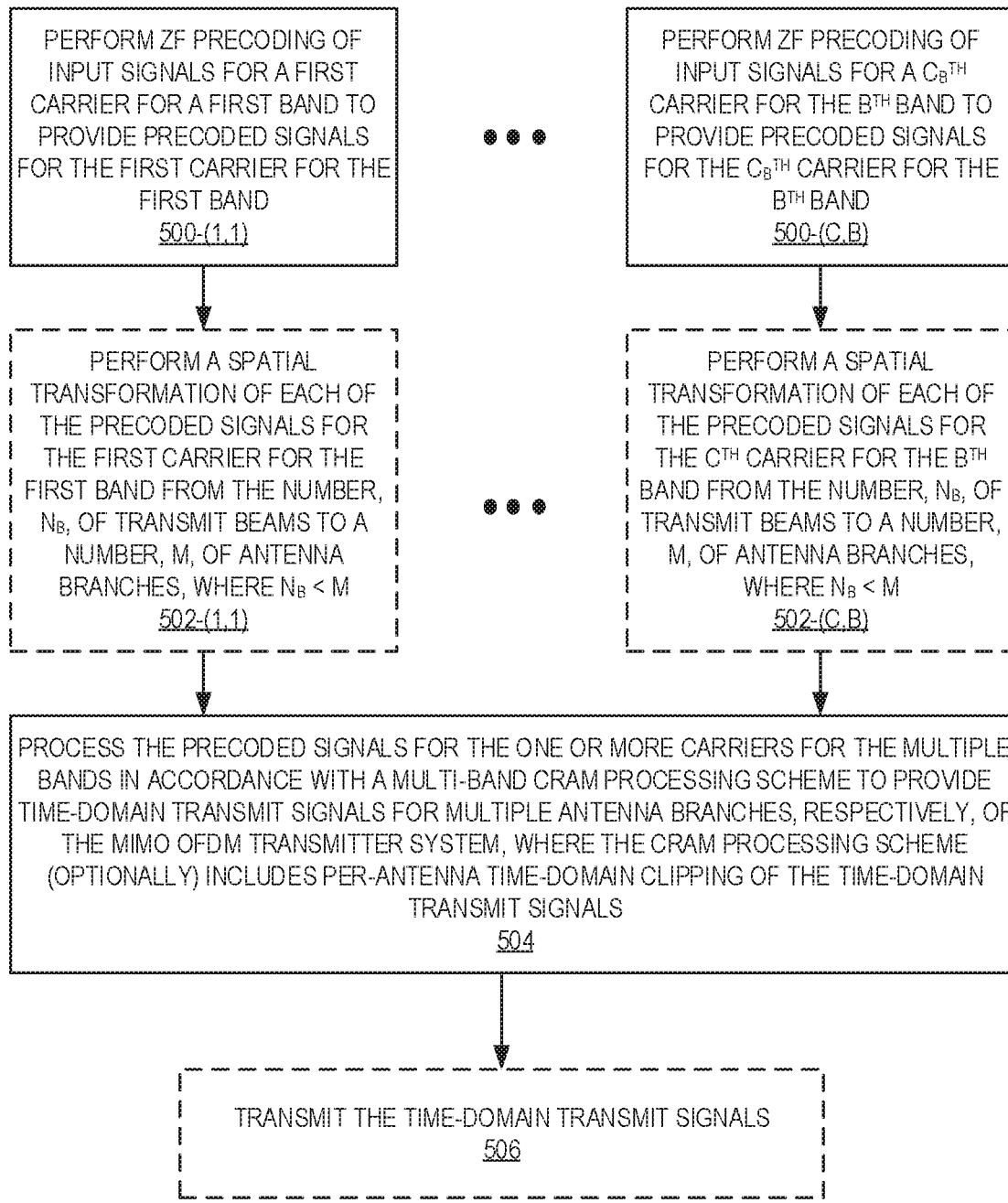
FIG. 23 is a flow chart that illustrates the operation of the transmitter system in accordance with some embodiments of the present disclosure in which the CRAM algorithm is the multi-band CRAM algorithm.

FIG. 23 is a flow chart that illustrates the operation of the transmitter system 10 in accordance with some embodiments of the present disclosure in which the CRAM algorithm is the multi-band CRAM algorithm described above. The CRAM algorithm used here may use the conventional frequency-domain X-update of Equation 7, the frequency-domain X-update of Equation 11, or the frequency-domain X-update of Equation 16, 17, or 18. This process is performed by the transmitter system 10 of FIG. 4 using, e.g., the architecture for the baseband processing system 12 of FIGS. 20, 21A-21D, and 22.

As illustrated, for each c-th carrier for c=1, . . . , C in each b-th frequency band for b=1, . . . , B, the transmitter system 10, and in particular the baseband processing system 12, performs (e.g., ZF) precoding of the frequency-domain input signals s$_{n,c,b}$ for n=1, . . . , N to provide the N (potentially port-reduced) frequency-domain precoded signals for the c-th carrier, as described above (step 500-($c,b$)). In some embodiments, port reduction is not performed, and as such the N frequency-domain precoded signals for the c-th carrier in the b-th frequency band are the N frequency-domain precoded signals z$_{n,c}^{ZF}$ for n=1, . . . , N for the c-th carrier in the b-th frequency band. In some other embodiments, the N frequency-domain precoded signals for the c-th carrier in the b-th frequency band are the N port-reduced frequency-domain precoded signals for the c-th carrier in the b-th frequency band. If port reduction is used, then the transmitter system 10, and in particular the baseband processing system 12, performs a spatial transformation of each of the N port-reduced frequency-domain precoded signals for the c-th carrier in the b-th frequency band from the number (N$_B$) of transmit beams to the number (M) of antenna branches where N$_B$<M to thereby provide the N frequency-domain precoded signals $x_{n,b,c}^{ZF}$ for the c-th carrier in the b-th frequency band, as described above (step 502-(c,b)). Note that step 502-(c,b) is optional, as indicated by the dashed lines, depending on whether or not port reduction is used.

The transmitter system 10, and in particular the baseband processing system 12, processes the frequency-domain precoded signals $x_{n,c,b}^{ZF}$ for n=1, . . . , N for all C carriers in all B frequency bands in accordance with a multi-band CRAM processing scheme to provide M time-domain multi-band transmit signals for the M antenna branches of the transmitter system 10 (step 504), as described above. Optionally, the transmitter system 10, and in particular the RF transmitter system 14, transmits the M time-domain multi-band transmit signals (step 506).

Figure 24A:
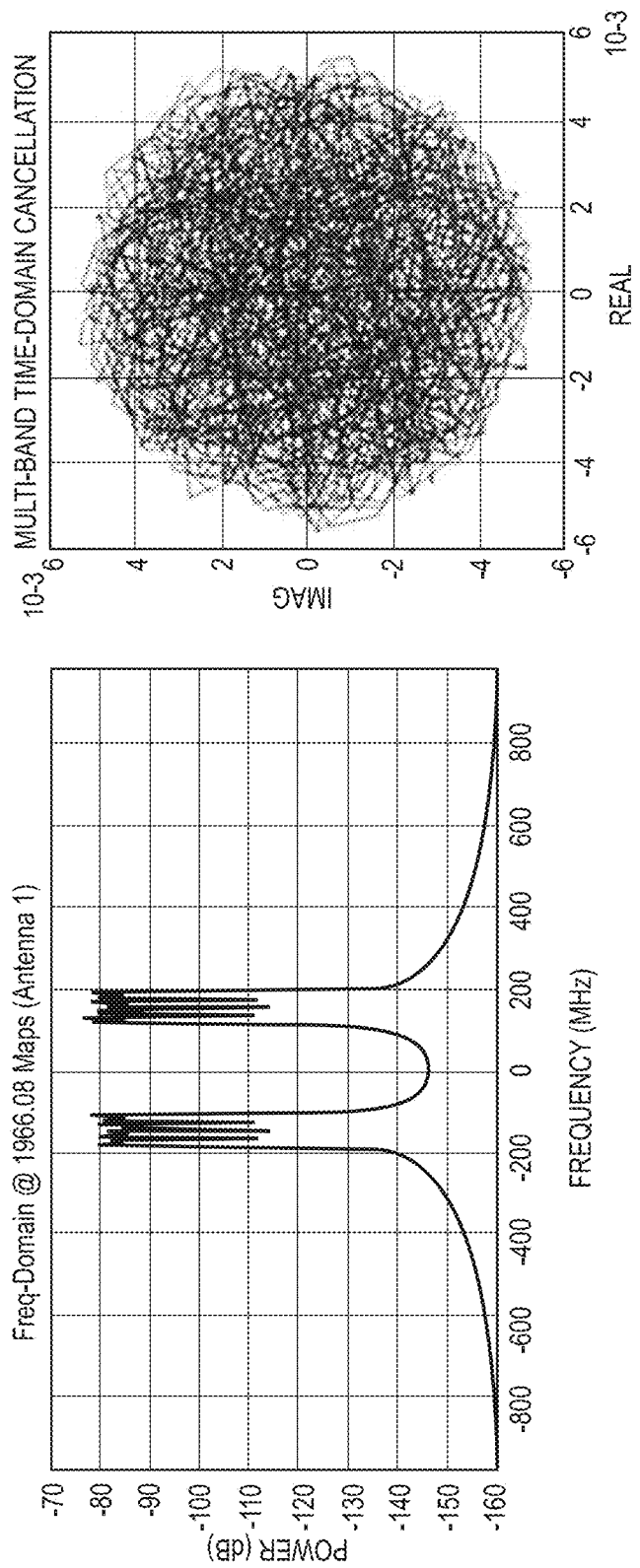
FIGS. 24A and 24B illustrate simulation results for an example simulation single band versus multi-band CRAM.
Figure 24B:
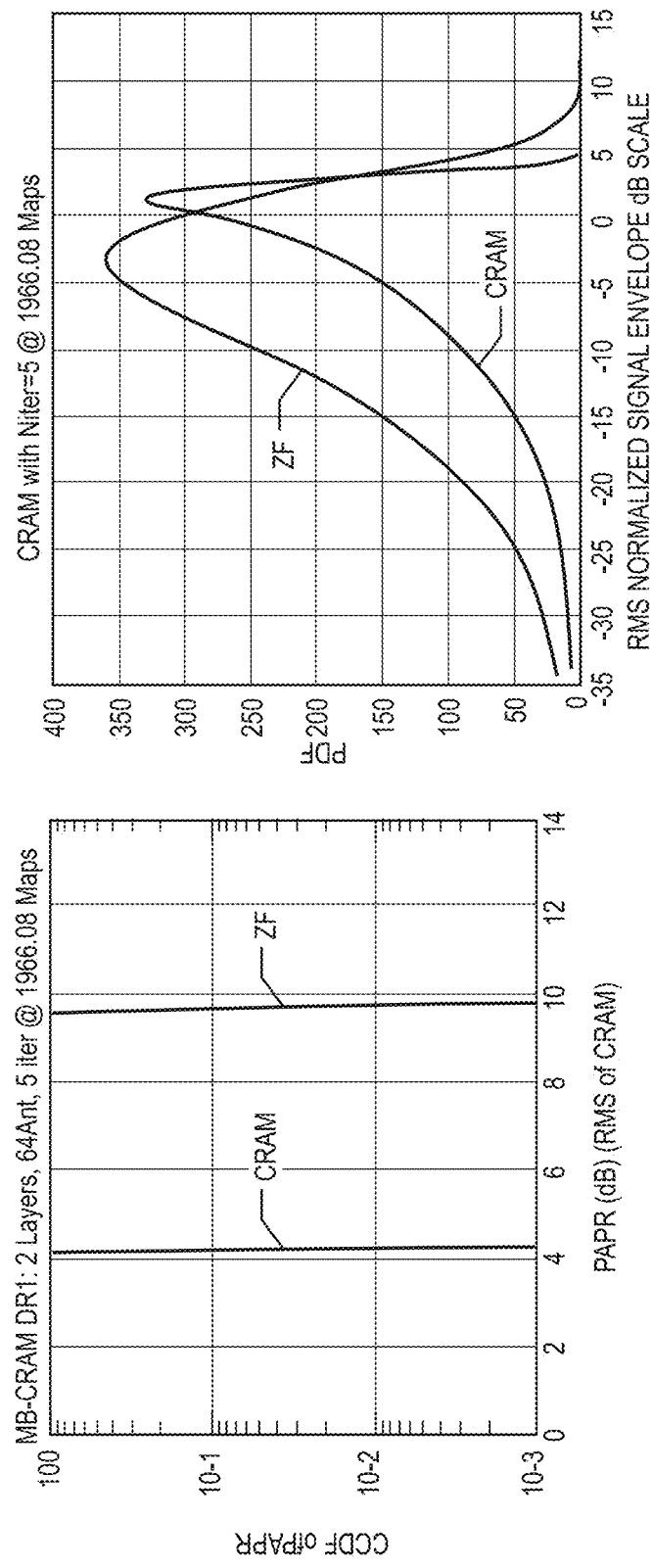

Simulations presented in FIGS. 24A and 24B demonstrate the successful operation of the CRAM extensions for multi-band operation provided embodiments of the present disclosure. The simulations capture the following scenario:
 Two bands separated by 300 MHz.
 Each band contains four 20 MHz LTE carriers each sampled at 30.72 Msps.
 A high sampling rate of 491.52 Msps is used for the Z-Update and Y-Update of CRAM.
 A sampling rate of 1966.08 Msps is used for post-processing results to observe the final time-domain waveforms.

As shown in FIGS. 24A and 24B, the PAPR is reduced to 4.3 dB compared to 3.3 dB in the previous single-band configuration. However, it is worth mentioning that the power penalty was also reduced by 1.5 dB, so that the PAZF of this dual-band configuration is better than that of the previous single-band configuration by 0.6 dB.

TABLE 1

Performance of Multi-band CRAM for 20 channel instances, 20 OFDM symbols per channel instance and 5 CRAM iterations

| | PAPR target: 4 dB Donut level: 0.8 | | | |
|---|---|---|---|---|
| Carrier configuration | 99.9% RMS Penalty [dB] | 99.9% PAPR Level [dB] | 99.9% Peak Reduction [dB] | 99.9% PAZF Level [dB] |
| B0: 4 × 20 MHz contiguous B1: 4 × 20 MHz contiguous | 1.0 | 4.3 | 4.5 | 5.2 |

These results in Table 3 demonstrate that the multi-band extension to CRAM may be used successfully to handle multi-band systems in a flexible manner with no compromise in PAPR reduction capability.

CRAM Extension for Incomplete Channel Knowledge

Figure 25:
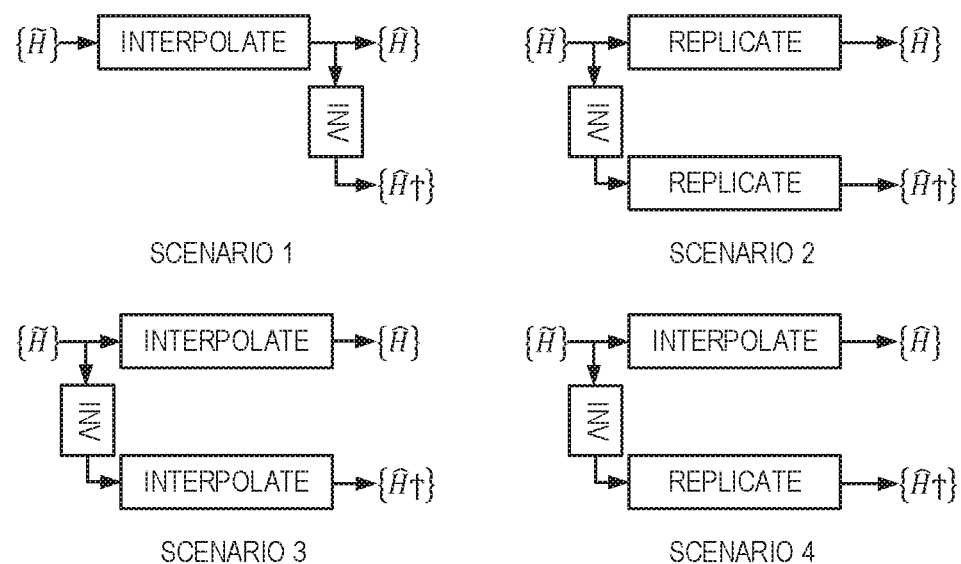
FIG. 25 illustrates four inversion and interpolation schemes for obtaining full MIMIO channel knowledge from incomplete MIMO channel information.

To obtain a channel estimate $\hat{H}$ and its pseudo-inverse $\hat{H}^\dagger$ for every tone as required by the CRAM X-update, in some embodiments, any one of the four inversion and interpolation schemes shown in FIG. 25 may be used, each having different performance and computational complexity profiles. The schemes are as follows:
 Scheme 1—The channel estimates are interpolated first, and then a pseudo-inverse is computed for each interpolated channel matrix.
 Scheme 2—The pseudo-inverse of the channel estimate is first computed, and then both the channel estimate and its pseudo-inverse are replicated (no interpolation instead use the same measurement for all nearby tones).
 Scheme 3—The pseudo-inverse of the channel estimate is first computed, and then both the channel estimate and its pseudo-inverse are interpolated.
 Scheme 4—The pseudo-inverse of the channel estimate is first computed, and then the channel estimate is interpolated but its pseudo-inverse is replicated.

In addition or alternatively, projection matrices used for the CRAM procedure may be interpolated and/or replicated and/or extrapolated from known MIMO channel information.

Simulations demonstrate the effectiveness of the four inversion and interpolation schemes FIG. 25. The following simulation results use the following configurations:
 The simulations use the 3GPP EVA channel model, 2 layers, 64 antennas, 0.5 spatial correlation, cross polarized.
 Ideal channel H is generated for every tone.
 The channels are sampled with a specified PRB granularity of X tones.
 −5 dB noise is added to the sampled channel responses $\hat{H}$.
 $\hat{H}$ and $\hat{H}^\dagger$ are estimated as specified per each scenario.

Figure 26:
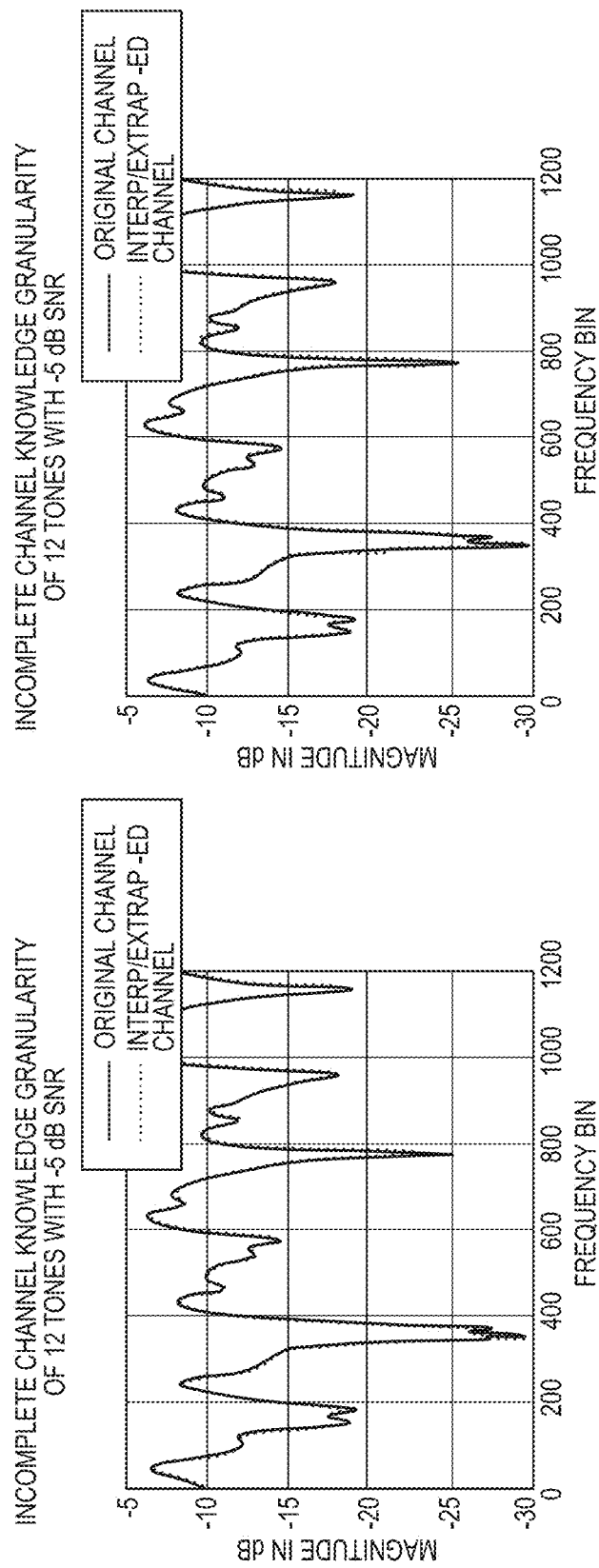
FIG. 26 illustrates simulation results for an EVA channel and its interpolated approximation and replicated approximation for a 12-tone granularity.

FIG. 26 shows the 3GPP EVA channel model and its interpolated approximation (left) and its replicated approximation (right) for a granularity of 12 tones (i.e., one PRB).

The four inversion and interpolation schemes provided in FIG. 25 were simulated using this channel model and the PAPR and EVM performance is shown in Table 4.

First, it is shown that the ZF solution (unclipped signal with 10.3 dB PAPR) has 1.7% EVM when the pseudo-inverse is computed for every tone, 1.87% when pseudo inverse is computed only at the measured tones and then interpolated and 7.5% when no interpolation is applied. Note that although scenario 4 shows a replicated pseudo-inverse for CRAM, ZF used an interpolated channel to enable a fair comparison with CRAM.

TABLE 2

PAPR and EVM performance of both ZF and CRAM using the four inversion & interpolation schemes provided by an embodiment of the present disclosure with PRB-based granularity.

| | Scenario 1 | Scenario 2 | Scenario 3 | Scenario 4 |
|---|---|---|---|---|
| ZF EVM | 1.74% | 7.5% | 1.87% | 1.87% |
| CRAM EVM | 1.96% | 7.95% | 2.11% | 2.23% |
| ZF PAPR | | | 10.3 | |
| CRAM PAZF | | | 5.9 | |
| CRAM RMS Penalty | | | 2.6 | |
| CRAM PAPR | | | 3.3 | |
| CRAM Peak Reduction | | | 4.4 | |

While CRAM has a similar degradation in EVM performance when replication or interpolation is applied, an interpolation for either the channel or the pseudo-inverse is enough to restore an acceptable performance. Note that CRAM has relatively worse EVM than unclipped ZF of up to 0.5%.

These results demonstrate that the four inversion and interpolation schemes provided in FIG. 25 may be used successfully to deal with incomplete channel knowledge a common limitation in practical wireless systems.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as Read-Only Memory (ROM), Random-Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 27:
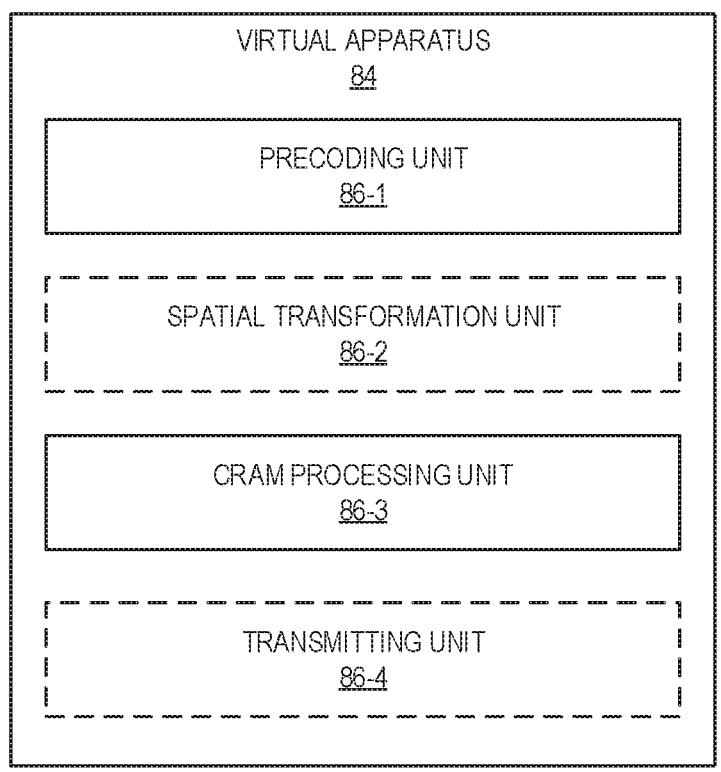
FIG. 27 illustrates a schematic block diagram of an apparatus in which embodiments of the present disclosure may be implemented.

In this regard, FIG. 27 illustrates a schematic block diagram of an apparatus 84 in which embodiments of the present disclosure may be implemented. The apparatus 84 may be implemented in a transmitter (e.g., the OFDM transmitter 10). The apparatus 84 is operable to carry out the example method described with reference to FIGS. 6, 11, 12, 18, and/or 23 and possibly any other processes or methods disclosed herein. It is also to be understood that the method of FIGS. 6, 11, 12, 18, and/or 23 is not necessarily carried out solely by the apparatus 84. At least some operations of the method can be performed by one or more other entities.

Virtual Apparatus 84 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols, as well as instructions for carrying out one or more of the techniques described herein, in several embodiments. In some implementations, the processing circuitry may be used to cause a precoding unit 86-1, an optional spatial transformation unit 86-2, a CRAM processing unit 86-3, and an optional transmitting unit 86-4, and any other suitable units of the apparatus 84 to perform corresponding functions according one or more embodiments of the present disclosure.

As illustrated in FIG. 27, the apparatus 84 includes the precoding unit 86-1 that operates to performing precoding as described herein, the optional spatial transformation unit 86-2 that operates to perform spatial transformation as described herein, the CRAM processing unit 86-3 that operates to perform CRAM processing as described herein, and the optional transmitting unit 86-4 that operates to perform transmission as described herein.

The term unit may have conventional meaning in the field of electronics, electrical devices and/or electronic devices, and may include, for example, electrical and/or electronic circuitry, devices, modules, processors, memory, logic solid state and/or discrete devices, computer programs or instructions for carrying out respective tasks, procedures, computations, outputs, and/or displaying functions, and so on, such as those that are described herein.

The following acronyms are used throughout this disclosure.

1D-DFT One Dimensional Discrete Fourier Transform
2D-DFT Two Dimensional Discrete Fourier Transform
3GPP Third Generation Partnership Project
5G Fifth Generation
MS Adaptive Antenna System
ADC Analog-to-Digital Converter
ADMM Alternative Direction Method of Multipliers
ASIC Application Specific Integrated Circuit
CCDF Complementary Cumulative Distribution Function
CORDIC Coordinate Rotation Digital Computer
CP Cyclic Prefix
CRAM Convex Reduction of Amplitudes
CSI Channel State Information
dB Decibels
DFT Discrete Fourier Transform
EVA Extended Vehicular A (3GPP channel model)
DSP Digital Signal Processor
EM Expectation Maximization
eNB Evolved or Enhanced Node B
EVM Error Vector Magnitude
F/F Flip/Flip
FFT Fast Fourier Transform
FISTA Fast Iterative Shrinkage-Thresholding Algorithm
FITRA Fast Iterative Truncation Algorithm
FPGA Field Programmable Gate Array
GAMP Generalized Approximate Message Passing
IFFT Inverse Fast Fourier Transform
kHz Kilohertz
LUT Look Up Table
LTE Long Term Evolution
MIMO Multiple Input Multiple Output
MHz Megahertz
MU-MIMO Multi-User Multiple Input Multiple Output
MUI Multi-User Interference
Msps Million Samples Per Second
NCO Numerically Controlled Oscillators
NR New Radio
OFDM Orthogonal Frequency Division Multiplexing
PAPR Peak-to-Average Power Ratio
PAZF Peak-to-Average Zero-Forcing
PRB Physical Resource Block
P/S Parallel-to-Serial
RAIT Reciprocity Assisted Interference aware Transmission
RAM Random Access Memory
RF Radio Frequency
RMS Root Mean Square
ROM Read-Only Memory
S/P Serial-to-Parallel
SVD Singular Value Decomposition
UE User Equipment
ZF Zero-Forcing Those skilled in the art will recognize improvements and modifications to the embodiments of the present disclosure. All such improvements and modifications are considered within the scope of the concepts disclosed herein and the claims that follow.

REFERENCES

[1] C. Studer et al., "PAR-Aware Large-Scale Multi-User MIMO-OFDM Downlink," IEEE Journal on Selected Areas in Communications, Vol. 31, No. 2, February 2013.
[2] H. Bao et al., "An Efficient Bayesian PAPR Reduction Method for OFDM-Based Massive MIMO Systems," IEEE Transactions on Wireless Communications, Vol. 15, No. 6, June 2016.
[3] H. Bao et al., "Perturbation-Assisted PAPR Reduction for Large-Scale MIMO-OFDM Systems via ADMM," submitted for publication, July 2016.
[4] C. Studer et al., "Democratic Representations," CORR abs/1401.3420, Apr. 22, 2015, 43 pages.
[5] N. Parikh and S. Boyd, "Proximal Algorithms," Foundations and Trends in Optimization, Vol. 1, No. 3, 2013.
[6] Bo Lincoln, "RAIT Algorithm Description", Ericsson Internal, PA6, Apr. 4, 2016

What is claimed is:

1. A method of operation of a Multiple Input Multiple Output, MIMO, Orthogonal Division Multiplexing, OFDM, transmitter system, comprising:
for each carrier of two or more carriers, performing precoding of a plurality of frequency-domain input signals for the carrier to provide a plurality of frequency-domain precoded signals for the carrier, the plurality of frequency-domain input signals for the carrier being for a plurality of transmit layers for the carrier, respectively; and
processing two or more pluralities of the frequency-domain precoded signals for the two or more carriers, respectively, in accordance with a multi-carrier Convex Reduction of Amplitudes, CRAM, processing scheme to provide a plurality of multi-carrier time-domain transmit signals for a plurality of antenna branches, respectively, of the MIMO OFDM transmitter system;
wherein processing the two or more pluralities of the frequency-domain precoded signals for the two or more carriers, respectively, in accordance with the multi-carrier CRAM processing scheme comprises, for each c-th carrier of the two or more carriers:
for each n-th frequency-domain precoded signal of the plurality of the frequency-domain precoded signals for the carrier for n=1, . . . , N:
performing a frequency-domain X-update procedure on the n-th frequency-domain precoded signal for the carrier in accordance with:

$$x_{n,c}^{(k)} = C_{n,c} \cdot z_{n,c}^{(k-1)} + x_{n,c}^{ZF}$$

where:
$x_{n,c}^{(k)}$ is an X-update output for the c-th carrier for a k-th iteration of the multi-carrier CRAM processing scheme for the n-th frequency-domain precoded signal;
$C_{n,c}$ is a projection matrix for the n-th frequency-domain precoded signal for the c-th carrier that is defined as $C_{n,c} = I - P_{n,c}^{ZF} H_{n,c}$ where I is an identity matrix, $P_{n,c}^{ZF}$ is a zero-forcing precoding matrix applied to the n-th frequency-domain input signal of the plurality of frequency-domain input signals for the c-th carrier during precoding to provide the n-th frequency-domain precoded signal for the c-th carrier, and $H_{n,c}$ is a channel matrix for the n-th frequency-domain precoded signal for the c-th carrier;
$z_{n,c}^{(k-1)}$ is a Z-update output for the c-th carrier for a (k−1)-th iteration of a Z-update procedure for the n-th frequency-domain precoded signal; and
$x_{n,c}^{ZF}$ is the n-th frequency-domain precoded signal for the c-th carrier.

2. The method of claim 1 wherein the multi-carrier CRAM processing scheme incorporates multi-cell interference scenarios.

3. The method of claim 2 wherein processing the two or more pluralities of the frequency-domain precoded signals for the two or more carriers, respectively, in accordance with the multi-carrier CRAM processing scheme comprises, for each c-th carrier of the two or more carriers:
for each n-th frequency-domain precoded signal of the plurality of the frequency-domain precoded signals for the c-th carrier for n=1, . . . , N:
performing a frequency-domain X-update procedure on the n-th frequency-domain precoded signal for the c-th carrier in accordance with:

$$x_{n,c}^{(k)} = \begin{bmatrix} \hat{H}_{Intra,n,c} \\ \hat{H}_{Inter,n,c} \end{bmatrix}^\dagger \begin{bmatrix} s_{n,c} \\ 0 \end{bmatrix} + \left( I - \begin{bmatrix} \hat{H}_{Intra,n,c} \\ \hat{H}_{Inter,n,c} \end{bmatrix}^\dagger \begin{bmatrix} \hat{H}_{Intra,n,c} \\ \hat{H}_{Inter,n,c} \end{bmatrix} \right) z_{n,c}^{(k-1)}$$

where:
$x_{n,c}^{(k)}$ is an X-update output for a k-th iteration of the multi-carrier CRAM processing scheme for the n-th frequency-domain precoded signal of a desired cell in a wireless communication system for the c-th carrier;
$\hat{H}_{Intra,n,c}$ is a channel matrix for a MIMO channel for the n-th frequency-domain precoded signal for the desired cell for the c-th carrier;
$\hat{H}_{Inter,n,c}$ is a channel matrix for a MIMO channel for interference from an interfering cell in the wireless communication system for the c-th carrier;
$s_{n,c}$ is an n-th frequency-domain input signal of the plurality of frequency-domain input signals of the desired cell for the c-th carrier;

$$I - \begin{bmatrix} \hat{H}_{Intra,n,c} \\ \hat{H}_{Inter,n,c} \end{bmatrix}^\dagger \begin{bmatrix} \hat{H}_{Intra,n,c} \\ \hat{H}_{Inter,n,c} \end{bmatrix}$$

is a projection matrix for the n-th frequency-domain precoded signal for the c-th carrier where I is an identity matrix; and
$z_{n,c}^{(k-1)}$ is a Z-update output for a (k−1)-th iteration of a Z-update procedure for the n-th frequency-domain precoded signal of the desired cell for the c-th carrier.

4. The method of claim 2 wherein processing the two or more pluralities of the frequency-domain precoded signals for the two or more carriers, respectively, in accordance with the multi-carrier CRAM processing scheme comprises, for each c-th carrier of the two or more carriers:
for each n-th frequency-domain precoded signal of the plurality of the frequency-domain precoded signals for the c-th carrier for n=1, . . . , N:
performing a frequency-domain X-update procedure on the n-th frequency-domain precoded signal for the c-th carrier in accordance with:

$$x_{n,c}^{(k)} = K_c \cdot \hat{H}_{Intra,n,c}^H s_{n,c} - (I - K_c \cdot \Theta_c - K_c \cdot \Lambda_c) z_{n,c}^{(k-1)}$$

where:
- $x_{n,c}^{(k)}$ is an X-update output for a k-th iteration of the multi-carrier CRAM processing scheme for the n-th frequency-domain precoded signal of a desired cell of a wireless communication system for the c-th carrier;
- $K_c$ is defined as $K_c=(\hat{H}_{Intra,n,c}{}^H\hat{H}_{Intra,n,c}+\Lambda_c)^{-1}$ where $\hat{H}_{Intra,n,c}$ is known and is a channel matrix for a MIMO channel for the n-th frequency-domain precoded signal for the desired cell for the c-th carrier, and $\Lambda_c$ is a covariance matrix defined as $\Lambda_c=\hat{H}_{Inter,n,c}{}^H\cdot\hat{H}_{Inter,n,c}$ where $\hat{H}_{Inter,n,c}$ is unknown and is a channel matrix for a MIMO channel for interference from an interfering cell in the wireless communication system for the c-th carrier;
- $\hat{H}_{Intra,n,c}{}^H$ is a Hermitian transpose of the channel matrix $\hat{H}_{Intra,n,c}$;
- $s_{n,c}$ is an n-th frequency-domain input signal of the plurality of frequency-domain input signals of the desired cell for the c-th carrier;
- $I-K_c\cdot\Theta_c-K_c\cdot\Lambda_c$ is a projection matrix where I is an identity matrix and $\Theta_c=\hat{H}_{Intra,n,c}{}^H\cdot\hat{H}_{Intra,n,c}$; and
- $z_{n,c}^{(k-1)}$ is a Z-update output for a (k−1)-th iteration of a Z-update procedure for the n-th frequency-domain precoded signal of the desired cell for the c-th carrier.

5. The method of claim 2 wherein processing the two or more pluralities of the frequency-domain precoded signals for the two or more carriers, respectively, in accordance with the multi-carrier CRAM processing scheme comprises, for each c-th carrier of the two or more carriers:
for each n-th frequency-domain precoded signal of the plurality of the frequency-domain precoded signals for the c-th carrier for n=1, . . . , N:
performing a frequency-domain X-update procedure on the n-th frequency-domain precoded signal for the c-th carrier in accordance with:

$$x_{n,c}^{(k)}=K_c\cdot\hat{H}_{Intra,n,c}{}^H s_{n,c}-(I-K_c\cdot\Theta_c-K_c\cdot\hat{\Lambda}_c)z_{n,c}^{(k-1)}$$

where:
- $X_{n,c}^{(k)}$ is an X-update output for a k-th iteration of the multi-carrier CRAM processing scheme for the n-th frequency-domain precoded signal of a desired cell in a wireless communication system for the c-th carrier;
- $K_c$ is defined as $K_c=(\hat{H}_{Intra,n,c}{}^H\hat{H}_{Intra,n,c}+\hat{\Lambda}_c)^{-1}$ where $\hat{H}_{Intra,n,c}$ is a channel matrix for a MIMO channel for the n-th frequency-domain precoded signal for the desired cell for the c-th carrier, and $\hat{\Lambda}_c$ is a known estimate of a covariance of an inter-cell interference response for the c-th carrier;
- $\hat{H}_{Intra,n,c}{}^H$ is a Hermitian transpose of the channel matrix $\hat{H}_{Intra,n,c}$;
- $s_{n,c}$ is an n-th frequency-domain input signal of the plurality of frequency-domain input signals of the desired cell for the c-th carrier;
- $I-K_c\cdot\Theta_c-K_c\cdot\hat{\Lambda}_c$ is a projection matrix where I is an identity matrix and $\Theta_c=\hat{H}_{Intra,n,c}{}^H\cdot\hat{H}_{Intra,n,c}$; and
- $z_{n,c}^{(k-1)}$ is a Z-update output for a (k−1)-th iteration of a Z-update procedure for the n-th frequency-domain precoded signal of the desired cell for the c-th carrier.

6. The method of claim 2 wherein:
processing the two or more pluralities of the frequency-domain precoded signals for the two or more carriers, respectively, in accordance with the multi-carrier CRAM processing scheme further comprises, for each c-th carrier of the two or more carriers, for each k-th iteration of the multi-carrier CRAM processing scheme:
re-ordering the X-update outputs of the frequency-domain X-update procedure performed on the plurality of the frequency-domain precoded signals for the c-th carrier to provide a plurality of frequency-domain re-ordered signals for the c-th carrier;
converting the plurality of frequency-domain re-ordered signals for the c-th carrier from a frequency-domain to a time-domain to provide a plurality of time-domain signals for the plurality of antenna branches, respectively, for the c-th carrier; and
performing time-domain processing of the plurality of time-domain signals for the c-th carrier to provide a plurality of time-domain transmit signals for the plurality of antenna branches, respectively, for the c-th carrier; and the method further comprises, for each m-th antenna branch of the plurality of antenna branches, for each k-th iteration of the multi-carrier CRAM processing scheme:
combining the time-domain transmit signals for the two or more carriers that are for the m-th antenna branch to provide the multi-carrier time-domain transmit signal for the m-th antenna branch;
performing a Z-update procedure on the multi-carrier time-domain transmit signal for the m-th antenna branch for the two or more carriers in accordance with:

$$Z_m^{(k)}(t)=Z_m^{(k-1)}(t)+Y_m^{(k)}(t)-X_m^{(k)}(t)$$

where:
- $Z_m^{(k)}(t)$ is a time-domain Z-update output for the m-th antenna branch for the k-th iteration of the multi-carrier CRAM processing scheme;
- $Z_m^{(k-1)}(t)$ is a time-domain Z-update output for the m-th antenna branch for the (k−1)-th iteration of the multi-carrier CRAM processing scheme;
- $Y_m^{(k)}(t)$ is for the m-th antenna branch and is defined as:

$$Y_m^{(k)}(t) = \begin{cases} \frac{Th_{high}}{|errY_m^{(k)}(t)|} \times errY_m^{(k)}(t), & \text{if } |errY_m^{(k)}(t)| > Th_{high} \\ \frac{Th_{low}}{|errY_m^{(k)}(t)|} \times errY_m^{(k)}(t), & \text{if } |errY_m^{(k)}(t)| < Th_{low} \\ Th_{low}, & \text{if } |errY_m^{(k)}(t)| = 0 \\ errY_m^{(k)}(t), & \text{otherwise} \end{cases}$$

where $$errY_m^{(k)}(t)=2\cdot X_m^{(k)}(t)-Z_m^{(k-1)}(t); \text{ and}$$

- $X_m^{(k)}(t)$ is the multi-carrier time-domain transmit signal for the m-th antenna branch for the two or more carriers for the k-th iteration of the multi-carrier CRAM processing scheme;

for each c-th carrier of the two or more carriers:
performing time-domain processing of the time-domain Z-update outputs for the plurality of antenna branches to provide a plurality of processed time-domain Z-update outputs for the plurality of antenna branches, respectively, for the c-th carrier;

converting the plurality of processed time-domain Z-update outputs for the c-th carrier from the time-domain to the frequency-domain to provide frequency-domain Z-update outputs for the c-th carrier; and performing a reverse re-ordering of the frequency-domain Z-update outputs for the c-th carrier to provide the Z-update outputs for the frequency-domain X-update procedures for the c-th carrier.

7. The method of claim 1 wherein:

the MIMO OFDM transmitter system is a concurrent multi-band transmitter system that concurrently transmits on two or more frequency bands;

the two or more carriers comprise at least one carrier in a first frequency band of the two or more frequency bands and at least one carrier in a second frequency band of the two or more frequency bands; and the multi-carrier CRAM processing scheme is a multi-band CRAM processing scheme such that the plurality of multi-carrier time-domain transmit signals for the plurality of antenna branches, respectively, is a plurality of multi-band time-domain transmit signals for the plurality of antenna branches, respectively.

8. The method of claim 7 wherein:

processing the two or more pluralities of the frequency-domain precoded signals for the two or more carriers, respectively, in accordance with the multi-carrier CRAM processing scheme further comprises:

for each c-th carrier of the at least one carrier in the first frequency band, for each k-th iteration of the multi-carrier CRAM processing scheme:

re-ordering the X-update outputs of the frequency-domain X-update procedure performed on the plurality of the frequency-domain precoded signals for the c-th carrier in the first frequency band to provide a plurality of frequency-domain re-ordered signals for the c-th carrier in the first frequency band;

converting the plurality of frequency-domain re-ordered signals for the c-th carrier in the first frequency band from a frequency-domain to a time-domain to provide a plurality of time-domain signals for the plurality of antenna branches, respectively, for the c-th carrier in the first frequency band; and performing time-domain processing of the plurality of time-domain signals for the c-th carrier in the first frequency band to provide a plurality of time-domain transmit signals for the plurality of antenna branches, respectively, for the c-th carrier in the first frequency band;

for each c-th carrier of the at least one carrier in the second frequency band, for each k-th iteration of the multi-carrier CRAM processing scheme:

re-ordering the X-update outputs of the frequency-domain X-update procedure performed on the plurality of the frequency-domain precoded signals for the c-th carrier in the second frequency band to provide a plurality of frequency-domain re-ordered signals for the c-th carrier in the second frequency band;

converting the plurality of frequency-domain re-ordered signals for the c-th carrier in the second frequency band from the frequency-domain to the time-domain to provide a plurality of time-domain signals for the plurality of antenna branches, respectively, for the c-th carrier in the second frequency band; and performing time-domain processing of the plurality of time-domain signals for the c-th carrier in the second frequency band to provide a plurality of time-domain transmit signals for the plurality of antenna branches, respectively, for the c-th carrier in the second frequency band;

the method further comprises, for each m-th antenna branch of the plurality of antenna branches:

for each b-th frequency band of the first frequency band and the second frequency band:

combining the time-domain transmit signals for the at least one carrier in the b-th frequency band that are for the m-th antenna branch to provide a multi-carrier time-domain transmit signal for the b-th frequency band for the m-th antenna branch;

frequency translating the multi-carrier time-domain transmit signal for the b-th frequency band for the m-th antenna branch to a predefined frequency offset for the b-th frequency band; and combining the frequency-translated multi-carrier time-domain transmit signals for the at least one carrier in the b-th frequency band to provide the multi-band transmit signal for the m-th antenna branch.

9. The method of claim 8 further comprising:

for each m-th antenna branch of the plurality of antenna branches:

for each b-th frequency band of the first and second frequency bands, performing a Z-update procedure on the multi-carrier time-domain transmit signal for the m-th antenna branch for the b-th frequency band in accordance with:

$$Z_{m,b}^{(k)}(t)=Z_{m,b}^{(k-1)}(t)+Y_{m,b}^{(k)}(t)-X_{m,b}^{(k)}(t)$$

where:

$Z_{m,b}^{(k)}(t)$ is a time-domain Z-update output for the k-th iteration of the multi-carrier CRAM processing scheme for the m-th antenna branch for the b-th frequency band;

$Z_m^{(k-1)}(t)$ is a time-domain Z-update output for the (k−1)-th iteration of the multi-carrier CRAM processing scheme for the m-th antenna branch for the b-th frequency band;

$Y_{m,b}^{(k)}(t)$ for the m-th antenna branch for the b-th frequency band is defined as:

$$Y_{m,b}^{(k)}(t) = \begin{cases} \frac{Th_{high}}{PE} \times errY_{m,b}^{(k)}(t), & \text{if } PE > Th_{high} \\ \frac{Th_{low}}{PE} \times errY_{m,b}^{(k)}(t), & \text{if } PE < Th_{low} \\ \frac{Th_{low}}{B}, & \text{if } PE = 0 \\ errY_{m,b}^{(k)}(t), & \text{otherwise} \end{cases}$$

where $errY_{m,b}^{(k)}(t)=2\cdot X_{m,b}^{(k)}(t)-Z_{m,b}^{(k-1)}(t);$ $PE=\Sigma_{b=0}^{B-1} |errY_{m,b}^{(k)}(t)|$, and B is the number of frequency bands; and $X_{m,b}^{(k)}(t)$ is the multi-carrier time-domain transmit signal for the k-th iteration of the multi-carrier CRAM processing scheme for the m-th antenna branch for the b-th frequency band; and processing the time-domain Z-update outputs for the plurality of antenna branches each carrier in each frequency band to provide the Z-update outputs for the frequency-domain X-update procedures.

10. The method of claim 1 wherein the multi-carrier CRAM processing scheme comprises per-antenna time-domain PAPR reduction.

11. The method of claim 1 wherein:
for each carrier of the two or more carriers, performing precoding of the plurality of frequency-domain input signals for the carrier comprises performing precoding of the plurality of frequency-domain input signals for the carrier based on precoding matrices to thereby precode the plurality of frequency-domain input signals for the carrier into a number, $N_B$, of transmit beams; and
the method further comprises, prior to processing the two or more pluralities of the frequency-domain precoded signals in accordance with the multi-carrier CRAM processing scheme:
for each carrier of the two or more carriers, performing a spatial transformation of each frequency-domain precoded signal of the plurality of the frequency-domain precoded signals for the carrier from the number, $N_B$, of transmit beams to a number, M, of antenna branches, where $N_B<M$.

12. The method of claim 1 further comprising interpolating and/or replicating and/or extrapolating MIMO channel information for all used tones from known MIMO channel information for a subset of the used tones.

13. The method of claim 1 further comprising transmitting the plurality of multi-carrier time-domain transmit signals.

14. A Multiple Input Multiple Output, MIMO, Orthogonal Division Multiplexing, OFDM, transmitter system, comprising:
precoding circuitry operable to, for each carrier of two or more carriers, perform precoding of a plurality of frequency-domain input signals for the carrier to provide a plurality of frequency-domain precoded signals for the carrier, the plurality of frequency-domain input signals for the carrier being for a plurality of transmit layers for the carrier, respectively; and
processing circuitry operable to process two or more pluralities of the frequency-domain precoded signals for the two or more carriers, respectively, in accordance with a multi-carrier Convex Reduction of Amplitudes, CRAM, processing scheme to provide a plurality of multi-carrier time-domain transmit signals for a plurality of antenna branches, respectively, of the MIMO OFDM transmitter system;
wherein, in order to process the two or more pluralities of the frequency-domain precoded signals for the two or more carriers, respectively, in accordance with the multi-carrier CRAM processing scheme, the processing circuitry is further operable to, for each c-th carrier of the two or more carriers:
for each n-th frequency-domain precoded signal of the plurality of the frequency-domain precoded signals for the carrier for n=1, . . . , N:
perform a frequency-domain X-update procedure on the n-th frequency-domain precoded signal for the carrier in accordance with:

$$x_{n,c}^{(k)} = C_{n,c} \cdot z_{n,c}^{(k-1)} + x_{n,c}^{ZF}$$

where:
$x_{n,c}^{(k)}$ is an X-update output for c-th carrier for a k-th iteration of the multi-carrier CRAM processing scheme for the n-th frequency-domain precoded signal;
$C_{n,c}$ is a projection matrix for the n-th frequency-domain precoded signal for c-th carrier that is defined as $C_{n,c} = I - P_{n,c}^{ZF} H_{n,c}$ where I is an identity matrix, $P_{n,c}^{ZF}$ is a zero-forcing precoding matrix applied to the n-th frequency-domain input signal of the plurality of frequency-domain input signals for c-th carrier during precoding to provide the n-th frequency-domain precoded signal for c-th carrier, and $H_{n,c}$ is a channel matrix for the n-th frequency-domain precoded signal for c-th carrier;
$z_{n,c}^{(k-1)}$ is a Z-update output for c-th carrier for a (k−1)-th iteration of a Z-update procedure for the n-th frequency-domain precoded signal; and
$x_{n,c}^{ZF}$ is the n-th frequency-domain precoded signal for c-th carrier.

15. The OFDM transmitter system of claim 14 wherein the multi-carrier CRAM processing scheme incorporates multi-cell interference scenarios.

16. The OFDM transmitter system of claim 15 wherein, in order to process the two or more pluralities of the frequency-domain precoded signals for the two or more carriers, respectively, in accordance with the multi-carrier CRAM processing scheme, the processing circuitry is further operable to, for each c-th carrier of the two or more carriers:
for each n-th frequency-domain precoded signal of the plurality of the frequency-domain precoded signals for the c-th carrier for n=1, . . . , N:
perform a frequency-domain X-update procedure on the n-th frequency-domain precoded signal for the c-th carrier in accordance with:

$$x_{n,c}^{(k)} = \begin{bmatrix} \hat{H}_{Intra,n,c} \\ \hat{H}_{Inter,n,c} \end{bmatrix}^\dagger \begin{bmatrix} s_{n,c} \\ 0 \end{bmatrix} + \left( I - \begin{bmatrix} \hat{H}_{Intra,n,c} \\ \hat{H}_{Inter,n,c} \end{bmatrix}^\dagger \begin{bmatrix} \hat{H}_{Intra,n,c} \\ \hat{H}_{Inter,n,c} \end{bmatrix} \right) z_{n,c}^{(k-1)}$$

where:
$x_{n,c}^{(k)}$ is an X-update output for a k-th iteration of the multi-carrier CRAM processing scheme for the n-th frequency-domain precoded signal of a desired cell in a wireless communication system for the c-th carrier;
$\hat{H}_{Intra,n,c}$ is a channel matrix for a MIMO channel for the n-th frequency-domain precoded signal for the desired cell for the c-th carrier;
$\hat{H}_{Inter,n,c}$ is a channel matrix for a MIMO channel for interference from an interfering cell in the wireless communication system for the c-th carrier;
$s_{n,c}$ is an n-th frequency-domain input signal of the plurality of frequency-domain input signals of the desired cell for the c-th carrier;

$$I - \begin{bmatrix} \hat{H}_{Intra,n,c} \\ \hat{H}_{Inter,n,c} \end{bmatrix}^\dagger \begin{bmatrix} \hat{H}_{Intra,n,c} \\ \hat{H}_{Inter,n,c} \end{bmatrix}$$

is a projection matrix for the n-th frequency-domain precoded signal for the c-th carrier where I is an identity matrix; and $z_{n,c}^{(k-1)}$ a Z-update output for a (k−1)-th iteration of a Z-update procedure for the n-th frequency-domain precoded signal of the desired cell for the c-th carrier.

17. The OFDM transmitter system of claim 15 wherein, in order to process the two or more pluralities of the frequency-domain precoded signals for the two or more carriers, respectively, in accordance with the multi-carrier CRAM processing scheme, the processing circuitry is further operable to, for each c-th carrier of the two or more carriers:

for each n-th frequency-domain precoded signal of the plurality of the frequency-domain precoded signals for the c-th carrier for n=1, . . . , N:
perform a frequency-domain X-update procedure on the n-th frequency-domain precoded signal for the c-th carrier in accordance with:

$$x_{n,c}^{(k)}=K_c\cdot\hat{H}_{Intra,n,c}^H s_{n,c}-(I-K_c\cdot\Theta_c-K_c\cdot\hat{\Lambda}_c)z_{n,c}^{(k-1)}$$

where:
$x_{n,c}^{(k)}$ is an X-update output for a k-th iteration of the multi-carrier CRAM processing scheme for the n-th frequency-domain precoded signal of a desired cell of a wireless communication system for the c-th carrier;
$K_c$ is defined as $K_c=(\hat{H}_{Intra,n,c}^H \hat{H}_{Intra,n,c}+\hat{\Lambda}_c)^{-1}$ where $\hat{H}_{Intra,n,c}$ is known and is a channel matrix for a MIMO channel for the n-th frequency-domain precoded signal for the desired cell for the c-th carrier, and $\Lambda_c$ is a covariance matrix defined as $\Lambda_c=\hat{H}_{Inter,n,c}^H\cdot\hat{H}_{Inter,n,c}$ where $\hat{H}_{Inter,n,c}$ is unknown and is a channel matrix for a MIMO channel for interference from an interfering cell in the wireless communication system for the c-th carrier;
$\hat{H}_{Intra,n,c}^H$ is a Hermitian transpose of the channel matrix $\hat{H}_{Intra,n,c}$;
$s_{n,c}$ is an n-th frequency-domain input signal of the plurality of frequency-domain input signals of the desired cell for the c-th carrier;
$I-K_c\cdot\Theta_c-K_c\cdot\hat{\Lambda}_c$ is a projection matrix where I is an identity matrix and $\Theta_c=\hat{H}_{Intra,n,c}^H\cdot\hat{H}_{Intra,n,c}$; and
$z_{n,c}^{(k-1)}$ is a Z-update output for a (k−1)-th iteration of a Z-update procedure for the n-th frequency-domain precoded signal of the desired cell for the c-th carrier.

18. The OFDM transmitter system of claim 15 wherein, in order to process the two or more pluralities of the frequency-domain precoded signals for the two or more carriers, respectively, in accordance with the multi-carrier CRAM processing scheme, the processing circuitry is further operable to, for each c-th carrier of the two or more carriers:

for each n-th frequency-domain precoded signal of the plurality of the frequency-domain precoded signals for the c-th carrier for n=1, . . . , N:
performing a frequency-domain X-update procedure on the n-th frequency-domain precoded signal for the c-th carrier in accordance with:

$$x_{n,c}^{(k)}=K_c\cdot\hat{H}_{Intra,n,c}^H s_{n,c}-(I-K_c\cdot\Theta_c-K_c\cdot\hat{\Lambda}_c)z_{n,c}^{(k-1)}$$

where:
$x_{n,c}^{(k)}$ is an X-update output for a k-th iteration of the multi-carrier CRAM processing scheme for the n-th frequency-domain precoded signal of a desired cell in a wireless communication system for the c-th carrier;
$K_c$ is defined as $K_c=(\hat{H}_{Intra,n,c}^H \hat{H}_{Intra,n,c}+\hat{\Lambda}_c)^{-1}$ where $\hat{H}_{Intra,n,c}$ is a channel matrix for a MIMO channel for the n-th frequency-domain precoded signal for the desired cell for the c-th carrier, and $\hat{\Lambda}_c$ is a known estimate of a covariance of an inter-cell interference response for the c-th carrier;
$\hat{H}_{Intra,n,c}^H$ is a Hermitian transpose of the channel matrix $\hat{H}_{Intra,n,c}$;
$s_{n,c}$ is an n-th frequency-domain input signal of the plurality of frequency-domain input signals of the desired cell for the c-th carrier;
$I-K_c\cdot\Theta_c-K_c\cdot\hat{\Lambda}_c$ is a projection matrix where I is an identity matrix and $\Theta_c=\hat{H}_{Intra,n,c}^H\cdot\hat{H}_{Intra,n,c}$; and
$z_{n,c}^{(k-1)}$ is a Z-update output for a (k−1)-th iteration of a Z-update procedure for the n-th frequency-domain precoded signal of the desired cell for the c-th carrier.

19. The OFDM transmitter system of claim 15 wherein:

in order to process the two or more pluralities of the frequency-domain precoded signals for the two or more carriers, respectively, in accordance with the multi-carrier CRAM processing scheme, the processing circuitry is further operable to, for each c-th carrier of the two or more carriers, for each k-th iteration of the multi-carrier CRAM processing scheme:

re-order the X-update outputs of the frequency-domain X-update procedure performed on the plurality of the frequency-domain precoded signals for the c-th carrier to provide a plurality of frequency-domain re-ordered signals for the c-th carrier;

convert the plurality of frequency-domain re-ordered signals for the c-th carrier from a frequency-domain to a time-domain to provide a plurality of time-domain signals for the plurality of antenna branches, respectively, for the c-th carrier; and perform time-domain processing of the plurality of time-domain signals for the c-th carrier to provide a plurality of time-domain transmit signals for the plurality of antenna branches, respectively, for the c-th carrier; and the processing circuitry is further operable to, for each m-th antenna branch of the plurality of antenna branches, for each k-th iteration of the multi-carrier CRAM processing scheme:

combine the time-domain transmit signals for the two or more carriers that are for the m-th antenna branch to provide the multi-carrier time-domain transmit signal for the m-th antenna branch;

perform a Z-update procedure on the multi-carrier time-domain transmit signal for the m-th antenna branch for the two or more carriers in accordance with:

$$Z_m^{(k)}(t)=Z_m^{(k-1)}(t)+Y_m^{(k)}(t)-X_m^{(k)}(t)$$

where:
$Z_m^{(k)}(t)$ is a time-domain Z-update output for the m-th antenna branch for the k-th iteration of the multi-carrier CRAM processing scheme;
$Z_m^{(k-1)}(t)$ is a time-domain Z-update output for the m-th antenna branch for the (k−1)-th iteration of the multi-carrier CRAM processing scheme;

$Y_m^{(k)}(t)$ is for the m-th antenna branch and is defined as:

$$Y_m^{(k)}(t) = \begin{cases} \frac{Th_{high}}{|errY_m^{(k)}(t)|} \times errY_m^{(k)}(t), & \text{if } |errY_m^{(k)}(t)| > Th_{high} \\ \frac{Th_{low}}{|errY_m^{(k)}(t)|} \times errY_m^{(k)}(t), & \text{if } |errY_m^{(k)}(t)| < Th_{low} \\ Th_{low}, & \text{if } |errY_m^{(k)}(t)| = 0 \\ errY_m^{(k)}(t), & \text{otherwise} \end{cases}$$

where $errY_m^{(k)}(t) = 2 \cdot X_m^{(k)}(t) - Z_m^{(k-1)}(t)$; and $X_m^{(k)}(t)$ is the multi-carrier time-domain transmit signal for the m-th antenna branch for the two or more carriers for the k-th iteration of the multi-carrier CRAM processing scheme; and for each c-th carrier of the two or more carriers:
perform time-domain processing of the time-domain Z-update outputs for the plurality of antenna branches to provide a plurality of processed time-domain Z-update outputs for the plurality of antenna branches, respectively, for the c-th carrier;
convert the plurality of processed time-domain Z-update outputs for the c-th carrier from the time-domain to the frequency-domain to provide frequency-domain Z-update outputs for the c-th carrier; and
perform a reverse re-ordering of the frequency-domain Z-update outputs for the c-th carrier to provide the Z-update outputs for the frequency-domain X-update procedures for the c-th carrier.

20. The OFDM transmitter system of claim 14 wherein:
the MIMO OFDM transmitter system is a concurrent multi-band transmitter system that concurrently transmits on two or more frequency bands;
the two or more carriers comprise at least one carrier in a first frequency band of the two or more frequency bands and at least one carrier in a second frequency band of the two or more frequency bands; and
the multi-carrier CRAM processing scheme is a multi-band CRAM processing scheme such that the plurality of multi-carrier time-domain transmit signals for the plurality of antenna branches, respectively, is a plurality of multi-band time-domain transmit signals for the plurality of antenna branches, respectively.

21. The OFDM transmitter system of claim 20 wherein:
in order to process the two or more pluralities of the frequency-domain precoded signals for the two or more carriers, respectively, in accordance with the multi-carrier CRAM processing scheme, the processing circuitry is further operable to:
for each c-th carrier of the at least one carrier in the first frequency band, for each k-th iteration of the multi-carrier CRAM processing scheme:
re-order the X-update outputs of the frequency-domain X-update procedures performed on the plurality of the frequency-domain precoded signals for the c-th carrier in the first frequency band to provide a plurality of frequency-domain re-ordered signals for the c-th carrier in the first frequency band;
convert the plurality of frequency-domain re-ordered signals for the c-th carrier in the first frequency band from a frequency-domain to a time-domain to provide a plurality of time-domain signals for the plurality of antenna branches, respectively, for the c-th carrier in the first frequency band; and
perform time-domain processing of the plurality of time-domain signals for the c-th carrier in the first frequency band to provide a plurality of time-domain transmit signals for the plurality of antenna branches, respectively, for the c-th carrier in the first frequency band;
for each c-th carrier of the at least one carrier in the second frequency band, for each k-th iteration of the multi-carrier CRAM processing scheme:
re-order the X-update outputs of the frequency-domain X-update procedures performed on the plurality of the frequency-domain precoded signals for the c-th carrier in the second frequency band to provide a plurality of frequency-domain re-ordered signals for the c-th carrier in the second frequency band;
convert the plurality of frequency-domain re-ordered signals for the c-th carrier in the second frequency band from the frequency-domain to the time-domain to provide a plurality of time-domain signals for the plurality of antenna branches, respectively, for the c-th carrier in the second frequency band; and
perform time-domain processing of the plurality of time-domain signals for the c-th carrier in the second frequency band to provide a plurality of time-domain transmit signals for the plurality of antenna branches, respectively, for the c-th carrier in the second frequency band; and
the processing circuitry is further operable to, for each m-th antenna branch of the plurality of antenna branches:
for each b-th frequency band of the first frequency band and the second frequency band:
combine the time-domain transmit signals for the at least one carrier in the b-th frequency band that are for the m-th antenna branch to provide a multi-carrier time-domain transmit signal for the b-th frequency band for the m-th antenna branch;
frequency translate the multi-carrier time-domain transmit signal for the b-th frequency band for the m-th antenna branch to a predefined frequency offset for the b-th frequency band; and
combine the frequency-translated multi-carrier time-domain transmit signals for the at least one carrier in the b-th frequency band to provide the multi-band transmit signal for the m-th antenna branch.

22. The OFDM transmitter system of claim 21 wherein the processing circuitry is further operable to:
for each m-th antenna branch of the plurality of antenna branches:
for each b-th frequency band of the first and second frequency bands, perform a Z-update procedure on the multi-carrier time-domain transmit signal for the m-th antenna branch for the b-th frequency band in accordance with:

$Z_{m,b}^{(k)}(t) = Z_{m,b}^{(k-1)}(t) + Y_{m,b}^{(k)}(t) - X_{m,b}^{(k)}(t)$ where:
$Z_{m,b}^{k}(t)$ is a time-domain Z-update output for the k-th iteration of the multi-carrier CRAM processing scheme for the m-th antenna branch for the b-th frequency band;

$Z_{m,b}^{(k-1)}(t)$ is a time-domain Z-update output for the (k−1)-th iteration of the multi-carrier CRAM processing scheme for the m-th antenna branch for the b-th frequency band;

$Y_{m,b}^{(k)}(t)$ for the m-th antenna branch for the b-th frequency band is defined as:

$$Y_{m,b}^{(k)}(t) = \begin{cases} \frac{Th_{high}}{PE} \times errY_{m,b}^{(k)}(t), & \text{if } PE > Th_{high} \\ \frac{Th_{low}}{PE} \times errY_{m,b}^{(k)}(t), & \text{if } PE < Th_{low} \\ \frac{Th_{low}}{B}, & \text{if } PE = 0 \\ errY_{m,b}^{(k)}(t), & \text{otherwise} \end{cases}$$

where $errY_{m,b}^{(k)}(t) = 2 \cdot X_{m,b}^{(k)}(t) - Z_{m,b}^{(k-1)}(t);$ $PE = \Sigma_{b=0}^{B-1} |errY_{m,b}^{(k)}(t)|$, and B is the number of frequency bands; and
$X_{m,b}^{(k)}(t)$ is the multi-carrier time-domain transmit signal for the k-th iteration of the multi-carrier CRAM processing scheme for the m-th antenna branch for the b-th frequency band; and
process the time-domain Z-update outputs for the plurality of antenna branches each carrier in each frequency band to provide the Z-update outputs for the frequency-domain X-update procedures.

23. The OFDM transmitter system of claim 14 wherein the multi-carrier CRAM processing scheme comprises per-antenna time-domain PAPR reduction.

24. The OFDM transmitter system of claim 14 wherein:
the precoding circuitry is operable to, for each carrier of the two or more carriers, perform precoding of the plurality of frequency-domain input signals for the carrier based on precoding matrices to thereby precode the plurality of frequency-domain input signals for the carrier into a number, $N_B$, of transmit beams; and
the OFDM transmitter system further comprises spatial transformation circuitry operable to, prior to processing of the two or more pluralities of the frequency-domain precoded signals in accordance with the multi-carrier CRAM processing scheme:
for each carrier of the two or more carriers, perform a spatial transformation of each frequency-domain precoded signal of the plurality of the frequency-domain precoded signals for the carrier from the number, $N_B$, of transmit beams to a number, M, of antenna branches, where $N_B < M$.

25. The OFDM transmitter system of claim 14 wherein MIMO channel information for all used tones is interpolated and/or replicated and/or extrapolated from known MIMO channel information for a subset of the used tones.

26. The OFDM transmitter system of claim 14 further comprising a radio frequency transmitter system comprising a plurality of transmit branches operable to transmit the plurality of multi-carrier time-domain transmit signals.

27. A method of operation of a Multiple Input Multiple Output, MIMO, Orthogonal Division Multiplexing, OFDM, transmitter system, comprising:
for each carrier of two or more carriers, performing precoding of a plurality of frequency-domain input signals for the carrier to provide a plurality of frequency-domain precoded signals for the carrier, the plurality of frequency-domain input signals for the carrier being for a plurality of transmit layers for the carrier, respectively; and
processing two or more pluralities of the frequency-domain precoded signals for the two or more carriers, respectively, in accordance with a multi-carrier Convex Reduction of Amplitudes, CRAM, processing scheme to provide a plurality of multi-carrier time-domain transmit signals for a plurality of antenna branches, respectively, of the MIMO OFDM transmitter system;
wherein the multi-carrier CRAM processing scheme incorporates multi-cell interference scenarios;
wherein processing the two or more pluralities of the frequency-domain precoded signals for the two or more carriers, respectively, in accordance with the multi-carrier CRAM processing scheme comprises, for each c-th carrier of the two or more carriers:
for each n-th frequency-domain precoded signal of the plurality of the frequency-domain precoded signals for the c-th carrier for n=1, . . . , N:
performing a frequency-domain X-update procedure on the n-th frequency-domain precoded signal for the c-th carrier in accordance with one of the group consisting of:

$$x_{n,c}^{(k)} = \begin{bmatrix} \hat{H}_{Intra,n,c} \\ \hat{H}_{Inter,n,c} \end{bmatrix}^\dagger \begin{bmatrix} s_{n,c} \\ 0 \end{bmatrix} + \left( I - \begin{bmatrix} \hat{H}_{Intra,n,c} \\ \hat{H}_{Inter,n,c} \end{bmatrix}^\dagger \begin{bmatrix} \hat{H}_{Intra,n,c} \\ \hat{H}_{Inter,n,c} \end{bmatrix} \right) z_{n,c}^{(k-1)};$$

$$x_{n,c}^{(k)} = K_c \cdot \hat{H}_{Intra,n,c}^H s_{n,c} - (I - K_c \cdot \Theta_c - K_c \cdot \Lambda_c) z_{n,c}^{(k-1)}; \text{ and}$$

$$x_{n,c}^{(k)} = K_c \cdot \hat{H}_{Intra,n,c}^H s_{n,c} - (I - K_c \cdot \Theta_c - K_c \cdot \hat{\Lambda}_c) z_{n,c}^{(k-1)};$$

$x_{n,c}^{(k)} = K_c \cdot \hat{H}_{Intra,n,c}^H s_{n,c} - (I - K_c \cdot \Theta_c - K_c \cdot \Lambda_c) z_{n,c}^{(k-1)};$ and $x_{n,c}^{(k)} = K_c \cdot \hat{H}_{Intra,n,c}^H s_{n,c} - (I - K_c \cdot \Theta_c - K_c \cdot \hat{\Lambda}_c) z_{n,c}^{(k-1)};$ where:
$x_{n,c}^{(k)}$ is an X-update output for a k-th iteration of the multi-carrier CRAM processing scheme for the n-th frequency-domain precoded signal of a desired cell in a wireless communication system for the c-th carrier;
$\hat{H}_{Intra,n,c}$ is a channel matrix for a MIMO channel for the n-th frequency-domain precoded signal for the desired cell for the c-th carrier;
$\hat{H}_{Inter,n,c}$ is a channel matrix for a MIMO channel for interference from an interfering cell in the wireless communication system for the c-th carrier;
$s_{n,c}$ is an n-th frequency-domain input signal of the plurality of frequency-domain input signals of the desired cell for the c-th carrier;

$$I - \begin{bmatrix} \hat{H}_{Intra,n,c} \\ \hat{H}_{Inter,n,c} \end{bmatrix}^\dagger \begin{bmatrix} \hat{H}_{Intra,n,c} \\ \hat{H}_{Inter,n,c} \end{bmatrix}$$

is a projection matrix for the n-th frequency-domain precoded signal for the c-th carrier where I is an identity matrix; and
$z_{n,c}^{(k-1)}$ is a Z-update output for a (k−1)-th iteration of a Z-update procedure for the n-th frequency-domain precoded signal of the desired cell for the c-th carrier;

$K_c$ is defined as $K_c=(\hat{H}_{Intra,n,c}^{H}\hat{H}_{Intra,n,c}+\Lambda_c)^{-1}$ where $\hat{H}_{Intra,n,c}$ and is a channel matrix for a MIMO channel for the n-th frequency-domain precoded signal for the desired cell for the c-th carrier, and $\Lambda_c$ is a covariance matrix defined as $\Lambda_c=\hat{H}_{Inter,n,c}^{H}\cdot\hat{H}_{Inter,n,c}$ where $\hat{H}_{Inter,n,c}$ is unknown and is a channel matrix for a MIMO channel for interference from an interfering cell in the wireless communication system for the c-th carrier;

$I-K_c\cdot\Theta_c-K_c\cdot\Lambda_c$ is a projection matrix where I is an identity matrix and $\Theta_c=\hat{H}_{Intra,n,c}^{H}\cdot\hat{H}_{Intra,n,c}$.

\* \* \* \* \*

UNITED STATES PATENT AND TRADEMARK OFFICE
CERTIFICATE OF CORRECTION

PATENT NO. : 11,218,197 B2
APPLICATION NO. : 16/644917
DATED : January 4, 2022
INVENTOR(S) : Rollins et al.

It is certified that error appears in the above-identified patent and that said Letters Patent is hereby corrected as shown below:

In the Specification

In Column 1, Line 40, delete "$\mathrm{x}_n \varepsilon \, \mathbf{C}^{M \times 1}$" and insert -- $x_n \in \mathbb{C}^{M \times 1}$ --, therefor.

In Column 1, Line 41, delete "$\mathrm{s}_n \varepsilon \, \mathbf{C}^{K \times 1}$" and insert -- $s_n \in \mathbb{C}^{K \times 1}$ --, therefor.

In Column 1, Line 42, delete "to $|\mathcal{T}|$" and insert -- total --, therefor.

In Column 1, Line 44, delete "$\mathrm{H}_n^{\backslash}$" and insert -- $\boldsymbol{H}_n^{\dagger}$ --, therefor.

In Column 1, Line 50, delete "$\mathrm{H}_n \mathrm{x}_n = \mathrm{H}_n \mathrm{P}_n \mathrm{s}_n = \mathrm{H}_n \mathrm{H}_n^{\dagger} \mathrm{s}_n$," and insert -- $H_n x_n = H_n P_n s_n = H_n H_n^{\dagger} s_n = s_n$, -- therefor.

In Column 1, in Equation, Lines 59-61, delete "$s_n = H_n x_n, n \in \mathcal{T}$; $s_n = 0^{K \times 1}, n \in \mathcal{T}^c$." and insert -- $s_n = H_n x_n,\ n \in \mathcal{T}$; $s_n = 0^{K \times 1},\ n \in \mathcal{T}^c$ --, therefor.

Signed and Sealed this
Twenty-fifth Day of October, 2022

*Katherine Kelly Vidal*

Katherine Kelly Vidal
*Director of the United States Patent and Trademark Office*

CERTIFICATE OF CORRECTION (continued)
U.S. Pat. No. 11,218,197 B2

In Column 7, in Equation, Lines 30-33, delete "
$$x_n^{(k)} = z_n^{(k-1)} - P_n^{ZF}(H_n z_n^{(k-1)} - s_n), n \in \mathcal{T}$$
$$= (I - P_n^{ZF} H_n) \cdot z_n^{(k-1)} + P_n^{ZF} \cdot s_n$$
$$= C_n \cdot z_n^{(k-1)} + x_n^{ZF}$$
" and insert --
$$x_n^{(k)} = z_n^{(k-1)} - P_n^{ZF}(H_n z_n^{(k-1)} - s_n), n \in \mathcal{T}$$
$$= (I - P_n^{ZF} H_n) \cdot z_n^{(k-1)} + P_n^{ZF} \cdot s_n$$
$$= C_n \cdot z_n^{(k-1)} + x_n^{ZF}$$
--, therefor.

In Column 10, Line 28, delete "$P_n^{ZF}$" and insert -- $\boldsymbol{P}_n^{ZF}$ --, therefor.

In Column 10, Line 38, delete "$H_n x_n^{ZF} = H_n P_n^{ZF} s_n = H_n H_n^\dagger s_n = s_n$" and insert -- $H_n x_n^{ZF} = H_n P_n^{ZF} s_n = H_n H_n^\dagger s_n = s_n$ --, therefor.

In Column 11, in Equation, Lines 45-50, delete "
$$x_n^{(k)} = z_n^{(k-1)} - P_n^{ZF}(H_n z_n^{(k-1)} - s_n), n \in \mathcal{T}$$
$$= (I - P_n^{ZF} H_n) \cdot z_n^{(k-1)} + P_n^{ZF} \cdot s_n$$
$$= C_n \cdot z_n^{(k-1)} + x_n^{ZF}$$
" and insert --
$$x_n^{(k)} = z_n^{(k-1)} - P_n^{ZF}(H_n z_n^{(k-1)} - s_n), n \in \mathcal{T}$$
$$= (I - P_n^{ZF} H_n) \cdot z_n^{(k-1)} + P_n^{ZF} \cdot s_n$$
$$= C_n \cdot z_n^{(k-1)} + x_n^{ZF}$$
--, therefor.

In Column 13, Line 54, delete "matrix v" and insert -- matrix $\varphi$ --, therefor.

In Column 14, Line 36, delete "matrix v" and insert -- matrix $\varphi$ --, therefor.

In Column 15, Line 4, delete "apt)" and insert -- $\varphi^\dagger$) --, therefor.

In Column 15, in Equation, Line 23, delete "$x_n^{(k)} = z_n^{(k-1)} - \varphi P_n^{ZFB}(P_n^{ZFB\dagger} \varphi^\dagger z_n^{(k-1)} - s_n), \forall n \in \mathcal{T}$" and insert -- $x_n^{(k)} = z_n^{(k-1)} - \varphi P_n^{ZFB}(P_n^{ZFB\dagger} \varphi^\dagger z_n^{(k-1)} - s_n), \forall n \in \mathcal{T}$ --, therefor.

In Column 16, in Equation, Lines 46-50, delete "
$$x_n^{(k)} = z_n^{(k-1)} - P_n^{ZF}(H_n z_n^{(k-1)} - s_n), n \in \mathcal{T}$$
$$= (I - P_n^{ZF} H_n) \cdot z_n^{(k-1)} + P_n^{ZF} \cdot s_n$$
$$= C_n \cdot z_n^{(k-1)} + x_n^{ZF}$$
" and

CERTIFICATE OF CORRECTION (continued)
U.S. Pat. No. 11,218,197 B2 insert -- 
$$\begin{aligned} x_n^{(k)} &= z_n^{(k-1)} - P_n^{ZF}(H_n z_n^{(k-1)} - s_n), n \in \mathcal{T} \\ &= (I - P_n^{ZF} H_n) \cdot z_n^{(k-1)} + P_n^{ZF} \cdot s_n \\ &\equiv C_n \cdot z_n^{(k-1)} + x_n^{ZF} \end{aligned}$$
--, therefor.

In Column 16, in Equation, Line 65, delete " $x_n^{(k)} = \begin{bmatrix} H_{intra,n} \\ H_{inter,n} \end{bmatrix}^\dagger \cdot \begin{bmatrix} s_n \\ 0 \end{bmatrix} + \left( I - \begin{bmatrix} H_{intra,n} \\ H_{inter,n} \end{bmatrix}^\dagger \begin{bmatrix} H_{intra,n} \\ H_{inter,n} \end{bmatrix} \right) \cdot z_n^{(k-1)}, n \in \mathcal{T}$ "

and insert -- $x_n^{(k)} = \begin{bmatrix} H_{intra,n} \\ H_{inter,n} \end{bmatrix}^\dagger \cdot \begin{bmatrix} s_n \\ 0 \end{bmatrix} + \left( I - \begin{bmatrix} H_{intra,n} \\ H_{inter,n} \end{bmatrix}^\dagger \begin{bmatrix} H_{intra,n} \\ H_{inter,n} \end{bmatrix} \right) \cdot z_n^{(k-1)}, n \in \mathcal{T}$ --, therefor.

In Column 17, in Equation, Line 35, delete " $K = (\hat{H}_{Intra}^H \hat{H}_{Intra} + \Lambda)^{-1}; \Theta = \hat{H}_{Intra}^H \cdot \hat{H}_{Intra}; \Lambda \hat{H}_{Inter}^H \cdot \hat{H}_{Inter}$ " and insert -- $K = (\hat{H}_{Intra}^H \hat{H}_{Intra} + \Lambda)^{-1}; \Theta = \hat{H}_{Intra}^H \cdot \hat{H}_{Intra}; \Lambda = \hat{H}_{Inter}^H \cdot \hat{H}_{Inter}$ --, therefor.

In Column 18, Lines 24-25, delete "n=1, N" and insert -- n=1, . . . , N --, therefor.

In Column 33, Line 1, delete "X$_{n,b,c}^{ZF}$" and insert -- $x_{n,c,b}^{ZF}$ --, therefor.

In Column 36, Line 15, delete "MS" and insert -- AAS --, therefor.

In the Claims

In Column 42, Line 42, in Claim 9, delete "Z$_m^{(k-1)}$(t)" and insert -- $Z_{m,b}^{(k-1)}(t)$ --, therefor.

In Column 44, in Equation, Line 40, in Claim 16, delete " $x_{n,c}^{(k)} = \begin{bmatrix} \hat{H}_{Intra,n,c} \\ \hat{H}_{Inter,n,c} \end{bmatrix}^\dagger \begin{bmatrix} s_{n,c} \\ 0 \end{bmatrix} + \left[ I - \begin{bmatrix} \hat{H}_{Intra,n,c} \\ \hat{H}_{Inter,n,c} \end{bmatrix}^\dagger \begin{bmatrix} \hat{H}_{Intra,n,c} \\ \hat{H}_{Inter,n,c} \end{bmatrix} \right] z_{n,c}^{(k-1)}$ "

and insert -- $x_{n,c}^{(k)} = \begin{bmatrix} \hat{H}_{intra,n,c} \\ \hat{H}_{inter,n,c} \end{bmatrix}^\dagger \begin{bmatrix} s_{n,c} \\ 0 \end{bmatrix} + \left( I - \begin{bmatrix} \hat{H}_{intra,n,c} \\ \hat{H}_{inter,n,c} \end{bmatrix}^\dagger \begin{bmatrix} \hat{H}_{intra,n,c} \\ \hat{H}_{inter,n,c} \end{bmatrix} \right) z_{n,c}^{(k-1)}$ --, therefor.

In Column 50, in Equation, Lines 27-39, in Claim 27, delete

" $x_{n,c}^{(k)} = \begin{vmatrix} \hat{H}_{Intra,n,c} \\ \hat{H}_{Inter,n,c} \end{vmatrix} \begin{vmatrix} s_{n,c} \\ 0 \end{vmatrix} + \left( I - \begin{vmatrix} \hat{H}_{Intra,n,c} \\ \hat{H}_{Inter,n,c} \end{vmatrix} \begin{vmatrix} \hat{H}_{Intra,n,c} \\ \hat{H}_{Inter,n,c} \end{vmatrix} \right) z_{n,c}^{(k-1)};$ $x_{n,c}^{(k)} = K_c \cdot \hat{H}_{Intra,n,c}^H s_{n,c} - (I - K_c \cdot \Theta_c - K_c \cdot \Lambda_c) z_{n,c}^{(k-1)};$ and $x_{n,c}^{(k)} = K_c \cdot \hat{H}_{Intra,n,c}^H s_{n,c} - (I - K_c \cdot \Theta_c - K_c \cdot \tilde{\Lambda}_c) z_{n,c}^{(k-1)};$ $x_{n,c}^{(k)} = K_c \cdot \hat{H}_{Intra,n,c}^H s_{n,c} - (I - K_c \cdot \Theta_c - K_c \cdot \Lambda_c) z_{n,c}^{(k-1)};$ and $x_{n,c}^{(k)} = K_c \cdot \hat{H}_{Intra,n,c}^H s_{n,c} - (I - K_c \cdot \Theta_c - K_c \cdot \tilde{\Lambda}_c) z_{n,c}^{(k-1)};$ " and insert -- $x_{n,c}^{(k)} = \begin{bmatrix} \hat{H}_{Intra,n,c} \\ \hat{H}_{Inter,n,c} \end{bmatrix}^{\dagger} \begin{bmatrix} s_{n,c} \\ 0 \end{bmatrix} + \left( I - \begin{bmatrix} \hat{H}_{Intra,n,c} \\ \hat{H}_{Inter,n,c} \end{bmatrix}^{\dagger} \begin{bmatrix} \hat{H}_{Intra,n,c} \\ \hat{H}_{Inter,n,c} \end{bmatrix} \right) z_{n,c}^{(k-1)};$ $x_{n,c}^{(k)} = K_c \cdot \hat{H}_{Intra,n,c}^H s_{n,c} - (I - K_c \cdot \Theta_c - K_c \cdot \Lambda_c) z_{n,c}^{(k-1)};$ and $x_{n,c}^{(k)} = K_c \cdot \hat{H}_{Intra,n,c}^H s_{n,c} - (I - K_c \cdot \Theta_c - K_c \cdot \tilde{\Lambda}_c) z_{n,c}^{(k-1)};$ --, therefor.